United States Patent [19]

Meeker

[11] Patent Number: 4,751,742
[45] Date of Patent: Jun. 14, 1988

[54] PRIORITY CODING OF TRANSFORM COEFFICIENTS

[75] Inventor: G. William Meeker, Silver Spring, Md.

[73] Assignee: Avelex, Lanham, Md.

[21] Appl. No.: 731,517

[22] Filed: May 7, 1985

[51] Int. Cl.$^4$ ............................................. G06K 9/36
[52] U.S. Cl. ........................................ 382/41; 382/43; 382/56; 364/723; 364/725; 364/728; 358/133; 358/135; 358/136; 358/138
[58] Field of Search ............... 364/725, 826, 723, 728; 382/41, 43, 56; 358/133, 138, 260, 263, 33, 135, 136

[56] References Cited

U.S. PATENT DOCUMENTS

| | | | |
|---|---|---|---|
| 3,553,362 | 1/1971 | Mounts | 178/7.1 |
| 4,189,748 | 2/1980 | Reis | 358/260 |
| 4,222,076 | 9/1980 | Knowlton | 358/263 |
| 4,302,775 | 11/1981 | Widergren et al. | 382/56 |
| 4,447,886 | 5/1984 | Meeker | 364/725 |
| 4,541,012 | 9/1985 | Tescher | 358/133 |
| 4,580,162 | 4/1986 | Mori | 358/138 |
| 4,591,909 | 5/1986 | Kuroda et al. | 358/136 |
| 4,603,350 | 7/1986 | Arbeiter et al. | 358/11 |

OTHER PUBLICATIONS

Tanimoto, S. and Pavlidis, T., "A Hierarchical Data Structure for Picture Processing", *Computer Graphics and Image Processing*, vol. 4, pp. 104–119, (1975).
Hohne, K. H. et al., "Data Compression in Digital Angiography Using the Fourier Transform", *Med. Phys.* 10 (6), Nov./Dec. 1983.
W. Pratt, "Digital Image Processing", John Wiley & Sons, 1978, pp. 673–677.
P. Wintz, "Transform Picture Coding", Proceedings of the IEEE, vol. 60, No. 7, Jul. 1972, pp. 809–820.
B. Haskell, F. Mounts & J. Candy, "Interframe Coding of Videotelephone Pictures", Proceedings of the IEEE, vol. 60, No. 7, Jul. 1972, pp. 792–800.
A. Habibi, "Hybrid Coding of Pictorial Data", IEEE Transactions on Communications, vol. COM-22, No. 5, May 1974, pp. 614–624.
A. Netravali, J. Limb, "Picture Coding: A Review", Proceedings of the IEEE, vol. 68, No. 3, Mar. 1980, pp. 366–406.

*Primary Examiner*—Leo H. Boudreau
*Assistant Examiner*—Jose L. Couso
*Attorney, Agent, or Firm*—Kerkam, Stowell, Kondracki & Clarke

[57] ABSTRACT

Disclosed are methods and apparatus for prioritization of transform domain coefficient data representing sources such as, but not limited to, single images and images in motion, so as to produce a data rate not exceeding the capacity of the transmission channel used in transmitting the data to a receiver and to simultaneously minimize the perceived distortion when the image is reconstructed at the receiver. One disclosed aspect relates in particular to transmission of Pyramid Transform coefficients from a single image over a fixed data rate transmission channel. In effect a sequence of multiple image reconstructions is performed at the receiver during the time period required for the transmission of all of the coefficient data representing the image. The reconstructed image gradually increases in detail. Another disclosed aspect relates to the transmission of transform domain coefficients for an image which is undergoing change with time, and applies to any transform for which transform domain coefficients can be organized in a hierarchial manner in multiple bands, regardless of the manner in which the transform process actually proceeds. Identical transform coefficient models are maintained at both the transmitter and the receiver. The transmitter identifies transform coefficient changes necessary to cause a transform coefficient model to completely represent the most current image, prioritizes the change data, and selects a subset of said change data consistent with the limitation of a fixed rate transmission channel. Advantageous mapping and signalling techniques are disclosed for maintaining the coefficient models and for efficiently signalling the changes.

75 Claims, 44 Drawing Sheets

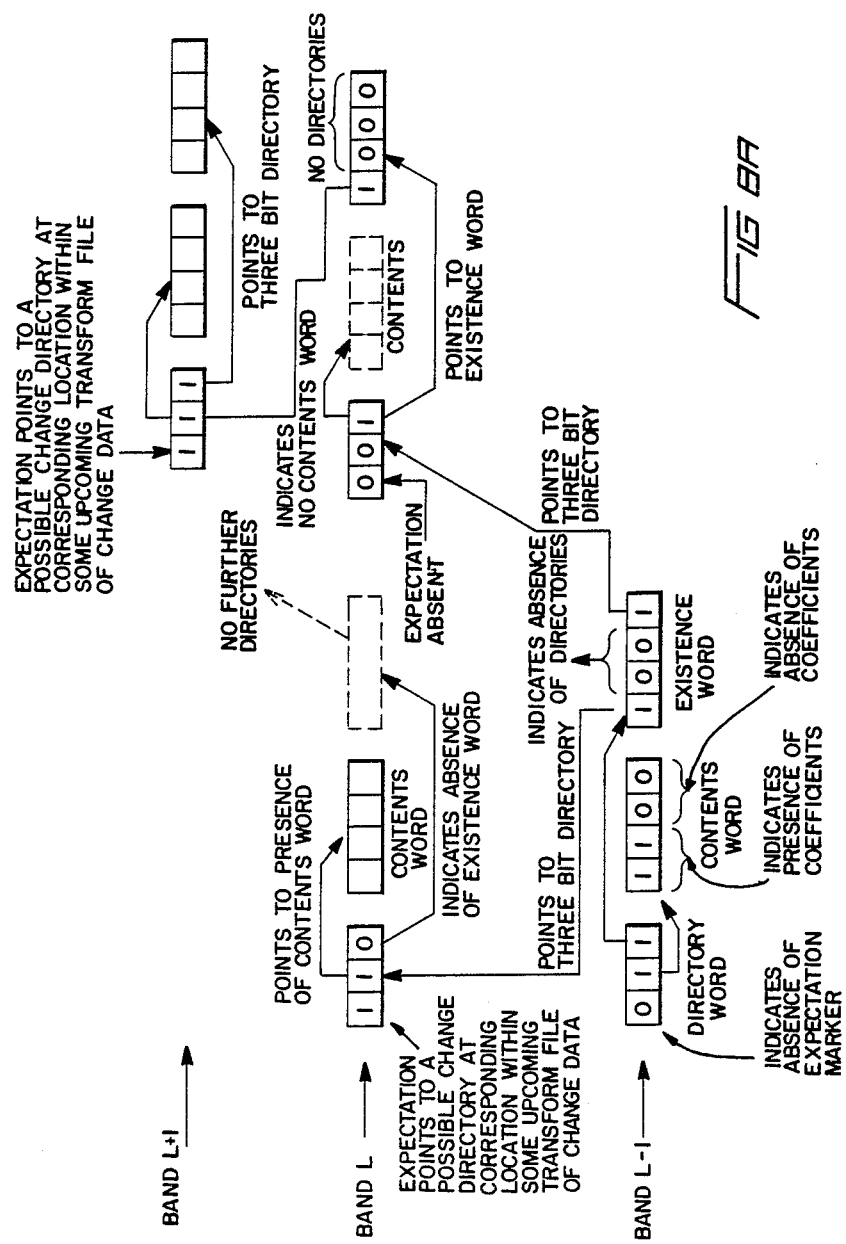

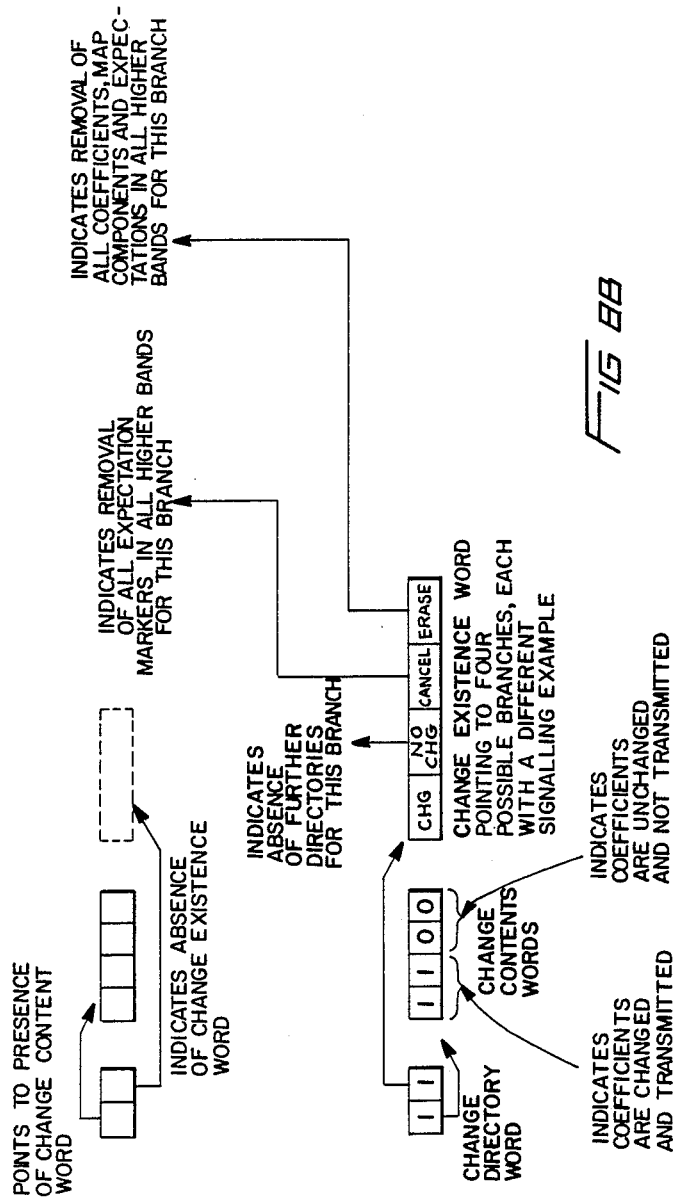

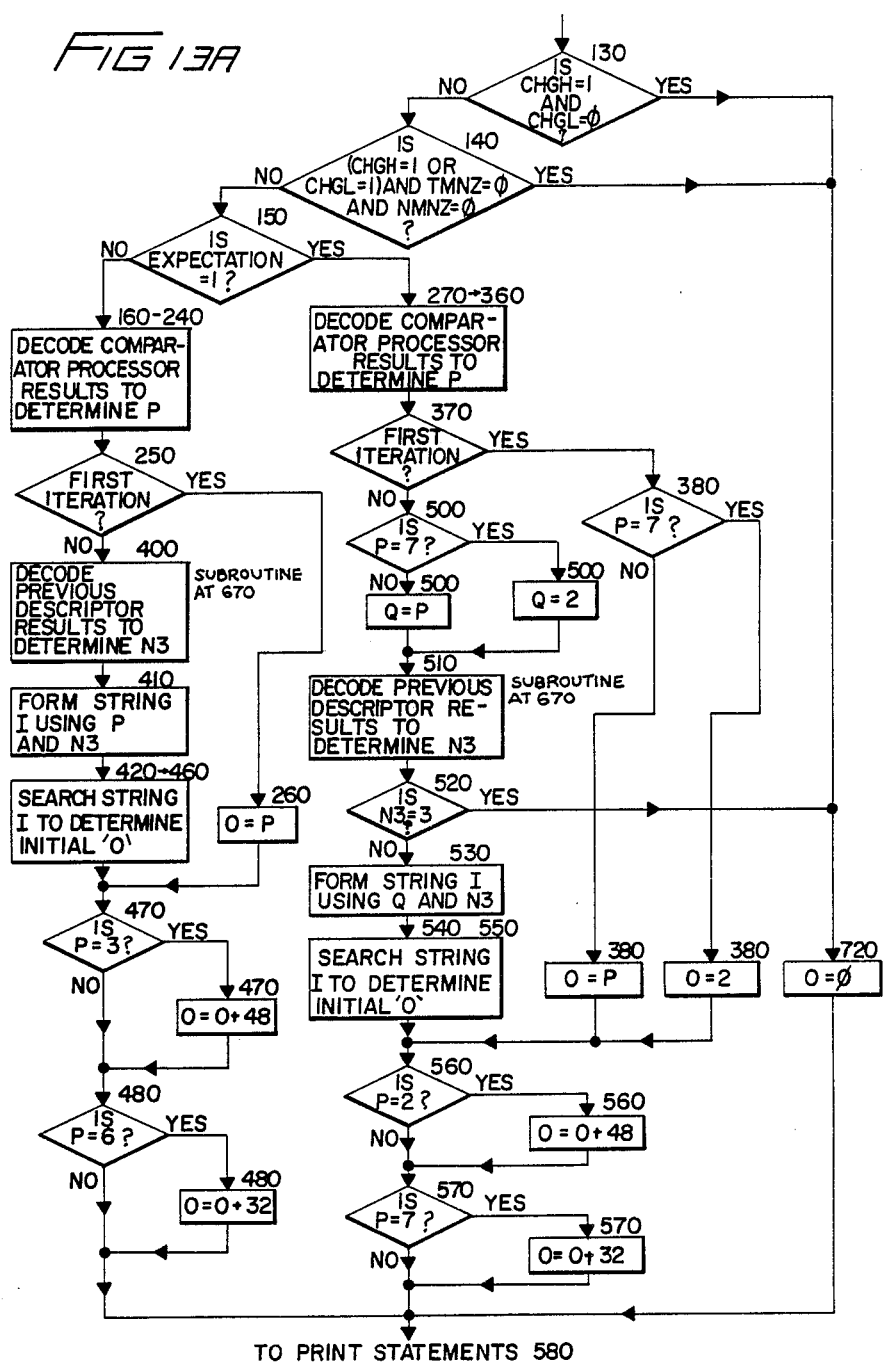

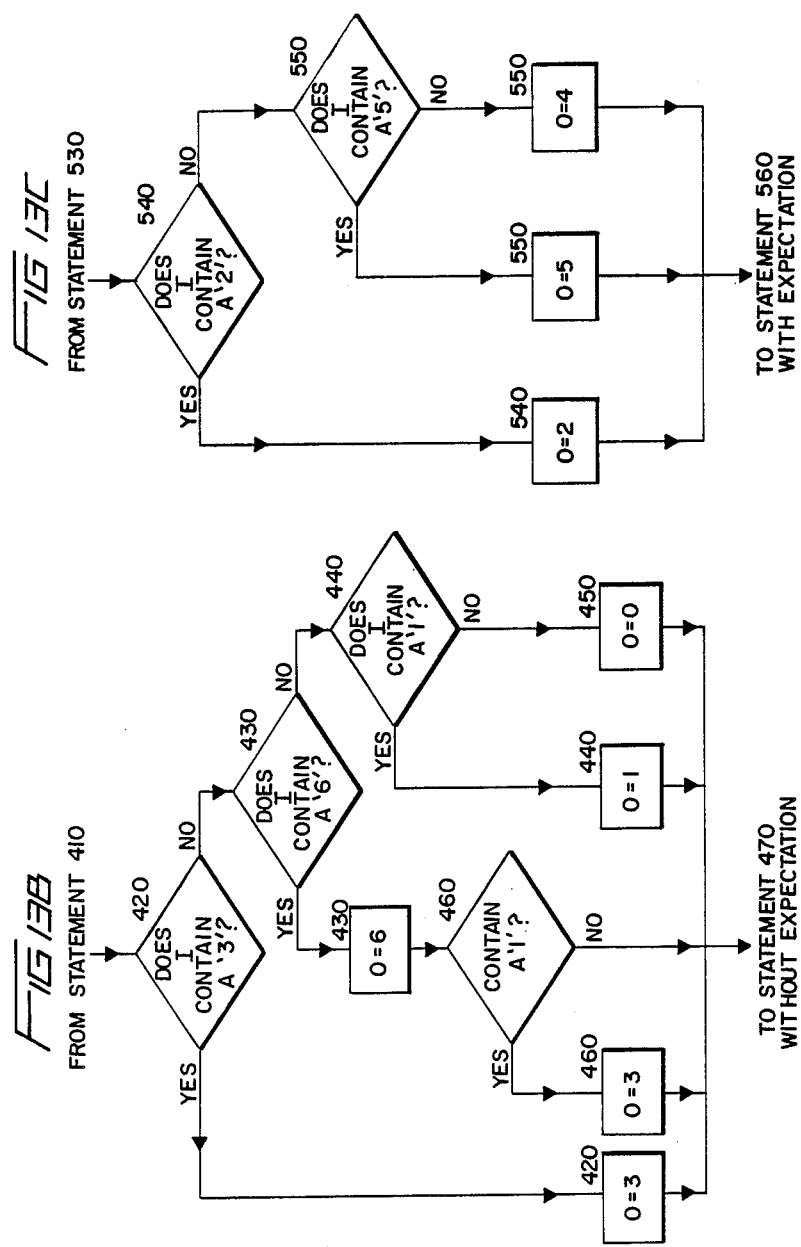

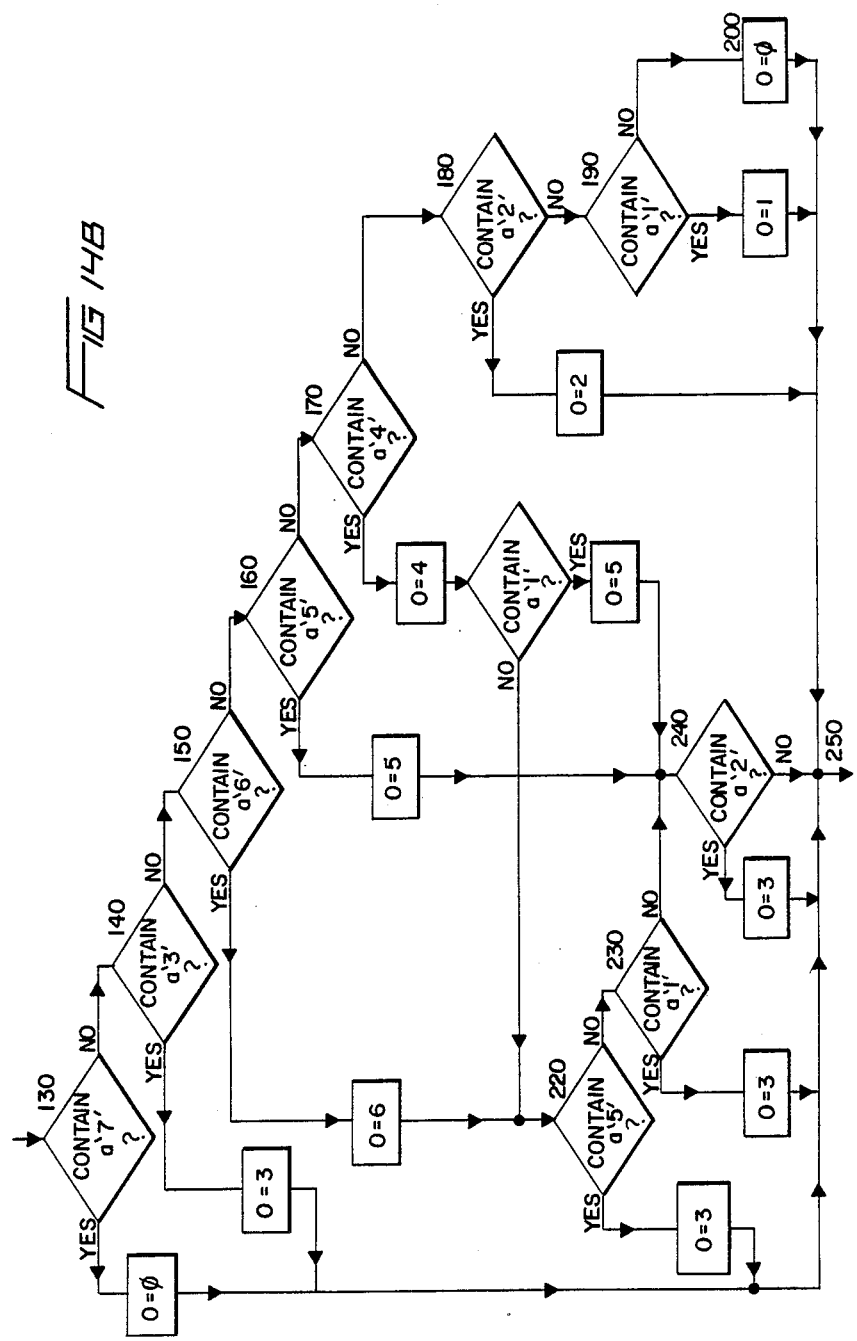

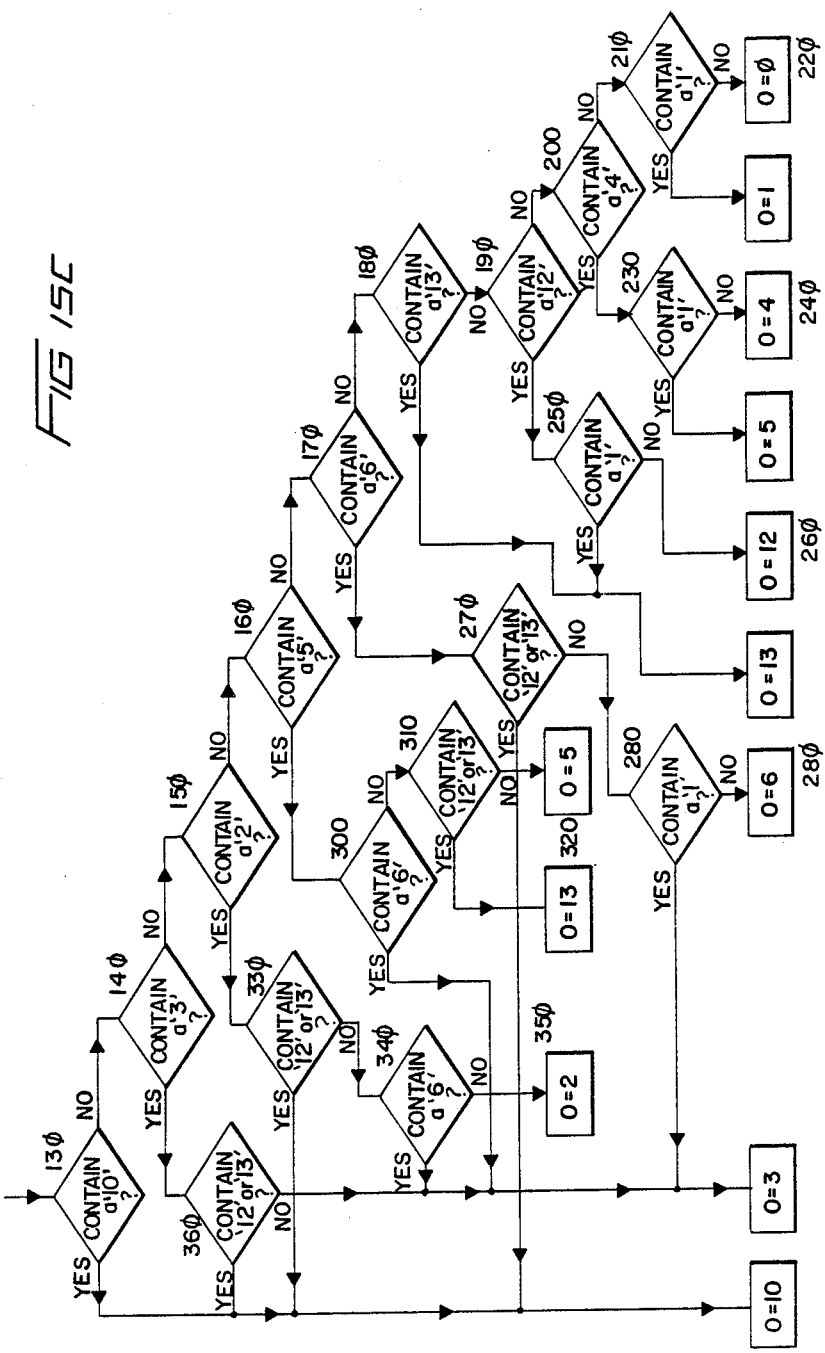

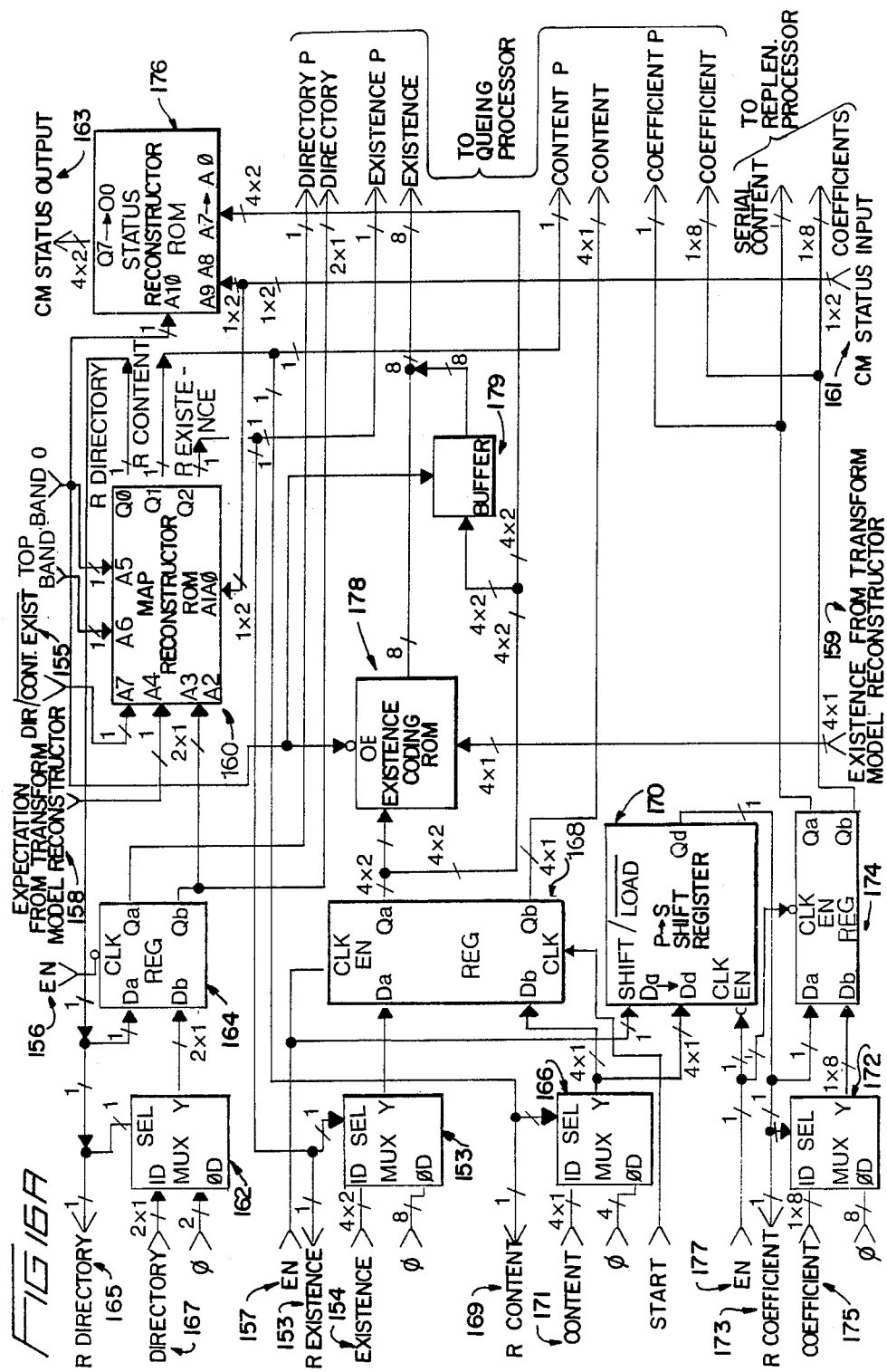

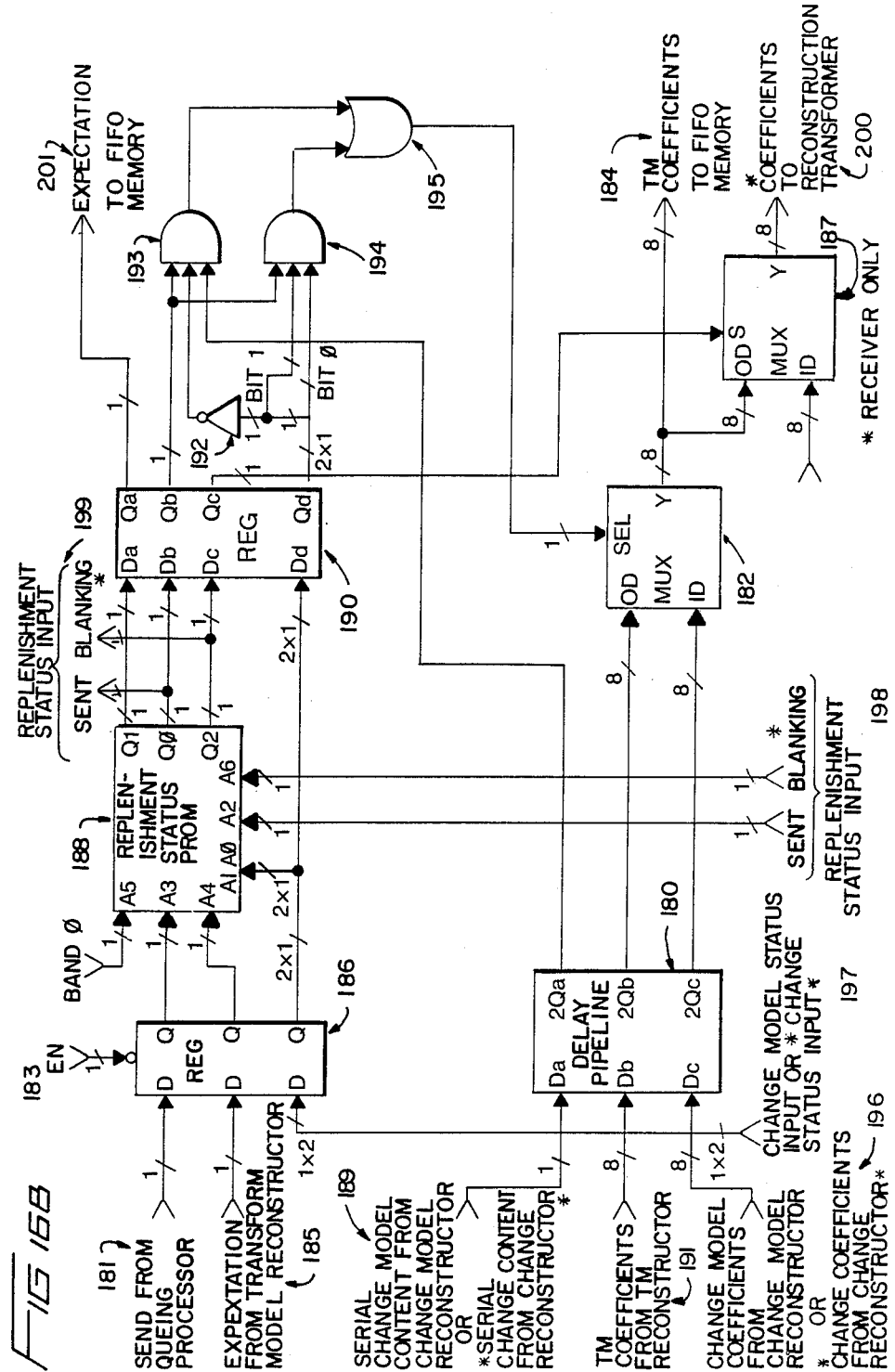

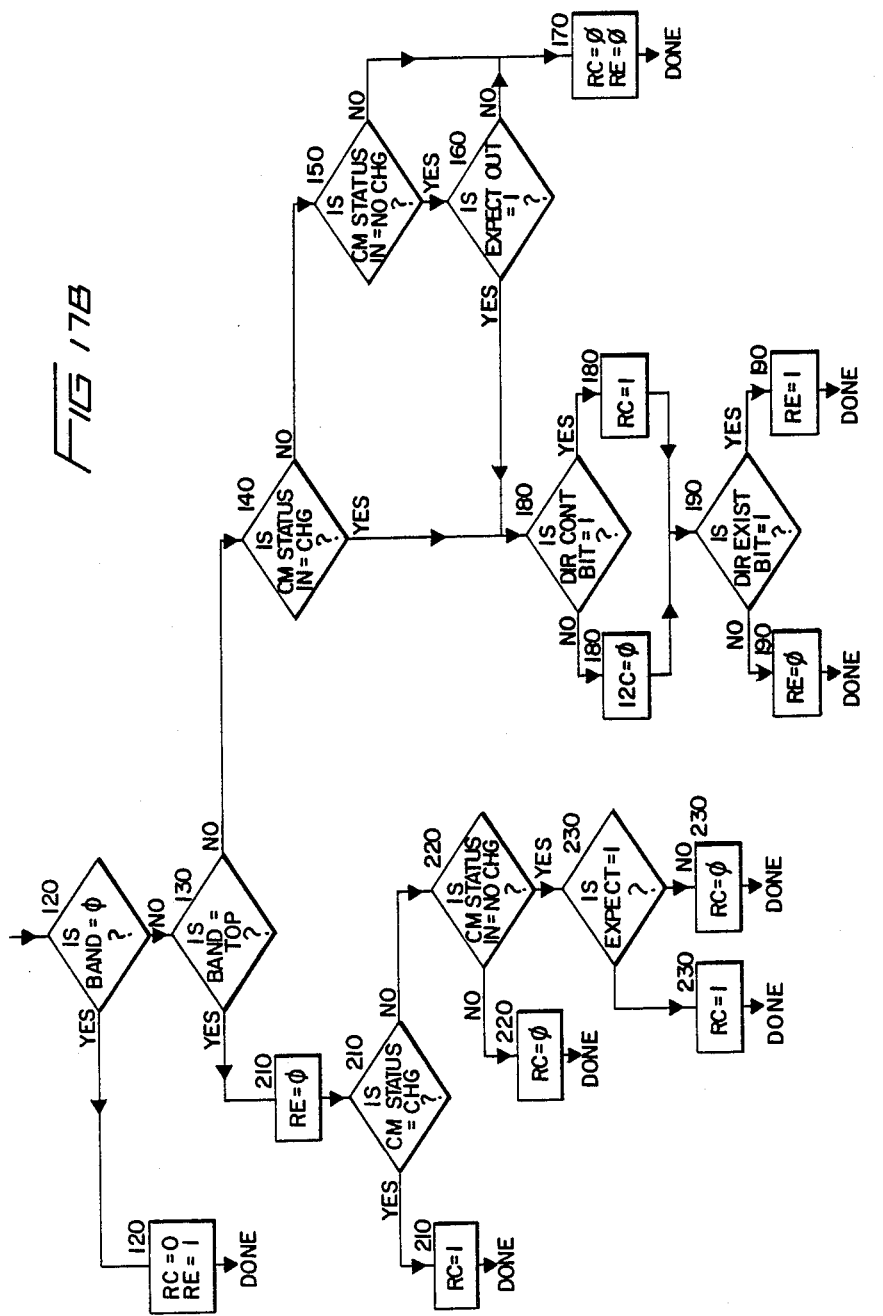

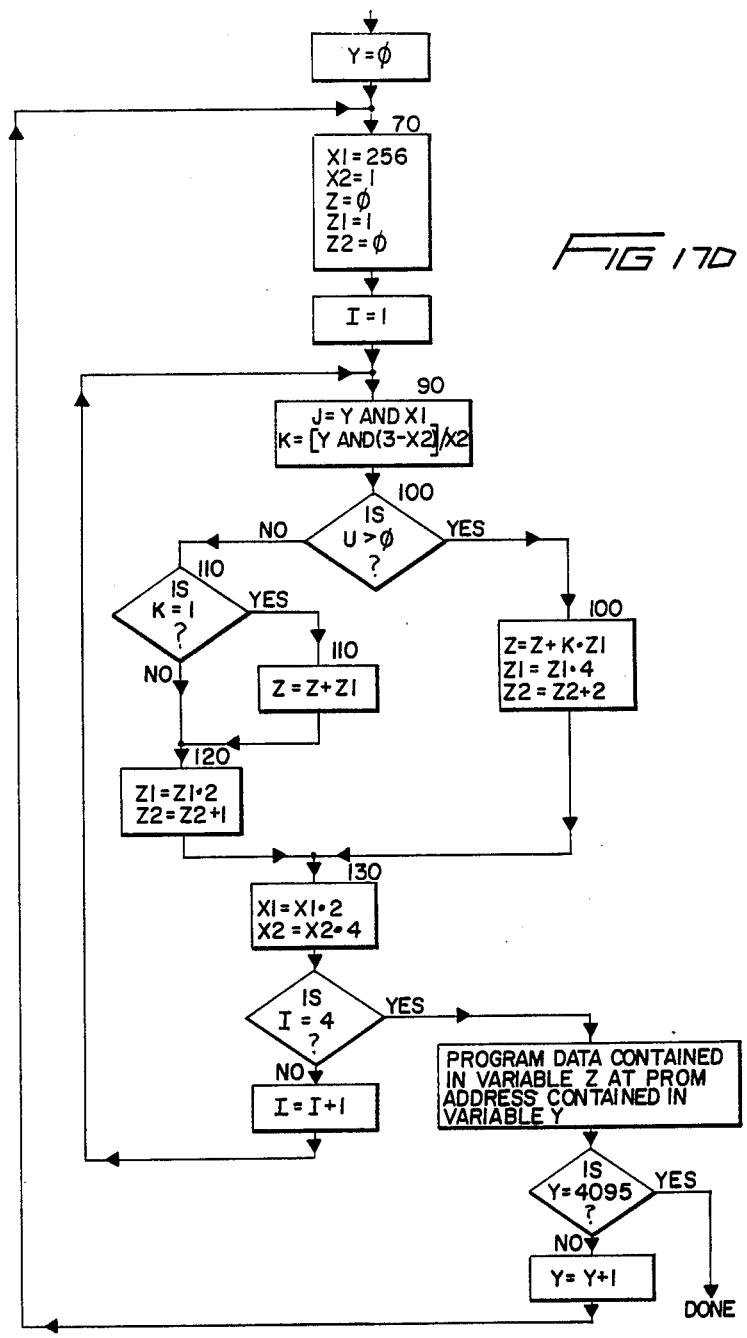

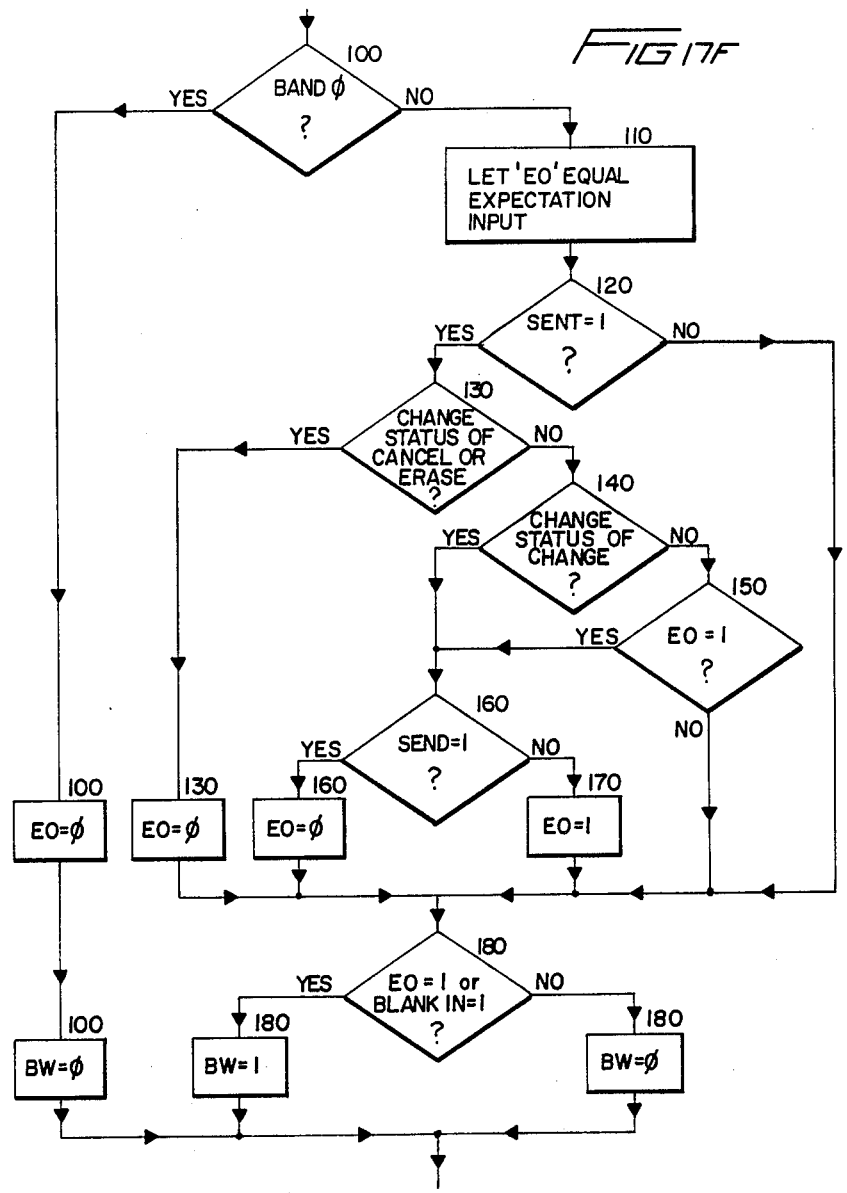

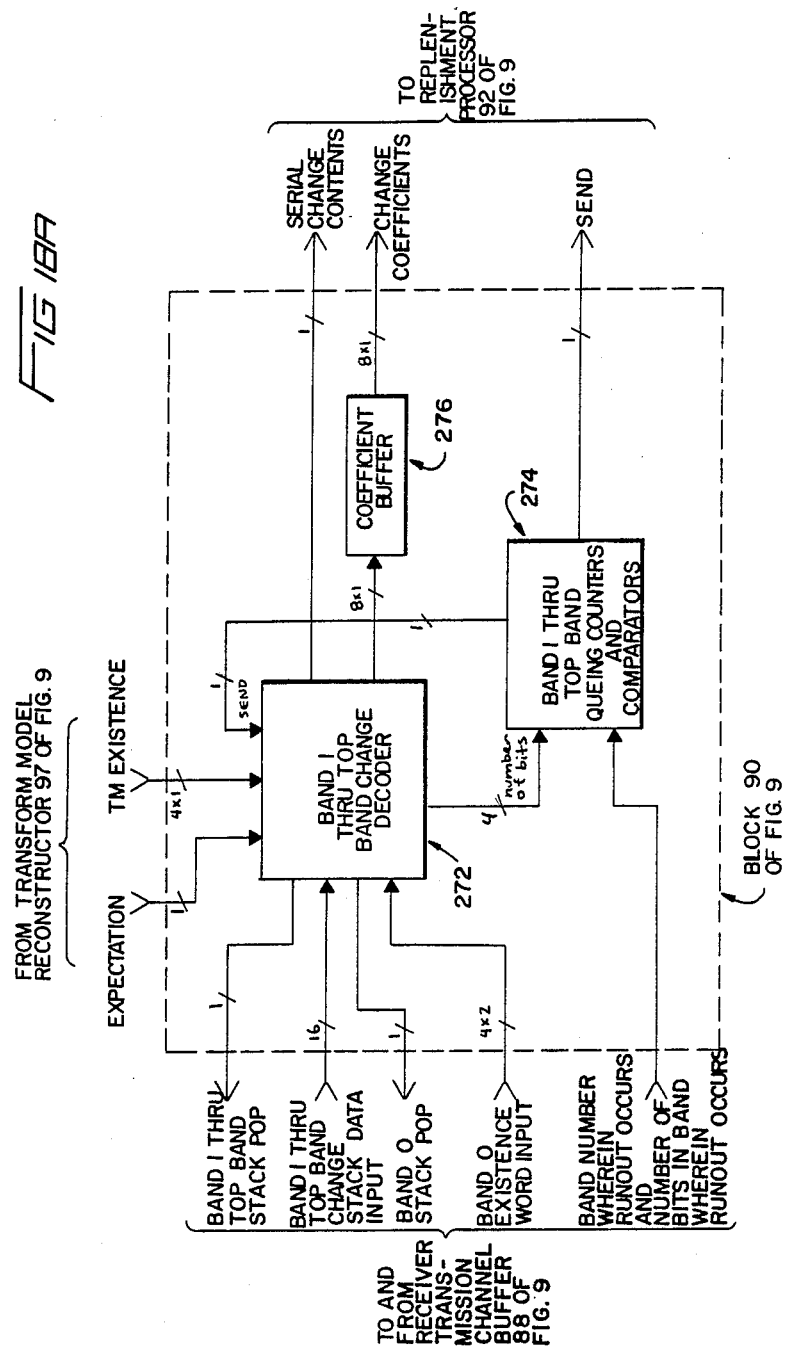

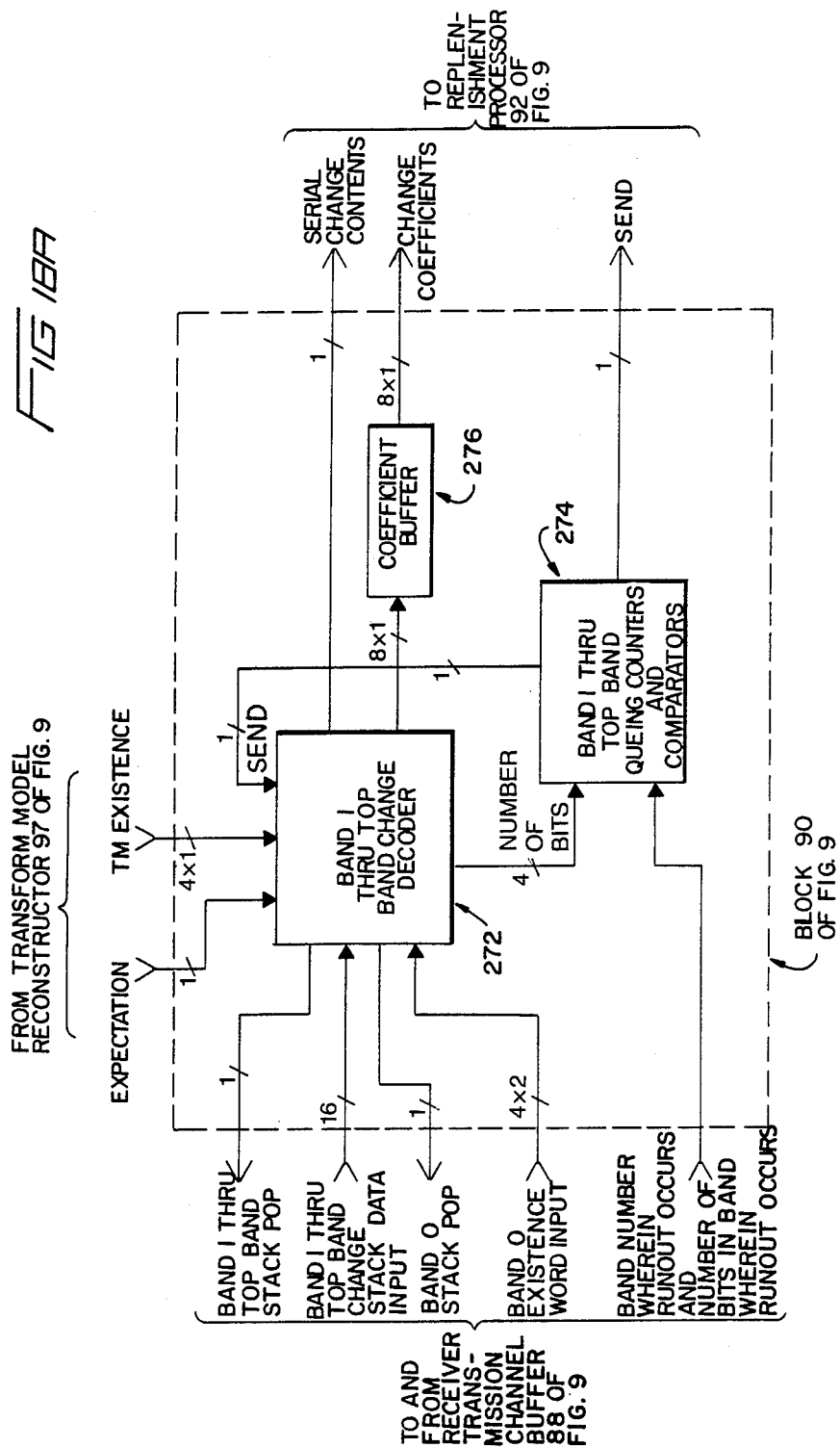

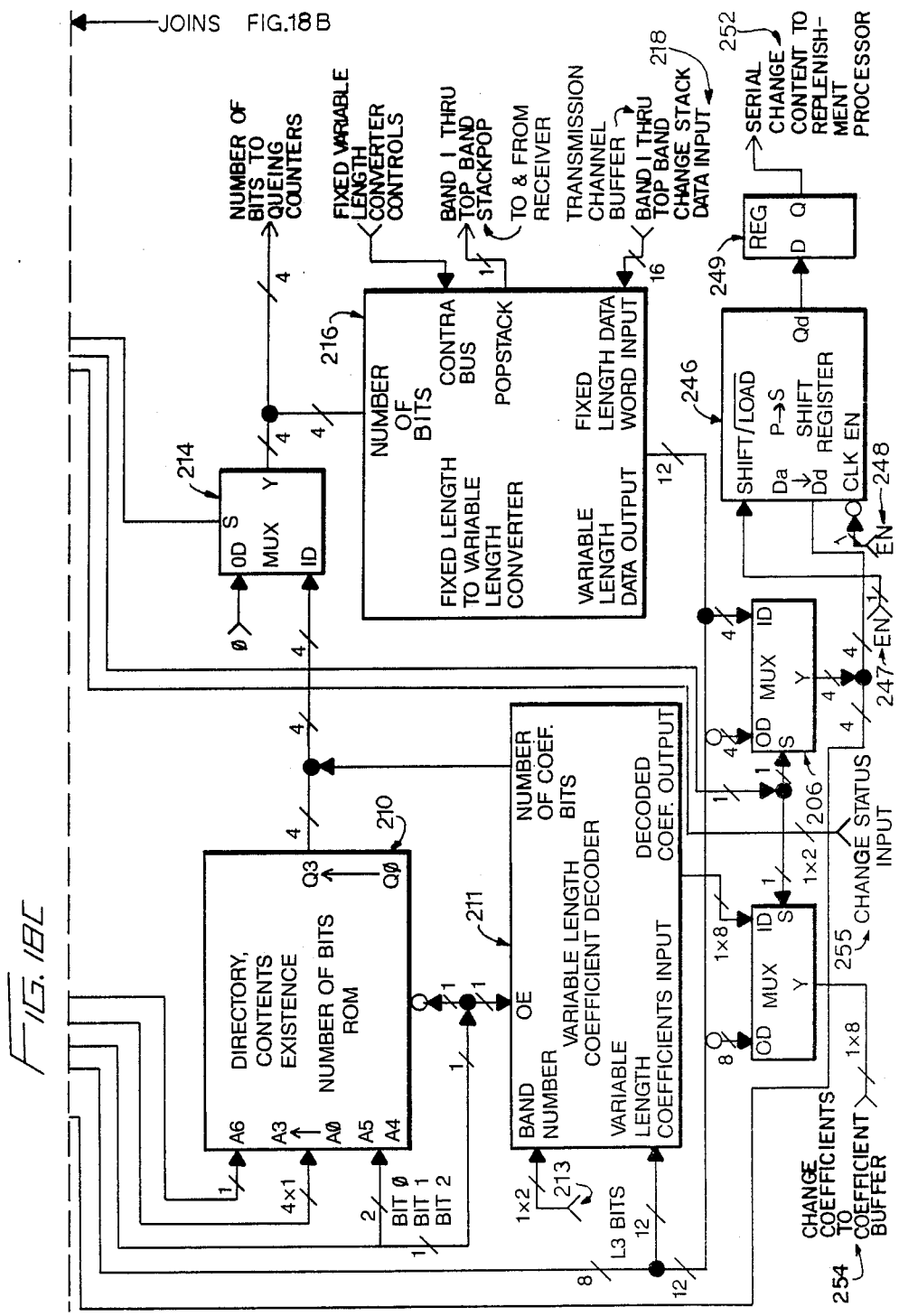

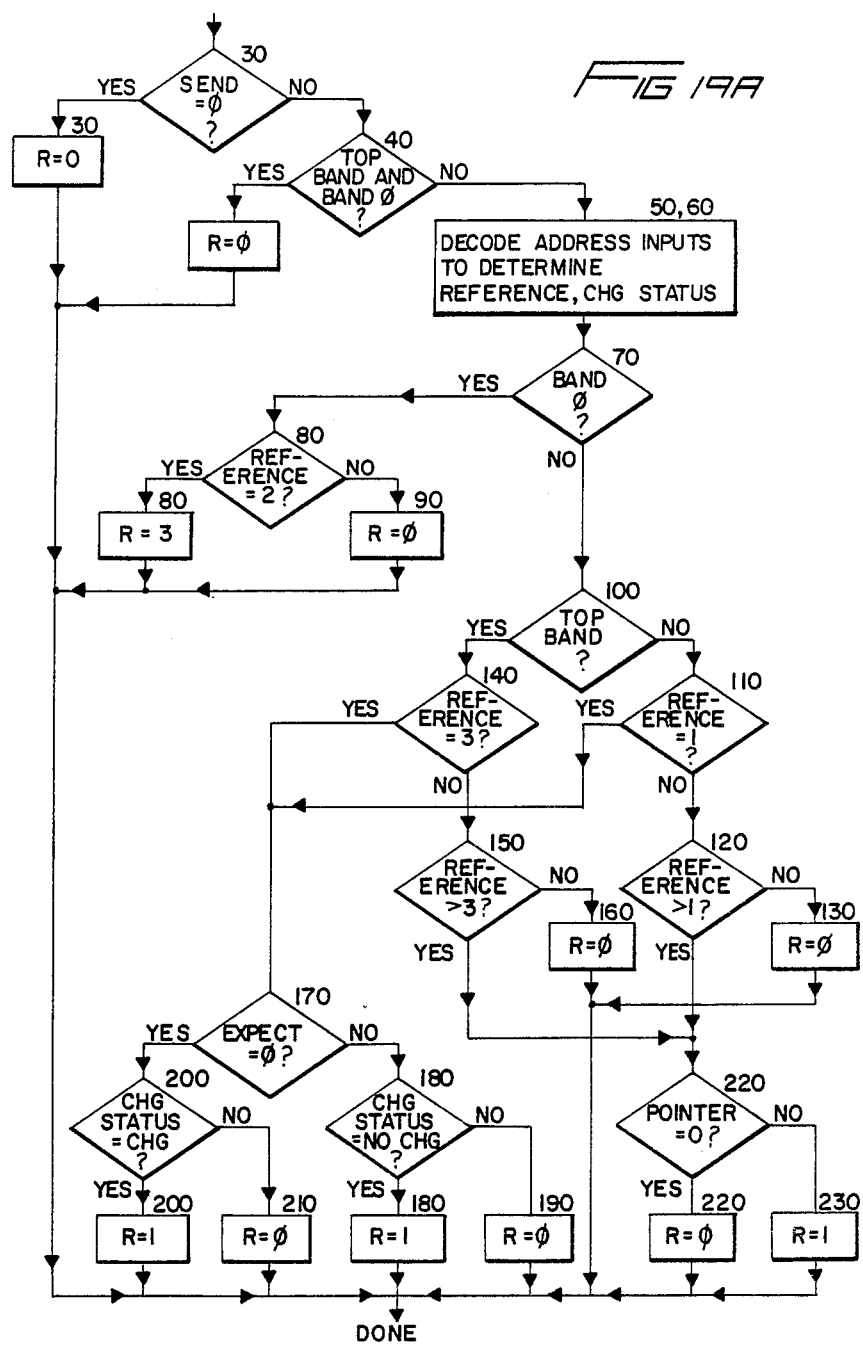

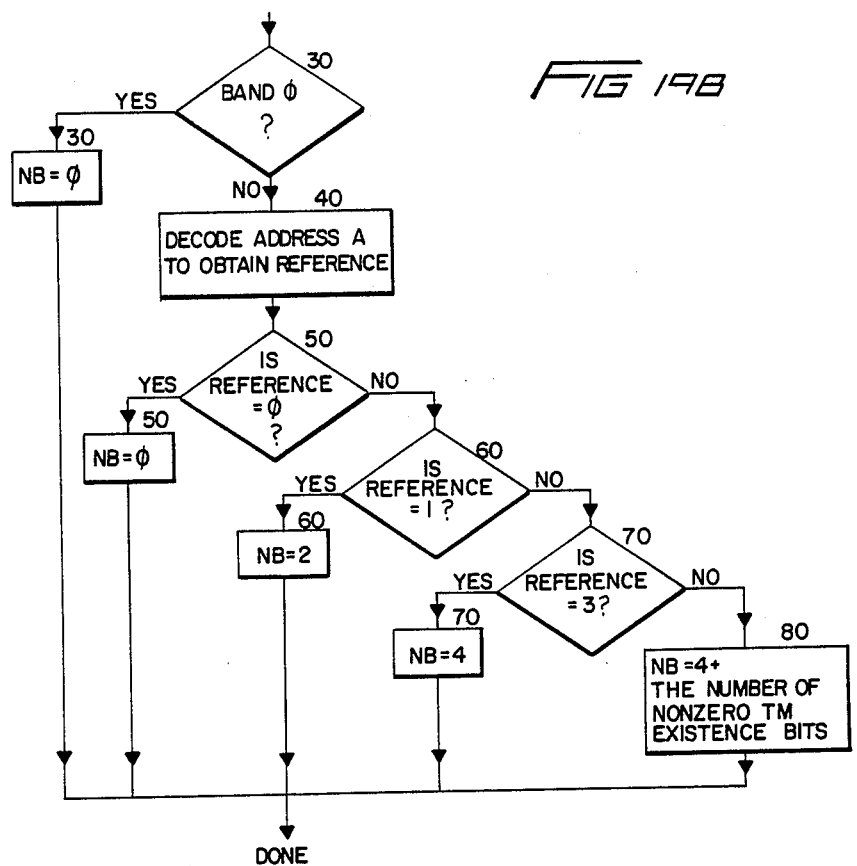

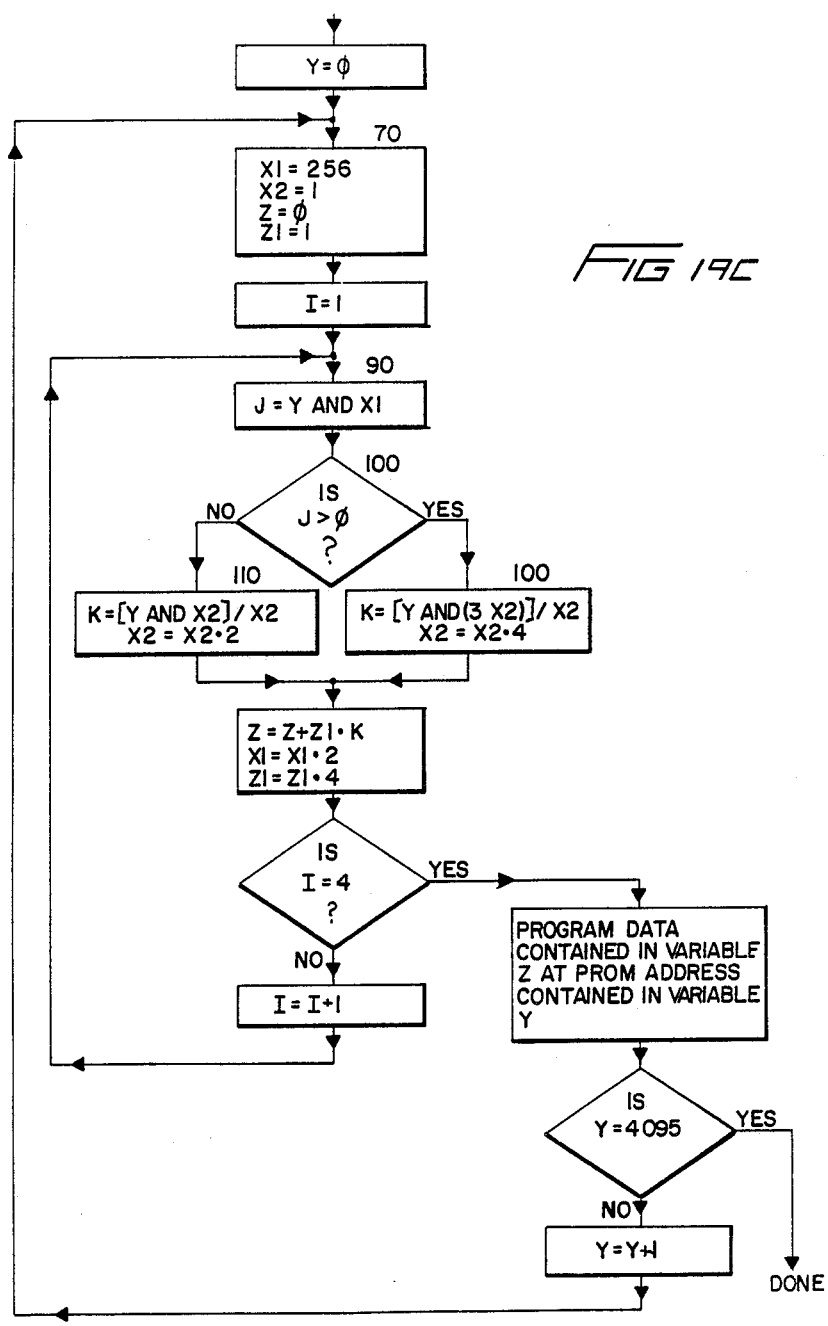

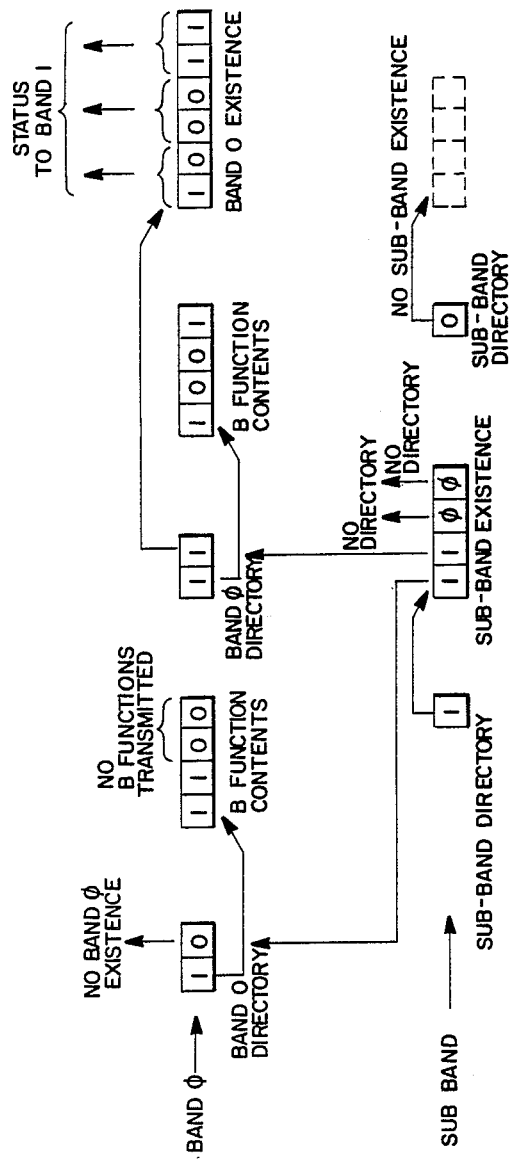

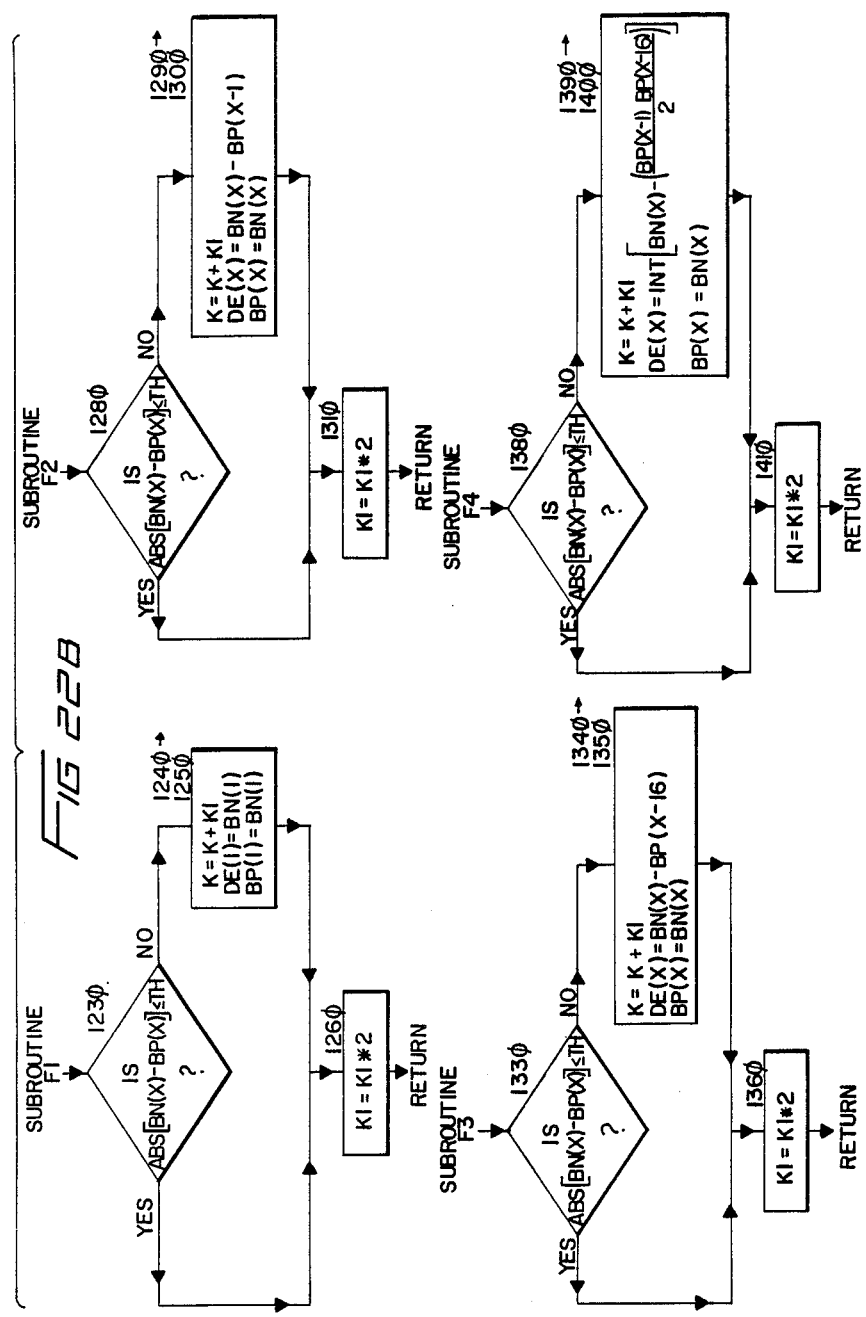

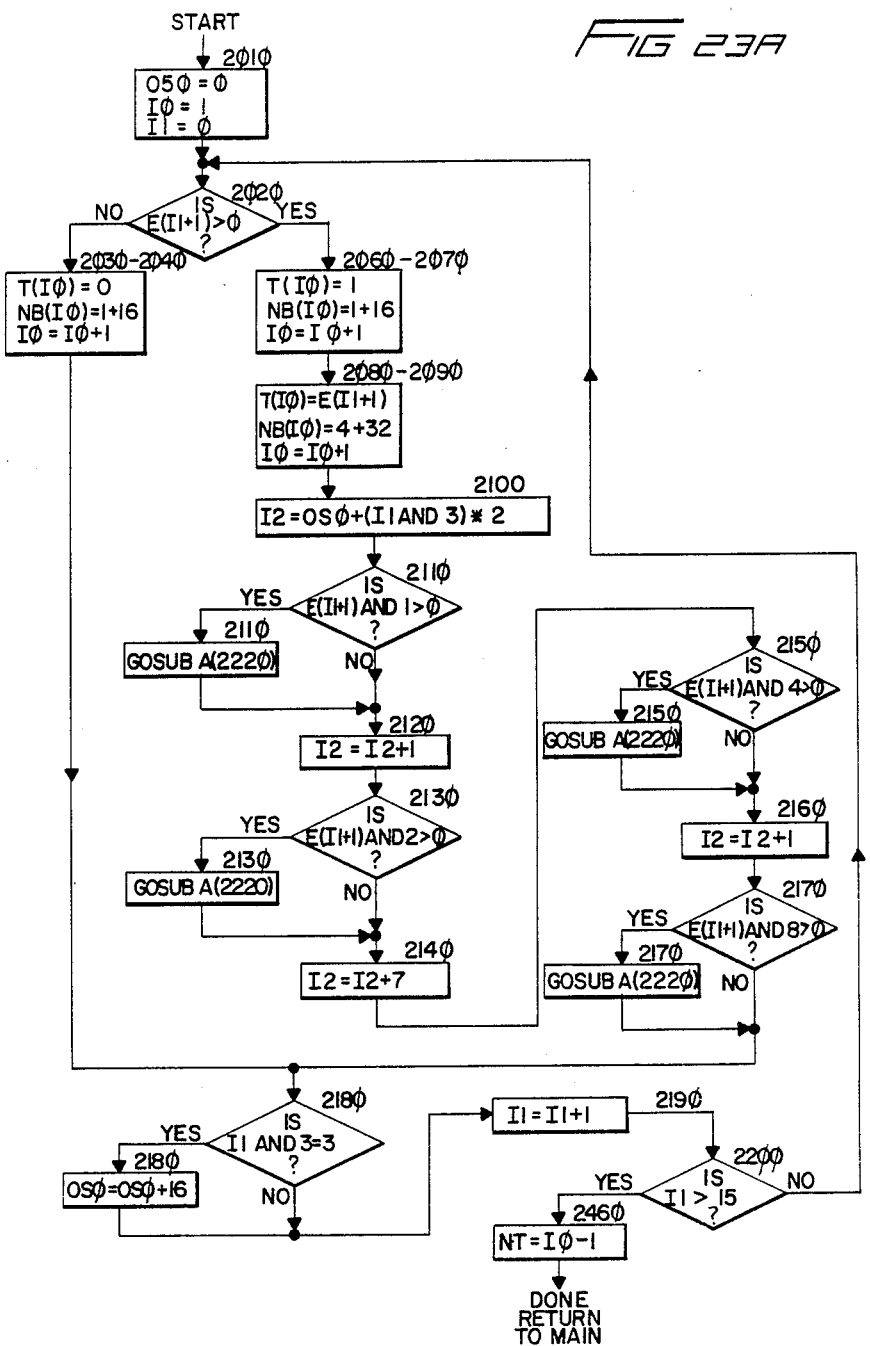

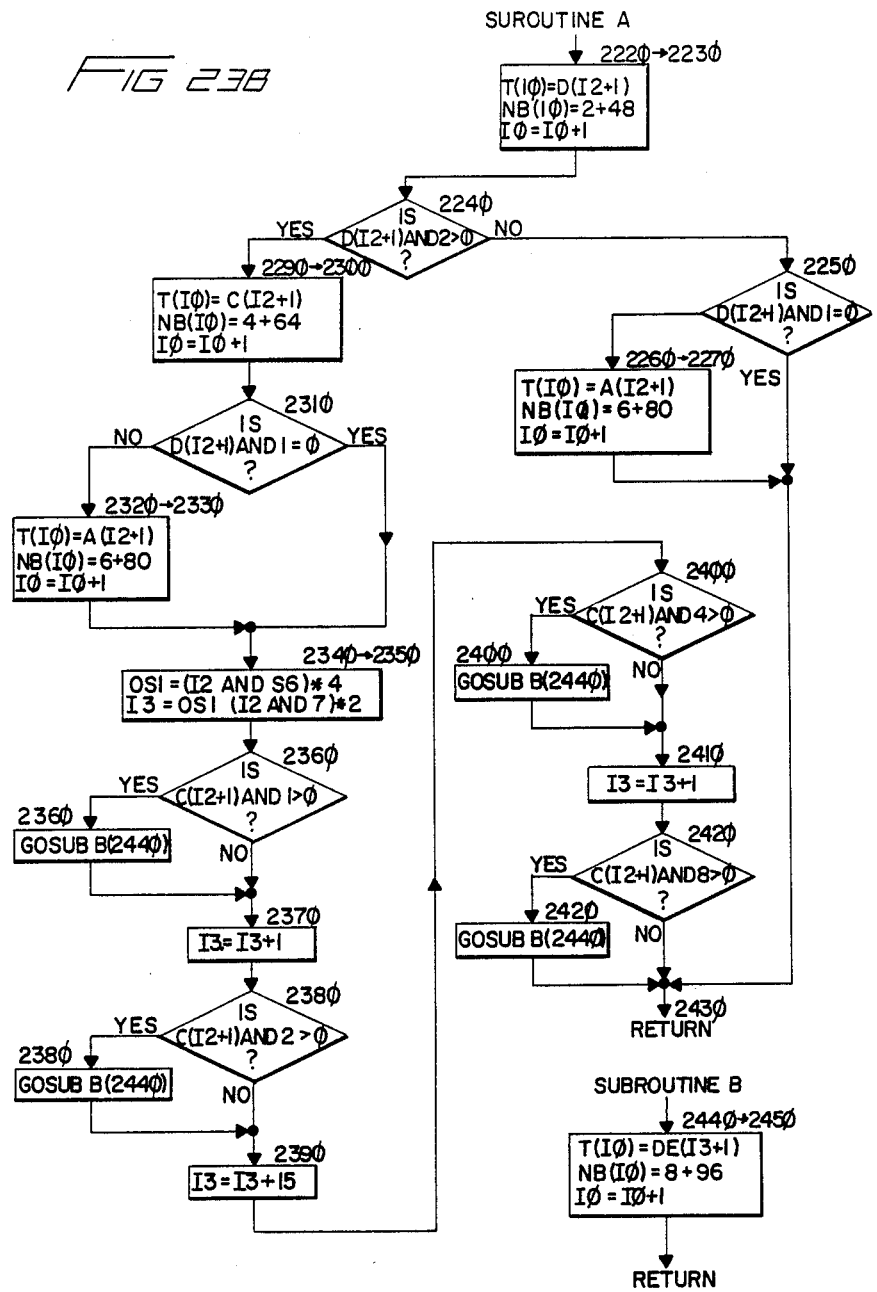

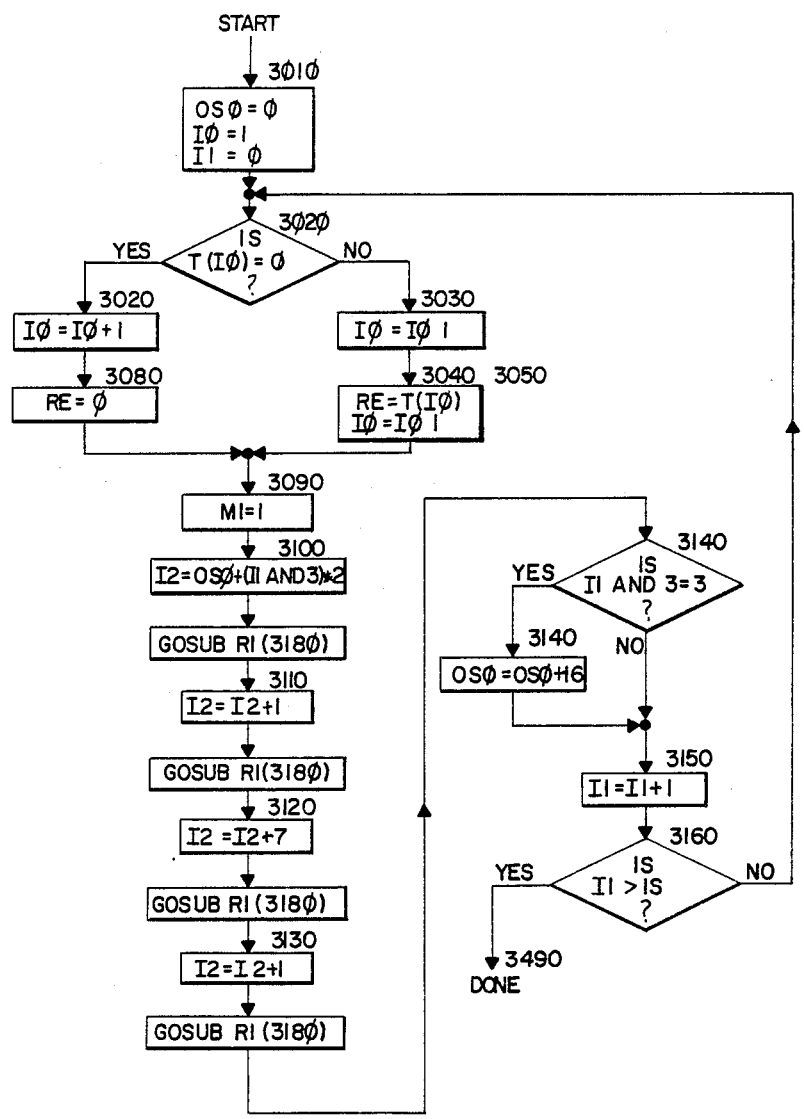

PRIORITY CODING OF TRANSFORM COEFFICIENTS

BACKGROUND OF THE INVENTION

The present invention relates to methods and apparatus for the compression of image data for efficient transmission or storage and the subsequent expansion and reconstruction to a copy of the image in substantially its original form. The invention relates to transmission (or storage) of data for single images, as well as to images which are undergoing changes with time, as in the exemplary case of television images.

In a number of respects the present invention is an improvement over the invention of my U.S. Pat. No. 4,447,886, dated May 8, 1984, and entitled "Triangle and Pyramid Signal Transforms and Apparatus", the entire disclosure of which is hereby expressly incorporated by reference. However, it should be understood that significant aspects of the present invention are equally applicable as improvements to other transform techniques and are not limited to use in combination with the Triangle and Pyramid Transforms of the above-incorporated U.S. Pat. No. 4,447,886.

Image data is conveniently generated by a television camera or suitable scanner such as to provide an electronic video signal which can be converted to digitized samples for compression signal processing. One general compression process for accommodating a fixed rate transmission channel generally involves two distinct processes: (1) A redundancy reduction process, such as a Transform operation, which generates data in the form of transform domain coefficients; and (2) A Coding process wherein the resulting transform domain data is operated on by such processes as thresholding, truncation, variable length coding representation, and prioritization. A feedback path may optionally exist from a rate buffer back to the Coding operation to provide an adaptive feature to limit the quantity of data to accommodate the fixed transmission channel capacity. The present invention relates to primarily to the second of these two, in particular, to Zonal Coding methods for coding (and later recovering) transform domain coefficients resulting from a Transform operation such as, but not limited to, the Pyramid Transform of the above-incorporated U.S. Pat. No. 4,447,886. The invention relates both to coding of single images and to coding of motion images.

Historically motion images have been compressed for transmission by either one of two general types of compression processes: Intra-frame compression or Inter-frame compression. In an Intra-frame process, all of the compression is accomplished within each single image in a sequence of image frames. In an Inter-frame process, all of the compression is accomplished between successive image frames, taking advantage of the fact that certain areas of a motion image often do not change from one frame to the next. More recently, attempts have been made to combine the two general types of compression processes to obtain the advantages of each and, hopefully, an overall greater compression of motion image data.

Difficulties and limitations arise when both general processes are used in combination. First, the overall compression achieved cannot in general be the multiplication of the compression factors achieved by the two processes individually since the redundancy reduction for Intra-frame compression may occur in areas of a motion image which remain the same over successive images and would also be counted as compression in an Inter-frame process.

Second, a difficulty arises with either Adaptive Coding or Zonal Coding where a Transform which must be blocked into a mosaic of sub-blocks is employed as the basic Intra-frame compression instrument. The Adaptive Coding method essentially more roughly codes all transform coefficients which must be sent to effect a change due to motion in the image so as to accommodate the fixed transmission channel capacity. The Zonal Coding method selects only those lower frequency coefficients which can be accommodated by the fixed transmission channel capacity. In either case the edges of the sub-blocks become visible to the observer of the reconstructed image due to the approximations made to accommodate the fixed and limited transmission channel capacity.

Third, when all of the sub-blocks which require change are not changed as fast as the response time of the eye and only a fraction of those requiring change are actually changed, the motion image exhibits spatial warping and un-natural sticking of some of the blocked areas and not others.

An Intra-frame Transform, such as the Pyramid Transform of the above-incorporated U.S. Pat. No. 4,447,886, avoids the artifact appearance of the sub-block edges since it does not require division into sub-blocks for calculation. Thus either Adaptive Coding or Zonal Coding can be performed with the Pyramid Transform coefficients to accommodate a fixed rate transmission channel without generating objectionable blocking artifacts. Moreover, the action required to make the image data generation rate be equal to the fixed channel rate can be made to apply more uniformly over those portions of the image in motion to preclude the warping appearance caused by changing some blocks but not some of their adjacent neighbors which also require change.

It is well known that a human observer is more tolerant, at times to the point of not noticing, of temporary distortion in imagery caused by either Adaptive or Zonal Coding to achieve a fixed transmission rate if all four of the following conditions are satisfied: (1) the distortion occurs uniformly in all of those portions of the image undergoing motion; (2) the distortion continues for only a short time after the motion ceases; (3) the distortion does not leave trailing pieces of previous images; and (4) the distortion does not cause stationary or apparent artifacts. Previous methods have not been able to simultaneously achieve all four of these conditions at relatively low transmission channel capacities in the range of 20,000 to 200,000 bits per second.

The present invention achieves these desired results in part by prioritizing the transform domain coefficient data to be transmitted in such a way that the image viewed at the point of reconstruction appears as quickly and as naturally as possible and, in the case of motion images, changes as quickly and as naturally as possible. The present invention provides means for Transform coefficient prioritization to achieve the aforementioned desired results using Zonal Coding, while providing for operation on a fixed, relatively low bit-rate transmission channel such as in the exemplary range of 20,000 to 200,000 bits per second given above.

It is believed that the description hereinbelow of the present invention will be best understood if read in the context of the disclosure of the above-incorporated U.S. Pat. No. 4,447,886. While reference should be had to that disclosure for a full description of the details, the following is provided by way of summary as an aid to the understanding of the present invention. For convenience, elements of the disclosure of U.S. Pat. No. 4,447,886 are referred to herein employing the terminology "Pyramid Transform" and "Original Mapping Technique".

The Pyramid Transform involves several defined basis functions which operate on input data points P(i). The basis functions are essentially weighting functions such that terms and coefficients (in the transform domain) calculated in accordance with the basis functions are each a particularly weighted average of the values of a selected plurality of input data points. Successive terms and coefficients generated in accordance with each of the defined basis functions are calculated from successive pluralities of the input data points, with overlap of input data points depending on the particular basis function.

The Pyramid Transform is organized into a plurality N of bands or levels. Band N is the highest, and Band 1 the lowest. The bands or levels are significant for two different reasons: (1) Coefficients are output from the transform process for each band; and (2) In the preferred fast calculation methods the bands represent successive stages of calculation. For forward transformation, calculation begins with the highest band, Band N, and works down. For inverse transformation (reconstruction), calculation begins with the lowest band, Band 1, and works up. Results of processing in each band are then employed as inputs for processing in the next lower band until the last band is reached.

A "B-function" is defined which is a weighting function with an envelope shaped as a pyramid for a two-dimensional transform as applies in the case of images. As a simple example of a two-dimensional B-function, the pyramid weighting function is as follows for a three-by-three matrix of input data points to yield a single B-function term:

| 1/16 | 1/8 | 1/16 |
|------|-----|------|
| 1/8  | 1/4 | 1/8  |
| 1/16 | 1/8 | 1/16 |

In actual two-dimensional implementation, a stream of B-function terms for Band 1 are generated and output, with overlap of the input data points contributing to each B-function term for Band 1 such that the beginning data point for each ensuing successive B-function term for Band 1 shifts ahead by $2^N$ input data points in one or the other or both of the two directions of the two-dimensional set of input data points. Each term for Band 1 may be defined as a pyramid-weighted average of the values of a square array of input data points, with each side of the square containing $2^{N+1}-1$ consecutive input data points.

The disclosed implementation of the Pyramid Transform includes a fast calculation technique wherein the B-function terms for Band N only are calculated from actual input sample points. The B-function terms for all lower bands are calculated from the B-terms from the next higher band. Only those from Band 1 are output.

B-function terms alone are not sufficient for reconstruction, and the Pyramid Transform accordingly has a number of additional functions defined, also as weighted averages of selected input data points, for which coefficients are generated and outputted for each band. The number of input data points contributing to each coefficient is the least for Band N, and increases by powers of two for each successive band below Band N. The predetermined functions are selected so as to enable reconstruction of the values of the input data points as a build-up from Band 1 upwards of linear interpolation between B-function terms for Band 1, with departures from linear interpolation being indicated by non-zero coefficients for Bands 1 through N. The build up process begins with Band 1, and works upward through Band N.

For reconstruction (inverse transform) the processes are reversed, and the original data points are determined through algebraic manipulation.

The details of these additional coefficient-generating functions are not repeated herein, and reference should be had to U.S. Pat. No. 4,447,886 for their complete definitions and examples.

A significant aspect and advantage of the Pyramid Transform is the manner in which zero-valued coefficients are treated for efficient transmission, taking advantage of the probabilities of occurrence relationships between various coefficients which result from the finite length of the basis functions and the layering of coefficients in multiple bands. This treatment involves a mapping technique, as disclosed in U.S. Pat. No. 4,447,886, and referred to herein as the "Original Mapping Technique".

The original mapping technique is based on the following: A local length can be associated with each function. In a certain locality a high level of signal activity may produce non-zero value coefficients in multiple bands where the particular basis functions with non-zero values align with this signal activity. If there are gradual edges in the activity only the lower bands may produce non-zero coefficients; if there are steep edges then the higher bands as well as the lower bands will produce non-zero coefficients. Existence of non-zero lower band coefficients does not carry with it a high probability of higher band coefficients; existence of higher band coefficients does, however, carry with it a high probability of the existence of lower band non-zero coefficients in spatially aligned locations. This aspect for naturally occurring image signals is utilized in minimizing the amount of overhead map data which must accompany the non-zero coefficient data for reconstruction purposes.

This original mapping techniques is described in greater detail hereinbelow with particular reference to FIG. 3, inasmuch as certain aspects of the present invention employ the original mapping technique, as well as augmentations and modifications thereof.

SUMMARY OF THE INVENTION

The present invention concerns methods and apparatus for prioritization of transform domain coefficient data representing sources such as, but not limited to, single images and images in motion, so as to produce a data rate not exceeding the capacity of the transmission channel used in transmitting the data to a receiver and to simultaneously minimize the perceived distortion when the image is reconstructed at the receiver. In particular the invention concerns cases wherein the signal from the source has already been coded by a transformation process such as to produce coefficients which have a frequency or sequency property. The term "frequency property" means that the transform domain coefficients for each particular band or level of the transform domain coefficient set are somewhat narrowly confined in a particular range of frequencies, which is different from those of a different band or level. The same can be said of a "sequency property", which applies to transforms like the Hadamard and refers to the number of times the functions cross zero per unit of time.

A first major aspect of the invention is directed to techniques for the transmission of single images. These techniques specifically employ the transform domain coefficient data resulting from the Pyramid Transform of the above-incorporated U.S. Pat. No. 4,447,886.

In overview, these techniques provide a means whereby the Pyramid Transform coefficients produced, for example, by a single image are transmitted over a fixed data rate transmission channel to a receiver at a perceived rate much faster than if the value of each picture element were transmitted in a scanning sequence from, say, upper left to lower right, or if each transform coefficient were transmitted in the same general sequence starting with those representing upper left pixels through those representing bottom right pixels. The method provides for transmission of all of the Band 1 "B" functions first, all the Band 1 coefficients next, the Band 2 coefficients next, and so forth.

The technique in effect involves a sequence of multiple reconstructions of an image at the receiver during the time period required for the transmission of all of the coefficient data representing the image. Whereas the transmission time for instance might be from one-half second for a high data rate transmission channel to ten or more seconds for a lower rate channel, each of the multiple reconstructions can be done as fast as the conventional television refresh rate of 30 frames per second. Initial reconstructed images at the receiver have a complete representation over all of the image area after transmission of the Band 1 "B" functions, at the expense, however, of distortion of a type which causes the signal to lack detail. A subsequent reconstruction of the same image but reconstructed with actual Band 1 "B" functions and Band 1 coefficients contains more detail, and so forth. Since the number of coefficients per Band increases by a factor of four for each higher Band number and half of the coefficients are in the highest Band used in the Transform, a relatively small amount of data (which can be sent very quickly) is all that is required to reconstruct an initial image at the receiver. A viewer can often grasp the image content very early during its transmission and reconstruction. Depending on how high a transmission rate is used, the viewer may believe that the image was transmitted virtually instantaneously, whereas the transmission may have required almost one second.

A second major aspect of the invention is directed to techniques for the transmission of transform domain coefficients for an image which is undergoing change with time, such as with motion imagery. A configuration of a transmitter and receiver is used wherein identical transform coefficient models are maintained at both locations and the transmitter identifies transform coefficient changes necessary to cause a transform coefficient model to completely represent the most current image, prioritizes the change data, and selects a subset of said change data consistent with the limitation of the fixed rate transmission channel being used for communication. The transmitter transmits the change data subset to the receiver, and also replenishes the transmitter transform coefficient model with the same change data subset so as to identically replenish both the receiver and the transmitte coefficient model memories.

In the particular embodiments described herein, the original mapping technique disclosed in U.S. Pat. No. 4,447,886 for communicating those transform coefficients which are being sent to the receiver (generally only the non-zero value coefficients are transmitted) is augmented by another mapping technique referred to herein as a "Change Map". The Change Map serves to indicate the locations where transform coefficients in the maintained models must be changed to effect a change in the reconstructed image. Transmission efficiency results from this method since coefficients not requiring change need not be transmitted in the course of updating an image. Thus, only the Change Map and its associated change coefficients are actually transmitted. The transform coefficient models are identically maintained at the transmitter and receiver, but are not actually transmitted per se once operation is underway.

The transform coefficient models include "expectation" markers which contribute significantly to the efficiency of the system. Although not necessary, advantageously the transform coefficient models maintained at the transmitter and receiver are maintained employing map words and associated coefficients, which primarily are the non-zero valued coefficients, although in some cases it is better to include a few zero valued coefficients in the models. These transform coefficient models are also based on the same general organization as the original mapping technique of U.S. Pat. No. 4,447,886. When this general map organization is employed, the "expectation" markers are included as an augmentation thereof.

With regard to the mapping techniques and the corresponding transform domain coefficient data structures employed herein, it may be noted that the mapping techniques and coefficient data structures are in the form of a hierarchical data structure, which can be visualized as a succession of an increasing number of possible branches as a coefficient map proceeds from Band 1 upward to the highest band, Band N. The Pyramid transform also possesses a hierarchical data structure and hence, this mapping technique and the Pyramid Transform can readily be used directly together. There are other transforms such as the Discrete Cosine Transform and the Hadamard Transform, as examples, which do not directly employ the same hierarchical data structures as part of their calculation method. Nevertheless, the transform domain coefficients of, these other transforms can have their coefficients subdivided into a plurality of bands, wherein each band contains one or more adjacent frequency (or, in the case of some other transforms, one or more adjacent sequency) coefficients in a predetermined grouping. The resulting predetermined bands are equivalent to zones of frequency or sequency, and the process of subdividing coefficients by zones for selective use for transmission or storage is conventionally known as Zonal Coding.

Once the transform domain coefficients of a Transform are divided into the predetermined bands, also called zones, the mapping techniques of this invention can be directly and readily applied to transforms other than the Pyramid Transform as well. Thus, the term "band" as employed herein is intended to include "zone" as that term is conventionally employed in the particular context of transforms such as Discrete Cosine and Hadamard.

While the transform model maps advantageously employ a number of map components for various signalling purposes, important ones insofar as the present invention is concerned are existence words and the expectation markers, both of which are conditionally present. The purpose of the existence words is to indicate which further branches, if any, are present. The purpose of the expectation markers is to indicate whether changes in coefficient or map data at a particular band are expected in a subsequent file period. The expectation markers are generated by the means which maintains the transform coefficient model memory maps as follows: An expectation marker is generated at a particular band when an existence word in the preceeding lower band points to the particular band, but data for the particular band does not arrive during the same file period as the proceeding band existence word.

The "expectation" markers result in additional efficiency under the condition when all of the coefficients which have changed cannot be transmitted in a certain transmission interval due to the limited and fixed transmission channel capacity. Thus, the "Expectation" markers created at the receiver mark where further map data and coefficients are expected but not yet received. Said further map data and coefficients may later be transmitted to satisfy said Expectations without re-transmitting accompanying lower band map data to direct their placement.

"Blanking" is an important technique of the invention which is facilitated by and employed in combination with the Expectation markers. Blanking eliminates the visual effects of the presence of no longer valid coefficients in higher bands which may remain at the receiver for a period of time until data can be transmitted via the limited rate transmission channel to change these no longer valid coefficients.

Blanking is effected by substituting, at least temporarily, in the output transform domain coefficient data stream to the reconstruction transformer at the receiver a zero value coefficient at a reconstruction transform processing location where an Expectation marker has been placed. Zero value coefficients are also substituted for all locations in successively branched higher bands. In the case of transforms such as the Pyramid Transforms which themselves are organized in a hierarchical manner, the successively branched higher bands correspond to spatially aligned areas of all of the higher bands. Thus the overall result is that the receiver reconstruction transformer receives a value of zero for all coefficients for which changes are expected or are conditionally expected on the basis of expectation markers, even if the transform coefficient model at the receiver,- contains non-zero values for the coefficients. (The actual maps and coefficients in these areas where Blanking has substituted values of zero are not discarded at the receiver since the data which will later satisfy the Expectation may in part be the map and coefficient data previously held by the receiver and hence not require re-transmission.)

The significant visual effects of performing the Blanking operation at the receiver are to reduce the resolution around the edges of those objects in motion and to remove all remnants of previous images which are no longer valid.

As noted above, the Change Map technique of this invention is a means for efficient signalling from the transmitter to the receiver. Considering this technique in greater detail, at the transmitter there is a change identifier which compares coefficient data from the most recent image transform operation with coefficient data from said transmitter coefficient memory, and generates the Change Map and coefficients, which represent the difference between the two. A prioritization process is effected by suitable means at the transmitter to select from the generated Change Map and coefficients those which can be accommodated by the particular transmission channel capacity being employed. The subset of Change Map and coefficients selected as a result of the prioritization process is (1) used to selectively modify the transmitter transform coefficient model and (2) transmitted to the receiver and therein used to selectively modify the receiver transform coefficient model. Thus identical transform coefficient models are maintained in the receiver and transmitter memory systems by suitable means for such maintaining. This selective modification process at the receiver may be performed coincident with a transform coefficient reconstruction used to furnish the reconstruction transformer with coefficients to reconstruct an image. In some applications said process may also be performed independently of a transform coefficient reconstruction for image generation.

While the Change Map has a number of components, a particularly important one is herein termed a change existence word. These in general serve to indicate types of changes, if any, which are to be made to coefficients or map components in a higher band.

In addition to the general advantages of Change Map signalling, certain techniques of the invention result in even more efficient transmission of two particular types of changes which can be indicated by the change existence word: (1) Those which cause previously non-zero value coefficients to become zero value ones ("Erase"); and (2) Those which cause Expectation markers which are no longer required to be removed ("Cancel").

In particular, the "Erase" signalling technique removes the need in several instances to transmit a Change data word for each non-zero value coefficient which is to subsequently have a value of zero. When the Erase condition is indicated, coefficients in the transform domain coefficient models are changed to zero for all successively branched higher bands. The efficiency accrues when a single Erase command changes a plurality of coefficients from non-zero values to the value of zero.

An important companion technique involves the transmission of the "Cancel" command which can remove one or more Expectations previously created but not yet satisfied and now no longer required. In particular, when the Cancel condition is indicated, the expectation markers are removed from the transform coefficient models for all successively branched higher bands. This situation can occur, for example, when some object moves in front of a stationary background sufficiently rapidly such that all of the higher band coefficients associated with the moving object cannot be transmitted via the fixed and limited rate transmission channel. Thus the lower band existence words set up expectation markers. The higher band coefficients associated with the background are retained in the coefficient model, but, in view of the expectation markers, are blanked by the aforementioned Blanking method so they are not employed in the reconstruction transform. When the object has moved on, the Expectations created by the temporary presence of the moving object in front of said background need only be cancelled, usually as a group of several Expectations, to reinstate the higher band coefficients associated with the background in the image at the receiver. (The aforementioned "Erase" command also removes said Expectations.)

An Existence word as described in the original mapping technique of U.S. Pat. No. 4,447,886 including four bits to indicate the existence or absence of four groups of next higher band map and coefficient data must be expanded to a Change existence word of eight bits in general to include for each of the four spatially aligned higher band blocks the four possible signalling messages of No Change, Change, Cancel or Erase. However, each of the four two-bit representations can be reduced to one bit, which signals only the two messages of No Change or Change, in all situations where the successively branched (e.g., spatially aligned) higher bands at the receiver presently contain no map or coefficient data, representing the case where all coefficients included in said successively branched higher bands have values of zero. The additional map overhead due to the Cancel and Erase functions is therefore only incurred in cases where it has the potential of increasing the signalling efficiency and not in any case which has no potential to benefit.

Change Existence words can additionally be entropy encoded via the well known Huffman technique to increase further the efficiency of transmission of these words based on the statistical distribution of the occurrence of the four possible types, namely: (1) the "Change" word; (2) the "No Change" word; (3) the "Cancel" word; and (4) the "Erase" word.

Similarly, it will be appreciated that the transform domain coefficients, when transmitted from the transmitter to the receiver, can be encoded using entropy encoding and the Huffman techniques for determining them by taking advantage of the statistical distribution of their amplitudes whose maximum number is centered at the coefficient value of zero and whose probability of occurrence decreases very rapidly with increasing positive and with increasing negative coefficient amplitudes. Such encoding of transform coefficients is also described in U.S. Pat. No. 4,447,886.

The lowest frequency components of the Pyramid Transform, as described in U.S. Pat. No. 4,447,886 are the Band 1 B-functions. In most other transforms the lowest frequency components are the d.c., or equivalently the average value, of each block of a blocked transform, of the plurality of blocks formed for two-dimensional image compression. For either of the above two cases additional efficiency of transmission can be achieved by forming descriptors for transmission of these lowest frequency components of a transform, rather than the components themselves, based upon a prediction of their values relative to their nearest previously specified neighbors.

In particular, at both transmitter and the receiver, preliminary prediction is made of the value of all but one, or at the most a few, values of those lowest-band components by consideration of those lowest frequency descriptors already transmitted and the lowest frequency components already determined at the receiver. A descriptor is actually transmitted which is the difference between the actual component and the predicted value of the component identically calculated at both transmitter and receiver.

It is to be expected in the case of naturally occurring images that the lowest frequency transform domain components are based on spatially adjacent areas of the image and will have values which are numerically similar to each other. Thus the coding summarized immediately above takes advantage of this natural correlation between adjacent lowest frequency terms to reduce, on the average, the quantity of data necessary for their transmission. Considering for example the descriptors formed based on B-function terms of the Pyramid transform, the statistical distribution of these particular descriptors has a maximum value which is centered at a value of zero and has a probability distribution whose value decreases rapidly with either increasing positive or negative amplitudes. Thus entropy coding of the resulting descriptors resulting in variable length codes can more efficiently represent the actual data than can the direct B-function, or in the case of other transforms the average values. The coded values of the descriptors can be directly determined through application of the well-known Huffman coding technique.

In addition, a map coding technique, similar to that used and described for signalling coefficient changes, is employed for efficient signalling of which Band 1 B-functions are to be changed and subsequently which branches of coefficients are to be changed for a system in which selected portions of an image change with time.

It will be appreciated that the signalling techniques of this invention, including the aforementioned map techniques of "Change", "Cancel", and "Erase" and the techniques of "Expectation" markers, and "Blanking", can be applied to systems using signal transformations other than the Triangle and Pyramid Transforms, such as, but not limited to, the Cosine, Walsh-Hadamard and Haar Transforms and the technique described by S. Tanimoto and T. Pavlidis in "A Hierarchical Data Structure for Picture Processing", *Computer Graphics and Image Processing*, Vol. 4, pp. 104–119 (1975).

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 8A depicts the mapping technique used at the transmitter and at the receiver for maintaining transform coefficient models, including expectation markers for indicating whether data is expected;

FIG. 8B depicts the change mapping technique for the signalling between transmitter and receiver of changes to be made in a motion image system;

FIGS. 13A, 13B, and 13C are flow charts for the programming of the Effective Contents Processor PROM of FIG. 11 for performing the hierarchical determination of a combinatorial output state, given various input states;

FIG. 14B is a flow chart for the programming of the Input Status Processor PROM of FIG. 11;

FIGS. 15B and 15C are flow charts for the programming of the FIG. 11 Output Status Processor PROM;

FIG. 16A is a detailed block diagram of the FIG. 9 Change Model Reconstructor at the transmitter;

FIG. 16B is a detailed block diagram of the FIG. 9 Replenishment Processor used both at the transmitter and the receiver;

FIGS. 17A and 17B are flow charts for the programming of the FIG. 16A Map Reconstruction PROM which generates the correct commands to read a Change Directory, Change Contents words and Change Existence words for Selective Replenishment Processing;

FIG. 17D is a flow chart for the programming of the FIG. 16A Existence word compression PROM at the transmitter;

FIG. 17F is a flow chart for the programming of a PROM which generates the correct Expectation bit for Selective Replenishment processing and also the Blanking bit when this PROM is also used at the receiver;

FIG. 18A is a block diagram showing additional detail of the Change Reconstructor at the receiver;

FIG. 19A is a flow chart for the programming of the FIG. 18B Receiver Map Reconstruction PROM;

FIG. 19B is a flow chart for the programming of the FIG. 18B Directory, Contents and Existence Number of Bits PROM;

FIG. 19C is a flow chart for the programming of the FIG. 19B Existence decoding PROM;

FIG. 20A depicts the Map technique for Band 0 which signals Band 1 B-functions and Band 0 Existence words associated with coefficient processing, and for the Sub-Band which efficiently signals the existence of changes in Band 0;

FIG. 20B shows a serial data stream which is generated by the example of FIG. 20A;

FIG. 20C shows the organization of the Band 1 B-functions for purposes of calculation of Descriptors at the transmitter and reconstruction of Band 1 B-functions at the receiver to effect more efficient signalling between the two;

FIGS. 22A and 22B are detailed flow charts for the first part of the computer program which performs the operations of Sub-band coding and B-function change identification and B-function Descriptor coding;

FIGS. 22C and 22D are detailed flow charts for the second part of the computer program to code the Band 0 Directories and Sub-band Existence words;

FIGS. 23A and 23B are detailed flow charts for the compression of the Sub-band coding data previously generated and organization of said data for transmission; and FIGS. 24A, 24B and 24C are detailed flow charts for the expansion and reconstruction of Sub-band coding and Band 1 B-functions at the receiver from the transmitted compressed data.

DETAILED DESCRIPTION OF THE INVENTION

I. Overview of Transmission Process

Figure 1:
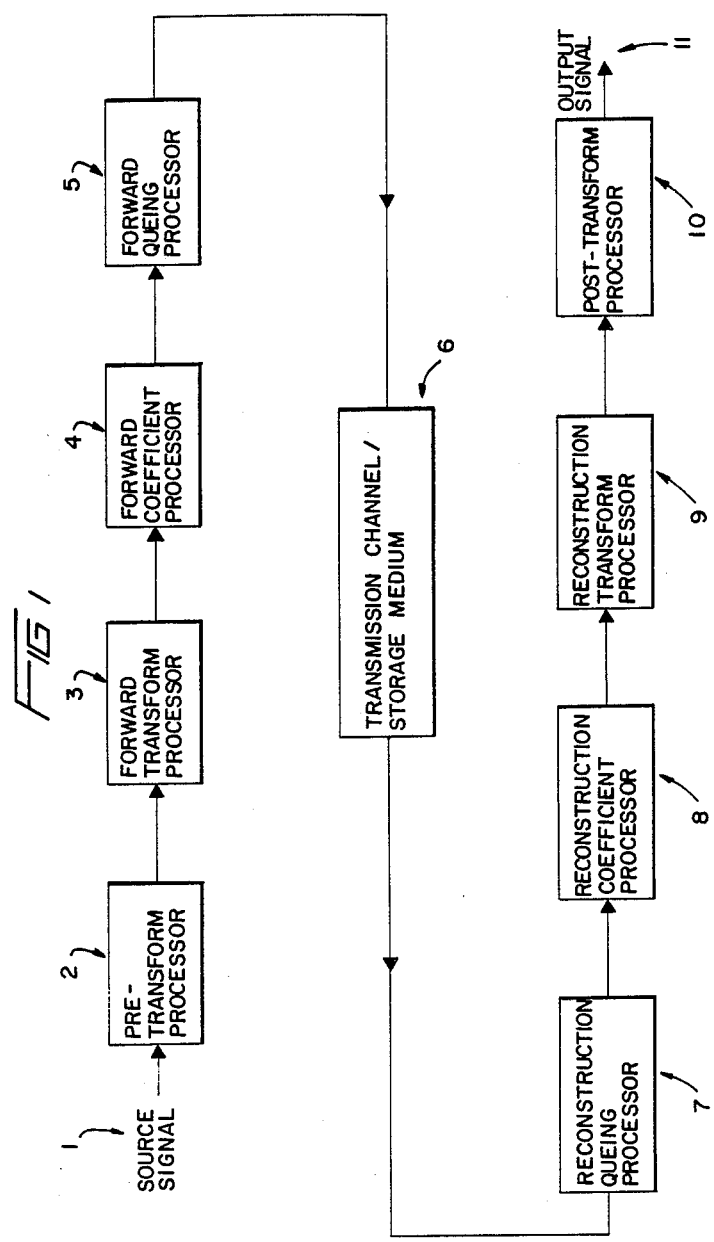
FIG. 1 is a generalized block diagram representation of transformation and subsequent coding processes used to compress data for efficient transmission or storage, or both, and to reconstruct a close copy of the original data from the received compressed data at a receiver location.

Referring first to FIG. 1, shown is a block diagram representation, in overview, of processes performed in transmitting a source signal 1 to the location of the output signal 11 while minimizing the data and/or the data rate passing through the Transmission Channel/Storage Medium 6. The present invention provides means for performing this overall operation while at the same time minimizing the perceived distortion of the output signal 11 relative to the source signal 1.

Considering briefly the specific elements of FIG. 1, the purpose of the Forward Transform Processor 3 is to remove intraframe redundancies contained in the source signal 1 to effect a reduction in data needed to represent said signal. Reconstruction Transform Processor 9 has the purpose of reconstructing the original signal from the transform representation of said signal. Operation of these transform processes is described in detail in the above incorporated U.S. Pat. No. 4,447,886 and is summarized hereinabove. These transform processes are not the direct subject of the present invention, although the present invention presumes their usage in the system.

The present invention concerns the Forward Coefficient Processor 4, the Forward Queuing Processor 5 and the Reconstruction Queuing Processor 7 and the Reconstruction Coefficient Processor 8.

An important aspect of the present invention is the inclusion of time in the criteria for minimization of perceived distortion. A consequence of this is that a signal undergoes a perceived uniform time delay in being transmitted from Signal Source 1 to the location of Output Signal 11 despite the nature of signal change and despite the limitation of data rate imposed by Transmission Channel/Storage Medium 6 of FIG. 1. Thus distortion necessarily occurs sometimes, but always in a manner such that the Output Signal 11 degrades in a graceful manner as determined by a human observer.

The Pre-Transform Processor 2 has the purpose of conditioning the Source Signal 1 prior to the operations of the Forward Transform Processor 3. Such operations can include,, but are not limited to, Analog to Digital Conversion and non-linear pre-emphasis to equalize the effects of quantization later in the Forward Coefficient Processor 4. These processes are well known in the compression of video signals. The Post-Transform Processor 10 generally performs the reverse process of Pre-Transform Processor 2 to generate the Output Signal 11.

Figure 2:
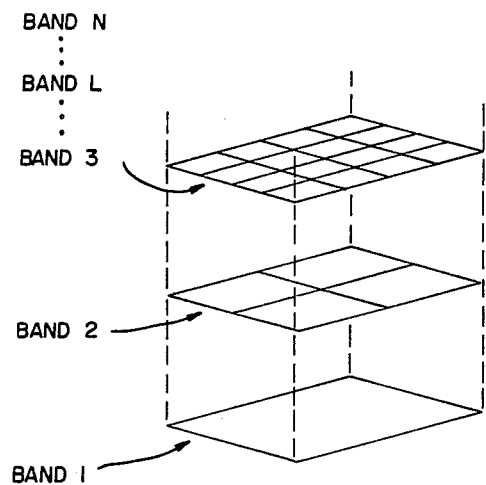
FIG. 2 is a representation of the footprints of transform coefficients upon an image signal space in multiple bands of a hierarchical data structure such as is employed by the Pyramid Transform and shows the spatial alignment of these coefficients between bands.

FIG. 2 shows the footprints of coefficients relative to the data of the original signal contained in Bands 1 through N and the spatially overlapping nature of said coefficients in the multiple bands. Said footprints are shown for clarity within a band as mutually exclusive areas. Such is the case in the example of the following literature reference: S. Tanimoto and T. Pavlidis, "A Hierarchical Data Structure for Picture Processing", *Computer Grapics and Image Processing*, Vol. 4, pages 104–119 (1975).

Adjacent footprints for the Pyramid Transform, however, have a partially overlapping area in common. For this latter case the squares in FIG. 2 represent the central portion of the footprints of a small group of coefficients in a single band. For each such small group of coefficients represented by one square in a band "L", where "L" is equal to or greater than one and equal to or less than $N-1$, there exist four overlapping squares in band $L+1$. The coefficients in the four squares in band $L+1$ are defined as spatially overlapping those in the one said square of band L. They are equivalently defined as spatially aligned. Although a single square footprint is shown in FIG. 2, it will be appreciated that multiple band 1 footprints are possible, each having four different spatially aligned footprints in band 2, 16 in band 3, and so forth up to band N.

Figure 3:
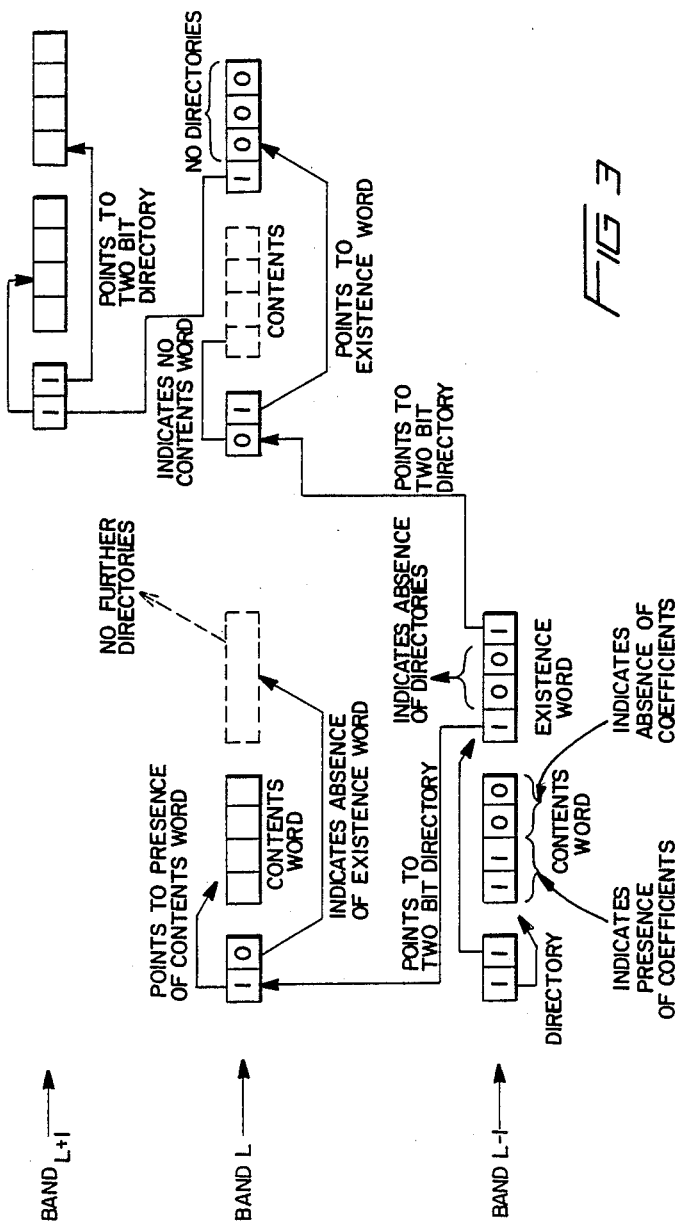
FIG. 3 depicts the original mapping technique as disclosed in U.S. Pat. No. 4,447,886 for signalling the presence and location of primarily non-zero value transform domain coefficients for efficient storage in memory or transmission in compressed form such that primarily non-zero value transform coefficients need be stored or transmitted to provide for complete data reconstruction by an inverse transformation operation.

FIG. 3 depicts the original mapping technique as disclosed in the above-incorporated U.S. Pat. No. 4,447,886 (FIG. 18 therein) for signalling the receiver where to insert the transmitted non-zero coefficients, and by inference the zero value coefficients, into a transform reconstruction. The technique provides both visibility and efficiency. Visibility refers to the ability of the reconstruction coefficient processor to uniquely determine the location in the reconstruction transform for each coefficient received by the transmitter. The visibility criterion, however, is more difficult to provide and to validate since the signalling methods disclosed herein become more sophisticated. The aforementioned efficiency is realized by a tree structure which takes advantage of natural spatial alignment of non-zero valued coefficients between bands for signals from naturally occurring image sources and does not require continuation of branches in higher bands where zero value coefficients exist.

While reference should be had to U.S. Pat. No. 4,447,886 for a more detailed description of the original mapping technique, several of its features and underlying principles will now be summarized.

Data compression is realized in part because only non-zero transform domain coefficients are transmitted, or stored, together with their respective locations in the transform coefficient model. Zero valued coefficients can accordingly be inferred.

For this original mapping technique to work to the best advantage, the underlying transform should have certain characteristics. The Pyramid Transform has these characteristics, but there are other transforms which do as well. Primarily, the underlying transform should be a hierarchical transform system employing finite duration basis functions with subdivisions of basis functions (and coefficients) by predetermined factors when going to each higher band (or level). This results in a natural spatial alignmen,t from one band to the next of non-zero coefficients (and thus, by inference, of zero valued coefficients). A tree structure may be envisioned where a trunk starts in Band 1. Each higher band has branches which have the coefficients (four branches per band in the two-dimensional case). Branches need not be continued into higher bands where the coefficients are all zero.

In this context, existence of non-zero higher band coefficients carries with it a high probability of existence of non-zero lower band coefficients in spatially aligned locations. (The converse is not true.) A consequence of this is that a branch with all zero coefficients can be allowed to die (necessarily precluding the existence of "would-be" further branches in higher bands) with a low probability that any higher band non-zero coefficients will in fact be lost. A component of the map, exists for each branch which actually exists (i.e., has non-zero coefficients). Components of the map can be referred to as "map words".

In the two dimensional case of the Pyramid Transform, for example, there preferably (but not necessarily) are three such trees for each Band 1 processing block, corresponding to three types of two-dimensional coefficients: (1) those that reflect activity in the first dimension but are affected only by an averaged value of activity in the second dimension; (2) those affected by activity in the second but only by an averaged value in the first dimension; and (3) those affected only if there is activity in both dimensions. These may be summarized as respectively indicating the presence of horizontal, vertical and diagonal events.

In the original mapping technique as depicted herein in FIG. 3, each existing component has three elements (three "map words") as follows:

(1) A "directory, word" having two bits. These two bits indicate the presence or absence of a respectively associated "contents word" and "existence word".

(2) The "contents word" (if present) has a number of bits corresponding to the number of branches (corresponding to coefficients) per band. Thus, the contents word has four bits in the two-dimensional case. The bits of the "contents word" (if present) in turn indicate whether the respective corresponding coefficients are non-zero and thus will be transmitted. The "contents word" is present (and indicated to be present by the corresponding bit in the "directory word") if any of the four coefficients of the particular branch and band are non-zero.

(3) The "existence word" (if present) also has a number of bits corresponding to the number of branches per band. Thus there are four bits in the two-dimensional case. The bits of the "existence word" (if present) indicate the presence or absence of two or four respective further branches into the next higher band or level, (which branches present only if there are further non-zero coefficients). The "existence word" is present (and indicated to be present by the corresponding bit in the "directory word") if any of the two or four bits of the "existence word" are non-zero. Thus there is an "existence word" if there are any further branches.

Hereinbelow, various usages, augmentations, and modifications of this original mapping technique are described.

II. Priority Coding for Progressive Reconstruction of Single Images

A first major aspect of the invention relates to techniques for the transmission of Pyramid Transform components, including Band 1 B-functions, coefficients and associated mapping components for a single input image via a limited data rate transmission channel to effect the desirable result that a version of the entire image is reconstructed and presented for view at the receiver in a small fraction of the time necessary to transmit all of the Pyramid Transform data required to totally represent the original image. The transmission channel capacity is herein assumed to be limited such that an image cannot be transmitted to a receiver in the time taken by the receiver to scan the display screen one time. In present commercial broadcast practice in the United States this is one-thirtieth of a second. The first reconstruction of the image at the receiver using only a small fraction of the data results in distortion characterized by loss of image detail. As further Pyramid Transform data is received subsequent reconstructions are performed resulting in an image with less distortion and increased detail. To effect this result, all of the Band 1 B-functions, the coefficients and the map components generated by the Pyramid Transform, as described in U.S. Pat. No. 4,447,886 in response to the original image, are first ordered from lowest to highest Band number. Reordering is necessary since the natural order of data generation when using the "fast" calculation method of the Pyramid Transform results in a considerable mixture of coefficients from all of the bands.

Next, the order of transmission of data resulting from the Transform of the image commences with the Band 1 B-function terms, followed next by the non-zero value Band 1 coefficients, then by the Band 2 non-zero value coefficients, and so forth, until all non-zero value coefficients in Band N, where Band N is the highest band used in the Pyramid Transform process, are transmitted., Mapping components are transmitted on an interleaved basis with the Pyramid Transform B-functions and coefficients only as soon as necessary to direct the receiver as to the placement of said data in the image reconstruction.

In the process of reconstruction at the receiver, all coefficients which have not yet been received or which are inferred to be zero by the map components which have already been received are given a value of zero. When further transmission has taken place a subset of these previously assumed zero value coefficients will subsequently have non-zero values. This temporary assumption of zero value for coefficients which later are known at the receiver to be non-zero values leads to the distortion in the reconstructed image during the early portion of transmission, yet conveys the general overall image content to an observer at the receiver in a small fraction of the time required to transmit all of the Pyramid Transform data representing the original image.

Figure 4:
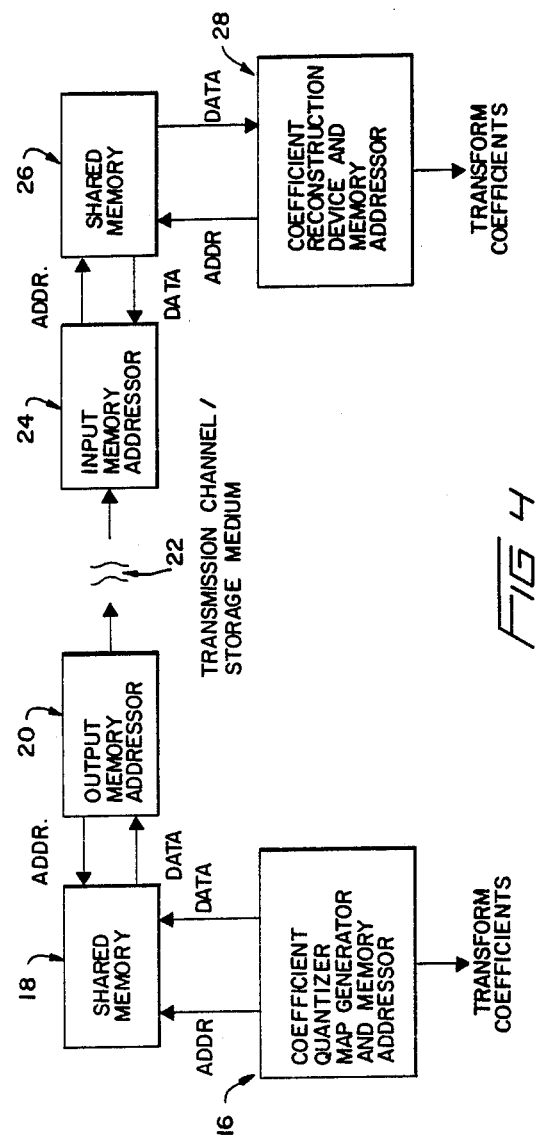
FIG. 4 is an expansion of portions of the block diagram of FIG. 1 and depicts elements for progressive reconstruction of an image as data is received.

With reference now to FIG. 4, the blocks 16, 18, and 20 show in more detail the generic operations of blocks 4 and 5 of FIG. 1 when progressive and reconstruction of single images is being performed. Transform coefficients from the Pyramid Transform are provided to the Coefficient Quantizer, Map Generator and Memory Addresser 16 which quantizes the coefficients to a degree to obtain the highest efficiency possible (but consistent with sufficient fidelity) to later acceptably reconstruct an image at the receiver. A map is generated in accordance with the procedure shown in FIG. 3 and described in U.S. Pat. No. 4,447,886, and then both the non-zero value coefficients and the map are stored in the Shared Memory 18. The Shared Memory 18 is divided into separate sections, one section each for each Band of coefficients and map, and one section for the Band 1 B-functions and map. Within each memory section, map components and non-zero value coefficients are placed in a pre-determined order. One example of ordering is from upper left to lower right of the original image. It will be appreciated, however, that the sequence in which transform coefficients are entered into the various sections may vary according to the particular sequence in which the forward transform is performed.

The Output Memory Addresser 20 of FIG. 4 fetches the map and coefficient data in the predetermined order which commences with the memory section holding the Band 1 B-functions and map components and transmits them to the FIG. 1 Transmission Channel/Storage Medium 22. After the active contents of that section holding said Band 1 B-functions and map components have all been transmitted, that section of Shared Memory 18 holding Band 1 coefficients and associated map components is next transmitted in sequence until complete. Next, the Band 2 coefficients and associated map components are transmitted and so forth.

Blocks 24, 26 and 28 of FIG. 4 show in more detail the generic operations of blocks 7 and 8 of FIG. 1. The coefficients and map components are received from the Transmission Channel/Storage Medium 22 by the Input Memory Addresser 24 which in turn places them in Shared Memory 26 in the same order as they existed in Shared Memory 18. The Coefficient Reconstruction Device and Memory Addresser 28 fetches the data from Shared Memory 26 and inserts zero value coefficients where required and issues transform coefficients to the following Reconstruction Transformer.

The desired outcome at the receiver display is to achieve an image at each scan of the display device which incorporates all of the data available from the transmission channel 22 at the time of the scan. The values of the transform coefficients not yet received are all given the value of zero until either a non-zero value is received or a zero value is inferred from the map information. To achieve this desired outcome it is necessary to, in effect, perform many reconstructions, each incorporating some additional data arriving from the Transmission Channel/Storage Medium 22. There may be several hundred scans over the time period required to complete the data transmission.

There are at least two approaches to implementing this desired outcome at the receiver. A first technique or approach is to continuously perform a reconstruction in real time using, at any point in time, the received data then available. To accomplish this, the "fast" Pyramid reconstruction transformer of U.S. Pat. No. 4,447,886 can be employed. However, there is a second technique which has advantages particular to reconstruction of single images over a period of several seconds.

This second technique for implementing the aforementioned desired outcome at the receiver for single images involves operation of the reconstruction devices at a rate commensurate with the rate of arrival of data from Transmission Channel/Storage Medium 22 rather than with the scan rate of a receiver display device. This is very important since the slower reconstruction requirements can lead to much less costly hardware required for implementation. For example, an efficiently programmed state-of-the-art sixteen bit microprocessor can perform the reconstruction transform calculations of a full resolution television frame in less than twenty seconds.

Figure 5:
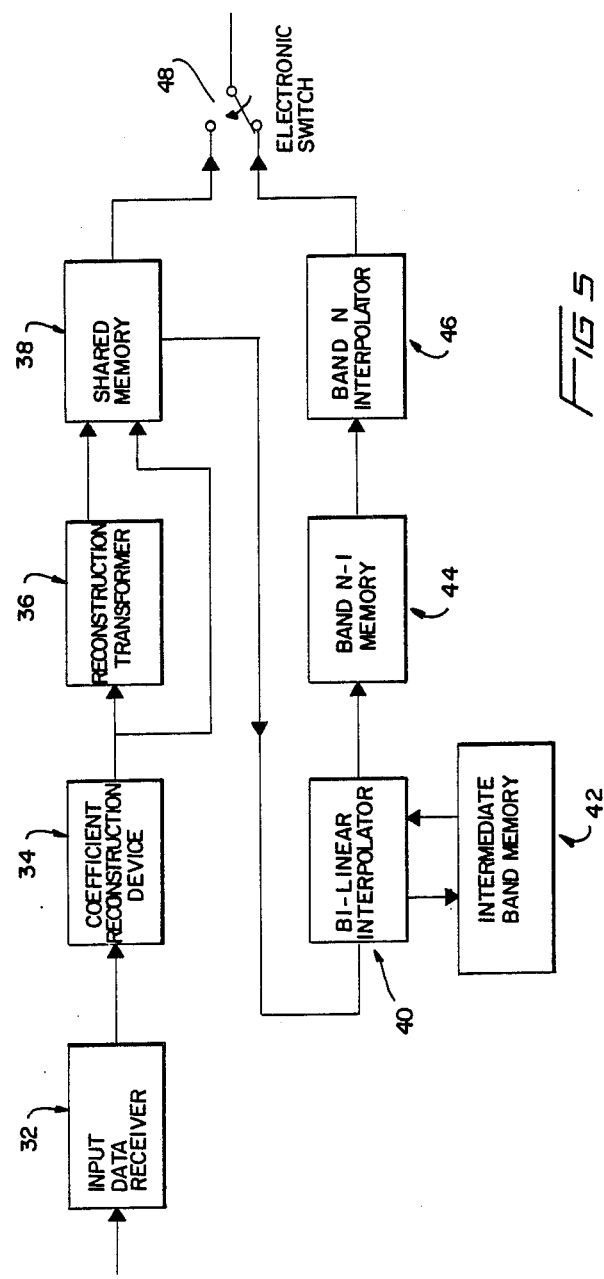
FIG. 5 is a detailed block diagram of a system for progressive image reconstruction using a low cost reconstruction transformer device in conjunction with a real-time bi-linear interpolator device.

Considering this second technique in detail, FIG. 5 shows a reconstruction system where Input Data Receiver 32 receives data, from a transmission channel over a period of time many times longer than the time taken to scan a receiver display device. The Coefficient Reconstruction Device 34 receives the data a single time without being buffered by or requiring the Shared Memory 26 of FIG. 4. The Coefficient Reconstruction Device 34 in FIG. 5 inserts the zero value coefficients as indicated by the map and provides a complete set of coefficients to the Reconstruction Transformer 36 over the period of time data is received at Receiver 32. The coefficient data is ordered as it was previously: Band 1 B-functions first, Band 1 coefficients next, Band 2 coefficients next and so on with the Band N coefficients last.

In the following discussion reference is made to Band 1 pixels, Band 2 pixels, Band 3 pixels and so forth. This terminology is employed as a matter of convenience on the basis that the B-functions for each Band represent a coarsely spatially quantized replica of the actual input pixels, the degree of coarseness depending on the particular band. Thus the term Band 1 pixels is employed to represent Band 1 B-functions. Pixels in bands higher than Band 1 represent intermediate Band B-functions of the same band calculated in the process of calculating a forward or reconstruction Pyramid transform.

In the technique of FIG. 5, the Band 1 B-functions are supplied directly from Device 34 to Shared Memory 38. Next the Reconstruction Transformer 36 calculates Band 2 pixels using the Band 1 B-functions and the Band 1 coefficients from Device 34 as disclosed in U.S. Pat. No. 4,447,886 and stores them in Shared Memory 38. In sequence as data becomes available, Band 3 pixels are calculated and so forth.

To obtain output picture elements for the display device, a succession of bi-linear interpolations operating in synchronism with the scanning of the display is employed to complete an image reconstruction starting with intermediate Band pixels as calculated by Reconstruction Transformer 36 commensurate with that portion of the coefficient data presently received at 32 or, in the case of reception of only the Band 1 B-functions at 32, those Band 1 B-functions themselves. In the reconstruction operation of the Pyramid Transform the natural calculation of pixels at a Band, say Band "L", under the condition that the coefficient values are zero, or must be assumed zero since actual values have not been received, is to bi-linearly interpolate them from the Band "L−1" pixels. Thus the bi-linear interpolation process provides the exact same reconstruction function as the reconstruction transformer under the condition that all coefficient values are taken as zero.

Considering the operation of FIG. 5, the sequence commences at the time all of the Band 1 B-functions have been received. These data values are supplied by Coefficient Reconstruction Device 34 to both the Reconstruction Transformer 36 and the Shared Memory 38. At this time Band 2 pixels have not been calculated by Reconstruction Transformer 36 since no Band 1 coefficients have yet been received. The Band 1 pixels are supplied to Bi-linear Interpolator 40 which calculates Band 2 pixels and stores them in Intermediate Band Memory 42. Since the bi-linear interpolation process works in synchronism with the image display device and is capable of sequentially interpolating pixels from as low as Band 1 in real time, it is necessary to store in Memory 42 only a small percentage of the total calculation results for an entire image. Only those interpolated results pertaining to the portion of the image to be scanned at the moment must be stored. Those portions not yet to be displayed are not calculated until close to the time they are to be displayed; those portions already calculated and displayed are discarded and their locations in Memory written over with new results. Two rows of pixels for each Band are calculated by Interpolator 40, and stored in Memory 42 at any given time. After Band 2 pixels have been bi-linearly interpolated from Band 1 pixels Band 3 pixels are bi-linearly interpolated from Band 2 pixels, and so forth in a N-Band system up to Band N−1 pixels. The Band N−1 pixels are stored in a separate location, Memory 44. The final bi-linear interpolation process is performed by Interpolator 46 which acts to provide pixels to a two-to-one interlaced display device (not shown). The interlaced display device requires that pixels for odd-numbered rows be provided during the scan of one field, and that pixels for even-numbered rows be provided during the second field.

Electronic Switch 48 is thrown to accept pixel data from Interpolator 46 until such time as Band N pixels are available directly from Shared Memory 38. During that portion of data transmission of Band N coefficients wherein output pixels are being calculated by Reconstruction Transformer 36 and stored in Memory 38 Electronic Switch 48 is thrown such as to accept actual calculated pixels from Memory 38 for that portion of the image display for which they have been calculated, and thrown to accept bi-linearly interpolated pixels from Interpolator 46 otherwise. At the completion of data transmission and output pixel calculation by Transformer 36 and storage in Memory 38, Electronic Switch 48 is thrown exclusively to accept pixel data from Shared Memory 38 in synchronism with the display device. At this point, Memory 38 acts as a conventional video frame store.

Figure 6:
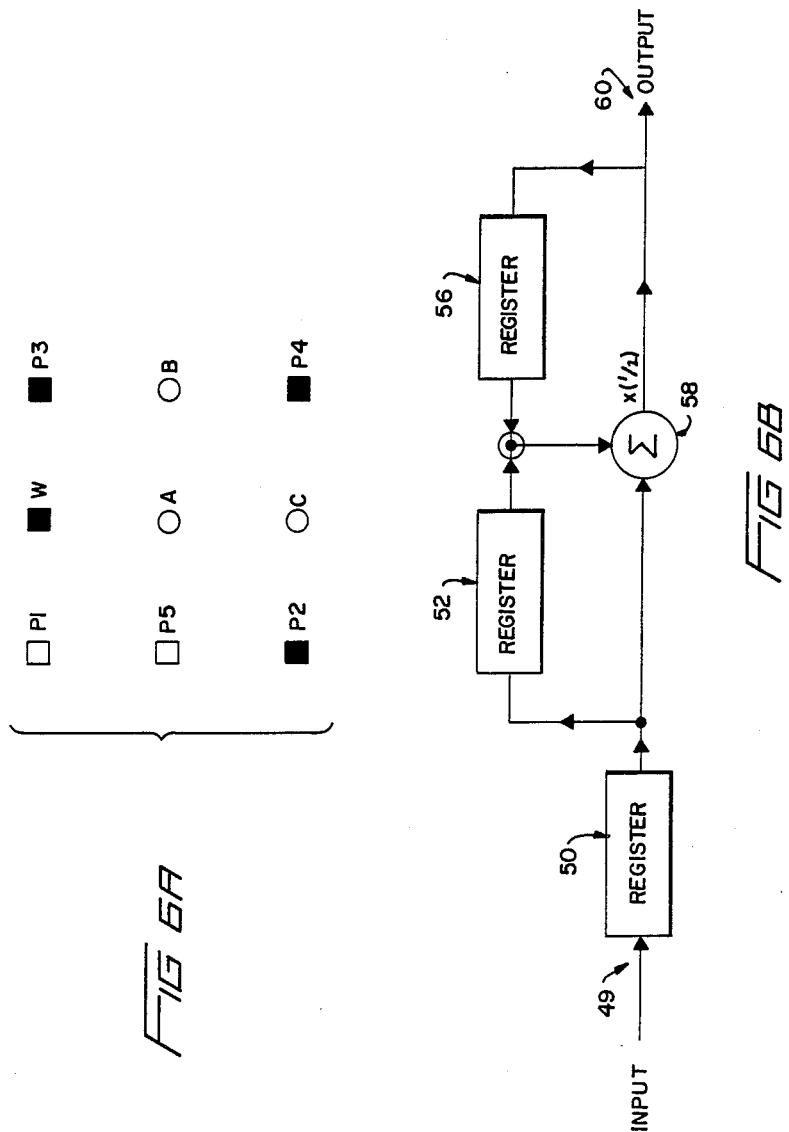
FIG. 6A is a conceptual depiction of an elemental group of pixels or intermediate band B functions and the method for determination of interpolated values.
FIG. 6B is a block diagram of the FIG. 5 bi-linear interpolator for the calculation of interpolated pixels or intermediate band B functions for display during progressive reconstruction.

The bi-linear interpolation will now be described with reference to FIGS. 6A and 6B, and to the timing sequence of TABLE 1, below. FIG. 6A depicts an elemental group of pixels or intermediate Band B functions, and FIG. 6B is a block diagram of the interpolation device.

As represented in FIG. 6A, intermediate band B-functions, also referred to as intermediate band pixels, P1, P2, P3, P4, P5 and W already exist by virtue of either previous interpolation of pixels or actual calculation by the reconstruction transformer 36. Although shown in FIG. 6A, pixels P1 and P5 are not used in the calculations to be presently described. Interpolated pixels A, B and C are calculated by the electronic circuitry shown in FIG. 6B in accordance with the timing shown in TABLE 1.

TABLE 1

| Time | Reg. 50 | Reg. 52 | Reg. 56 | Adder 58 | Output |
|------|---------|---------|---------|----------|--------|
| T1 | P4 | P2 | X | $\frac{P2 + P4}{2}$ | C |
| T2 | P3 | P4 | C | $\frac{P3 + P4}{2}$ | B |
| T3 | W | P4 | C | $\frac{W + C}{4}$ | A |

X = Don't Care.

Considering the operation in detail, prior to time T1, input P2 is held over in Register 52 from the previous trio of operations of the circuitry; similarly, P4 is held over from the present operations to be available for the subsequent trio of operations. P4 is fetched from the FIG. 5 Shared Memory 38 if a Reconstruction Transformer 36 value has been calculated for that pixel, or else from the Intermediate Band Memory 42 if one has not, and is available in Register 50. During time T1, Adder 58 receives P4 from Register 50 and P2 from Register 52 at its two inputs and calculates the interpolated value ½ (P2+P4) for Pixel C, which it issues at Output 60 and also to Register 56 where it is clocked in at the next clock transition. At the next clock transition, P4 is clocked into Register 52 from the output of Register 50 and P3 is taken from either Memory 38 or Memory 42, under the condition previously described for P4 and stored in Register 50. During T2 Adder 58 receives P3 from Register 50 and P4 from Register 52 and calculates the interpolated value ½ (P3+P4) for Pixel B which issues at Output 60. At the start of T3, the Pixel W has been fetched from either Memory 38 or Memory 42 under the condition previously described and clocked into Register 50. During T3 Adder 58 receives Pixel C from Register 56 and Pixel W from Register 50 at its inputs and issues the interpolated Pixel A at Output 60. Register 52 has its output disabled and Register 56 has its output enabled during T3. During T1 and T2 the opposite is the case. Register 50 is clocked such that new data is entered for each period. Registers 52 and 56 are clocked only between T1 and T2 to enter new data for T2 and at other times retain their previous contents.

Referring again to FIG. 5, the purpose of Band N−1 Memory 44 is to buffer the Band N pixel data coming from Bi-linear Interpolator 40 and change its order to provide to Band N Interpolator 46. Interpolator 40 provides two rows of Band 5 interpolated data in parallel to Memory 44 whereas Interpolator 46 requires these two rows in sequence, one after the other.

Figure 7:
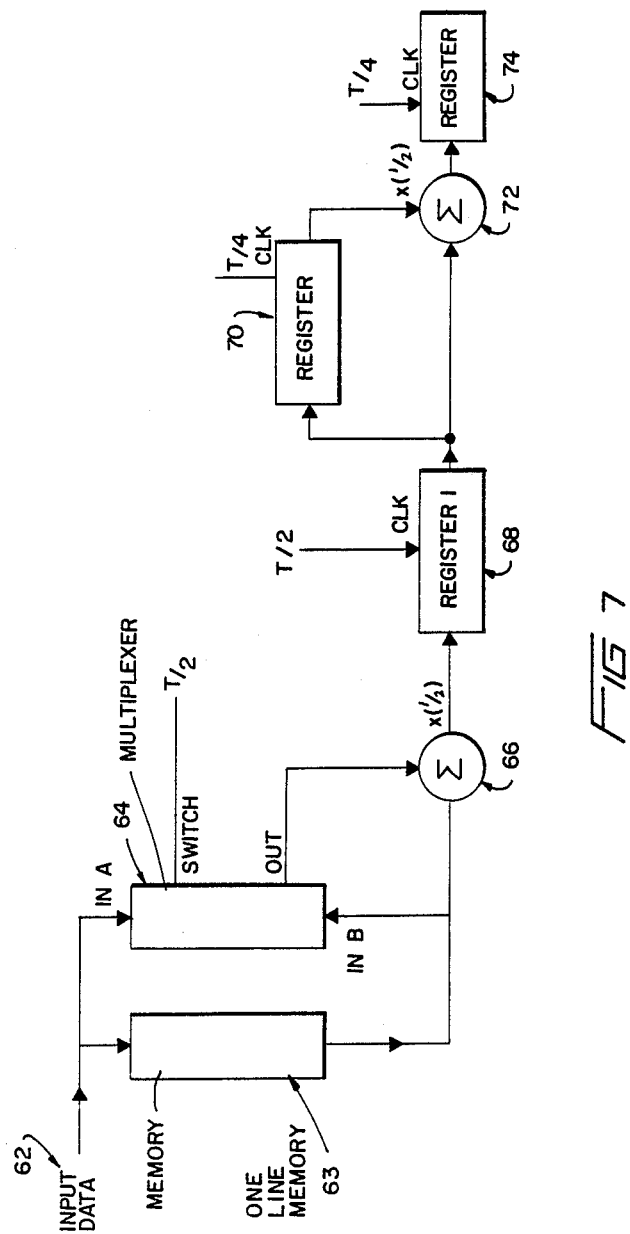
FIG. 7 is a block diagram of the FIG. 5 Band N Interpolator for performing bi-linear interpolation in the highest transform band in real time and in conjunction with an interlaced receiver display device.

The Band N Interpolator 46 of FIG. 5 is shown in detail in FIG. 7. The left half of the interpolator 46 including devices 63, 64, 66 and 68 is a vertical interpolator which operates continuously during one TV field to interpolate between two rows of Band N pixels provided at its input 62, and passes said input pixels through unaltered but delayed by one line during the other TV field. The right half of the interpolator which includes devices 70, 72 and 74 provides horizontal interpolation on every line in both fields.

The vertical interpolator portion of FIG. 7 operates in the following manner. When operating in the TV field requiring vertical interpolation, the Multiplexer 64 is operated such as to pass the Input Data 62 through to serve as one input to Adder 66. The second input to Adder 66 comes from the output of the One Line Memory 63 which delays the Input Data 62 by exactly one TV line. The two inputs are added by Adder 66, divided by two via a right binary shift and delivered to Register 68. When operating in the other TV field not requiring interpolation the Multiplexer 64 is operated such that the output from the One Line Memory 63 is provided to both inputs of Adder 66. The Adder 66 provides a gain of two which is subsequently divided by two in the binary shift before providing the data to Register 68. The effect is to pass the Input Data 62 with a one line delay to Register 68.

The Band N horizontal interpolation is performed by Registers 70 and 74 and Adder 72. Registers 70 and 74 are clocked at twice the data rate as Input Data 62, the One Line Memory 63 and Register 68. As such each input from Register 68 is used in two calculations in sequence in the horizontal interpolation portion of the device of FIG. 7. The timing sequence is shown in the following TABLE 2.

TABLE 2

| Time | Reg. 68 | Reg. 70 | Adder 72 | Reg. 74 |
|------|---------|---------|----------|---------|
| T6 | P1 | — | — | — |
| T7 | P1 | P1 | $\frac{P1 + P1}{2}$ | — |
| T8 | P2 | P1 | $\frac{P1 + P2}{2}$ | P1 |
| T9 | P2 | P2 | $\frac{P2 + P2}{2}$ | $\frac{P1 + P2}{2}$ |
| T10 | P3 | P2 | $\frac{P2 + P3}{2}$ | P2 |

Considering this operation in detail, P1 is present at the output of Register 68 during both T6 and T7. The time numbers in the Time column of Table 2 are not herein related to Time numbers in Table 1. During T7, Adder 72 receives the same P1 input from Registers 68 and 70 and hence, considering the one-half scaling at the output of Adder 72 produces the quantity P1 which is then subsequently clocked into Register 74 at the end of T7. At the end of T7, P2 is clocked into Register 68. Although Register 70 is also clocked at this time its contents do not change since the same input, P1, was presented to it at the time of said clock. During T8, Adder 72 forms the output $\frac{1}{2}$ (P1+P2) as a result of the one input P1 from Register 70 and P2 from Register 68. At the end of T8, the result is clocked into Register 74 where it resides during T9. Also at the end of T8, P2 is clocked into Register 70 from Register 68. During T9, Adder 72 forms the quantity P2, and so forth.

III. Priority Coding and Transmission of Transform Coefficients for Motion Imagery

Overview

A second major aspect of the invention relates to techniques for the transmission of transform coefficients for an image which is undergoing change with time. For the purpose of the present invention there is assumed to exist, at the transmitter, a forward transformer which provides terms and/or coefficients in a transform domain based on frame-by-frame image data. At the receiver there is assumed to exist a corresponding reconstruction transformer. For the purposes of example, the present invention is disclosed in the context of the Pyramid Transform of the above-incorporated Meeker U.S. Pat. No. 4,447,886. However, it will be appreciated that the present invention is not limited to use with the Pyramid Transform, as noted above under the heading "Summary of the Invention".

During operation, the forward transformer generates transform coefficients and other outputs such as Band 1 B-functions of the Pyramid Transform in response to a digitized image input signal. These coefficients and other outputs are compared with the transform coefficients and outputs of the model of the previous image retained in a transform model memory. Transform coefficient changes between said model and the new transform coefficients from the image currently presented from the forward transformer are identified. Data representing the identified changes is prioritized. A subset of the data is selected and transmitted to the receiver, this subset being an amount which can be transmitted to the remote receiver in the time of one pre-determined File Period length. A File Period is generally defined as the time of n television frames, where n is typically a low integer. For example, if data from every frame is transmitted, then n=1. If data from every other frame is transmitted, then n=2. As implied just above, depending on the amount of change from one frame to the next, it is not always possible to transmit all of the change data during one file period, in which case the techniques of the present invention provide significant advantages in terms of graceful degradation.

At the receiver a second transform coefficient model of the image is replenished by the subset of data, while the transform coefficient model of the image at the transmitter is identically replenished. Thus, the receiver and transmitter models are identically driven in a direction to coincide with the current transform coefficients generated in response to the current image being presented to the transmitter as closely as possible, subject to the limitation of the aforementioned prioritization and data subset selection to accommodate the fixed data rate of the transmission channel being used.

The process is started by initializing the transmitter and receiver models to zero. Thus, when the first actual frame is presented, the "change" data, since it is referenced to zero, is the same as the frame data itself.

Mapping Methods

Two different but inter-relating mapping techniques are used for motion imagery. The first mapping technique is depicted in FIG. 8A and is an augmentation of that previously introduced in U.S. Pat. No. 4,447,886, and described hereinabove with reference to FIG. 3. The map depicted in FIG. 8A is not, however, actually transmitted. Rather, identical copies of it are constructed and maintained at the transmitter and receiver locations based on information which actually is transmitted. It will be appreciated that both of these mapping techniques are exemplary only, and that various other maps may be devised for the practice of the invention.

The map of FIG. 8A differs from that of FIG. 3 in that an "Expectation" bit, described in detail hereinafter, is included as part of each "Directory". The "Expectation" bits are not explicitly transmitted from transmitter to receiver but are inserted by the transmitter and by the receiver, into their respective Transform coefficient models such that a binary one is a marker indicating expectation of change data at that Directory in a subsequent File Period, and a binary zero is the absence of such a marker. For motion imagery the map at the receiver is used to reconstruct, from transform coefficient data stored in the receiver's model memory and in the order required by the reconstruction transformer, all coefficients previously received from the transmitter and still valid, and zero value coefficients which are inferred from the signalling map previously received from the transmitter. The map at the transmitter is used to perform the identical function so as to permit comparison of the retained coefficient model with the new coefficients received from the transformer to determine coefficient changes.

The second mapping technique is Change Map signalling depicted in FIG. 8B. The Change Map and associated coefficients are generated at the transmitter in response to differences between transform coefficients newly generated from a forward transform, and transform coefficients reconstructed from the aforementioned retained coefficient model previously formed. Once developed, the Change Map and associated coefficients are prioritized by band number, and a subset is selected for transmission based on the available transmission channel capacity. Thus Change Map components are actually transmitted (in contrast to the FIG. 8A map components which are not). At the receiver, the selected subset is used to replenish the coefficient model retained at the receiver. All of the other image transform coefficients not modified by the Change Map signalling are retained in both transmitter and receiver model memories without modification.

The selected subset for transmission contains values which can be predetermined by definition in any one of a variety of different ways as a matter of design choice. Examples are: (1) the new coefficient value; (2) a value which is the difference between the new value and the previous value; or (3) another value which is the difference between the new value and a quantity which can be independently calculated at the transmitter and receiver by a predetermined formula is subsequently transmitted to the receiver and also used to replenish the aforementioned model at the transmitter.

The Contents and Existence words shown in FIG. 8B differ from those in FIG. 8A in that in FIG. 8B they signal the occurrence of a change rather than a presence of coefficients. As examples, when a binary "1" appears in a Change Content word it indicates that a coefficient is to be changed; when a binary "0" occurs in a Change Content word it indicates that a coefficient is to remain the same. Also, when no Content word is transmitted it indicates that no coefficients related to that word are to be changed.

The Change Existence words of FIG. 8B can have up to four different meanings in contrast with the FIG. 8A Existence words. Except for conditions which involve Expectation markers, which are described hereinafter, if no Existence word is transmitted the meaning is that no change in any band higher than that in which the Existence word is absent is forthcoming in the same File Period. With the same aforementioned exception, if an Existence word signals a "No Change" condition then no change in any higher band is forthcoming in the same File Period. Three other possible signalling conditions exist in the Existence word besides "No Change". These are (1) Change, (2) Cancel and (3) Erase. These are all described hereinafter in detail as a part of the detailed description of the change identifier processing block.

Transmitter Processes

Figure 9:
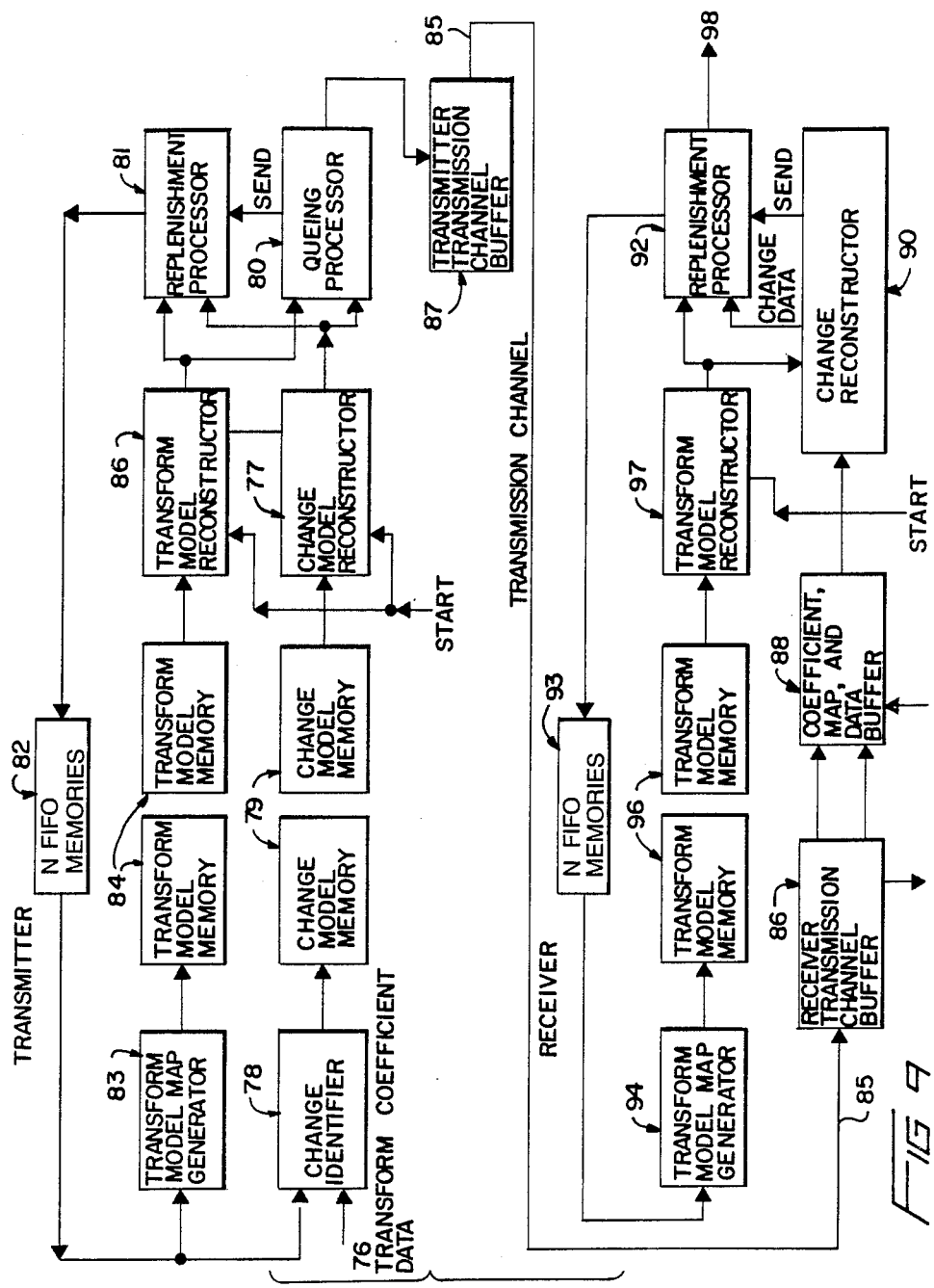
FIG. 9 is an overall block diagram of the transmitter and receiver configurations for full motion priority processing divided into specific functional blocks.

FIG. 9 shows in block diagram form the elements of a transmitter and a receiver which perform the priority coding for transform coefficients for the case of motion imagery. The coding and transmission are performed at the transmitter in three distinct processes (although Transmitter Processes One and Three can be combined to provide for a minimum time between adjacent image frames which are processed). These processes can also be viewed as cycles during operation. It is believed that the system of FIG. 9 will be best understood if introduced by a description of the three transmitter processes.

Transmitter Process One is the identification of changes between the previous model transform coefficients retained in the Transform Coefficient Model Memory 84 and the Transform Coefficient Data 76 from the Forward Transformer and is performed in Change Identifier 78. In this Transmitter Process One the retained transform coefficient data in Memory 84 is reconstructed by the Transform Model Reconstructor 86 in the reconstruction direction in horizontal strips starting with Band 1 and working upward to Band N where N is the highest band of the system. This is performed using the transform model map signalling data also retained in Memory 84. A complete set of transform coefficients which includes those retained in Memory 84 and also zero value coefficients inferred from the map data also retained in Memory 84 is generated by Reconstructor 86, and is passed unmodified through Replenishment Processor 81 and is delivered to the First-In-First-Out (FIFO) Memory 82 which contains N individual FIFO's, one each for Bands 1 through N. The Band 1 B functions are not processed by the coefficient processor being discussed; their processing is separately discussed hereinafter.

"Expectation" markers established in a previous File Period and retained with the transform coefficient model in Memory 84, are also passed through the FIFO 82 to be available to either Change Identifier 78 or Transform Model Map Generator 83.

The purpose of the FIFO Memory 82 is to delay the coefficients in the lower bands relative to those in higher bands so that said coefficients can be delivered to Change Identifier 78 in the same order, starting with the highest band N and working downward to Band 1, as the Transform Coefficient Data 76. This difference in order of coefficient generation and usage is inherent in the Pyramid Transform fast method of calculation. Although the order of generation and usage differs between the various bands of the transform process, the order of generation and usage of coefficients within a single band is the same. Also, coefficients for Band L, where L is less than or equal to N in a N-band transform system, are naturally reconstructed prior to being required for comparison in the FIG. 9 Change Identifier 78 with newly issued coefficients. Hence a group of N FIFO memories is needed to accomplish the required re-ordering between the reconstruction order and the forward order. It is possible to design a system such that the order of generation and usage within a single band is not the same. However, the natural order of scanning an input image from upper left to lower right in horizontal lines and an identical scanning of an output display naturally leads to the aforementioned same order of coefficients within the same band being required by a reconstruction transformer as generated by a forward transformer.

The Change Identifier 78 determines changes in transform coefficients between those delivered from FIFO 82 and Data 76 and stores new ones which have changed along with a Change Map, which identifies their location, in the Change Model Memory 79. (When Transmitter Processes One and Three are combined the coefficient data from FIFO 82 is also processed in Transform Model Map Generator 83, although this is later discussed as part of the third process.)

Memory 79 and Memory 84 each have "A" and "B" sections and each is organized as N First-In-First-Out stacks, each stack containing coefficients of a single band. The separate "A" and "B" portions of each memory permit simultaneous writing and reading to and from a memory without interference or overwriting when a process so requires. When the "B" Memory is being read, writing can occur into the "A" Memory, and vice versa. The roles of the "A" and "B" portions of a memory reverse after all of the processing for a File Period has been completed. At the end of processing for a File Period, the data to be read out in the next File Period is retained in that portion of memory written into in the previous File Period. Also, that portion which was read in the previous File Period no longer has useful data and is ready to be written into during the next File Period.

Transmitter Process Two determines that subset of data from the Change Model Memory 79 identified as having changed in Transmitter Process One which can be transmitted to the receiver in a File Period time which is initially estimated and later determined exactly to correspond to an integer number of transform processing blocks, on a transmission channel of pre-determined capacity in bits per second. To accomplish this, a first pass trial reconstruction and replenishment is performed wherein transform coefficient reconstructions of both Memories 79 and 84 are performed using the signalling maps stored with the coefficients in each memory and the amount of change data required to be transmitted by band number measured. It is necessary in this Process Two to reconstruct the coefficient data from Memory 84 as well as that from Memory 79 to be able to count change data which has been marked by "Expectations" in a previous File Period.

From Process Two the Band number in which the number of available bits is completely used is determined, as is a count of the number of bits used in that Band. This latter number is approximate since it may provide for only a fraction of the bits required for the last processing block to be transmitted, whereas it is desired to transmit an integer number of said blocks. Therefore a pre-determined arrangement between transmitter and receiver causes the transmitter to send to the receiver the Band number in which coefficient and map data must be terminated for the present File Period, and the initially determined number of bits available for said Band. An exemplary agreement between transmitter and receiver is that a number of additional bits sufficient to complete transmission of that processing block in which the initial bits were used up will be sent. Further explanation of the reason for a two-pass reconstruction and replenishment process is provided hereinbelow.

Transmitter Process Three is a second pass reconstruction and replenishment of the data from Memories 79 and 84. This second pass results in coefficient and Change Map data to be actually transmitted. The data is selected by Queuing Processor 80, rate buffered by the Transmitter Transmission Channel Buffer 87, and delivered to Transmission Channel 85. Concurrently, the same data selected for transmission is used in Replenishment Processor 81 to replenish the model retained in Memory 84. The output from Processor 81 is delivered to FIFO Memory 82 and therein selectively delayed, as was also done in Transmitter Process One so as to issue at the output of FIFO memory 82 in the forward transform order of the Transform Coefficient Data 76. Again, all coefficient data including the zero value coefficients are present at the output of FIFO 82.

The Transform Model Map Generator 83 compresses the coefficient data received from FIFO 82 and issues coefficient and map data to Transform Model Memory 84. A useful map "washing" action is accomplished by compressing data from FIFO 82 and generating the transform model map anew after the replenishment process. Certain map components which might otherwise point to zero value coefficients in some cases, which would also have to be retained, are eliminated by this "washing" action.

Transmitter Processes One and Three can be combined when desired with the beneficial result being to perform priority coding of transform coefficients on more input video frames per second than possible without this combination. When it is not desired to maximize the number of frames per second it is often desirable to minimize the transport delay of image changes between the transmitter and receiver. In a situation where, as an example, three video frames are omitted from processing such that only every fourth frame is used by the coefficient processor to identify changes it is desirable to use a video frame for processing as recent to the trial and actual replenishment reconstructions and data transmission as possible. Thus any unused frames should occur between Transmitter Process Three of the preceeding File Period and Transmitter Process One of the present File Period rather than between Transmitter Processes One and Two of the present File Period. This is accomplished by performing Transmitter Process One immediately prior to Transmitter Process Two, rather than in conjunction with Transmitter Process Three of the previous File Period.

Receiver Processes

The receiver portion of FIG. 9 will now be considered briefly. At the outset, it may be noted that the receiver operation can be performed in a single cycle, in contrast to the two or three cycles of the transmitter, depending upon whether Transmitter Processes One and Three are combined.

The Receiver Transmission Channel Buffer 86 receives data from transmission channel 85 over the duration of one File Period. The channel buffer 86 provides for the separation of the data into component parts and delivery of the Band B-functions and Sub-band coding data to a separate location not shown in FIG. 9, delivery of Band 1 through Band N map and coefficient data to one section of Buffer 88, and delivery of the information indicating that band in which data run-out occurs and also the estimated number of bits of data to be expected for said band to another section of Buffer 88. All of the above data is converted to fixed length words for the deliveries just mentioned.

Buffer 88 serves as a rate buffer for the data between Buffer 86 and the Change Reconstructor 90. Buffer 88 also receives back from the Sub-band decoding operation, described hereinafter with reference to FIGS. 20A and 20B under the heading "Map Signalling For Band 1 B-Functions", the Band 0 Existence words which are saved in a third separate section.

Change Reconstructor 90 provides a function at the receiver directly comparable to that provided at the transmitter by the Queuing Processor 80, Change Model Memory 79, and the Change Model Reconstructor 77. Transform coefficients and map components are provided by Change Reconstructor 90 in synchronism with their counterparts provided by Transform Model Memory 96 and Transform Model Reconstructor 97 to Replenishment Processor 92 for incorporation into the transform coefficient model retained at the receiver. The aforementioned data giving the Band number in which the data for the present File Period is used up, and the estimated number of bits allotted for said Band as determined by Transmitter Process Two is transmitted to the receiver and is used by Change Reconstructor 90 to properly locate the changes and markers into the receiver's coefficient model.

FIFO 93, Map Generator 94 and Memory 96 at the receiver respectively perform identical functions to FIFO 82, Generator 83 and Memory 84 at the transmitter.

A complete set of coefficients 98 are issued by Replenishment Processor 92 to a subsequent reconstruction transformer to in turn form a video output signal.

Change Identifier Operation

Figure 10A:
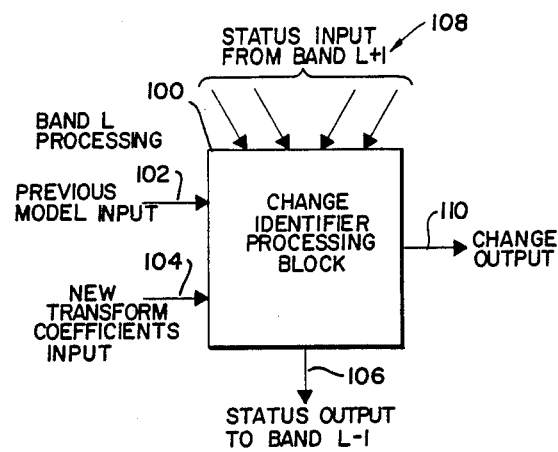
FIG. 10A depicts a basic processing block, including its inputs and outputs, for use in the FIG. 9 change identifier to identify in the most efficient way the changes to be made in a motion image.

Change Identification between the coefficients in the previous image model in Transform Coefficient Model Memory 84 and the Transform Coefficient Data 76 of FIG. 9 occurs for each transform processing block operation as depicted in FIG. 10A. This operation commences with coefficients in the highest band of the transform and proceeds downward to Band 1. This process is performed in the forward direction such as to generate the Change Map and associated coefficients with the tree structure of FIG. 8B by first identifying the highest band changes and followed by the branches in the lower bands necessary to point to them, and so that the Change commands of Cancel and Erase, described hereinafter, can be signalled downward to the lowest band level possible. In this way the map is most efficiently generated and the smallest number of lower band commands are generated so as to produce the greatest leverage of cancel and erase signalling to yield the highest signalling efficiency.

The forward processing is carried out in a series of processing blocks of the type shown in FIG. 10A. Required as inputs to Block 100 of FIG. 10A are the transform coefficients from the Previous Model 102, the New Transform Coefficients 104, and the Status Input 108 from the next higher band. Said status informs Block 100 of the commands which are needed and also which are acceptable for the next higher band. In some cases, as will be explained shortly, a choice of commands can be made at a lower band to maximize signalling efficiency. The status is stored over in a Status Memory which saves the status of several processing blocks to accommodate the processing order usually convenient to the transformer and to coefficient processing and so that four spatially aligned higher band blocks each have their individual status ready to present to a single next lower band processing block. The outputs from the processing are the Change Output 110 encompassing the Change Map and associated coefficients, and the Status Output to Band L-1, designated 106. This status is in the same form as each of the four individual status inputs of Status 108 and is saved over in a different section of the same Status Memory for later input to a processing block in the next lower band.

Priority Selection and Blanking Operation

The priority selection process is performed on the basis of Zonal coding wherein the lowest spatial frequency components are given the highest priority, the next higher spatial frequency components given the next higher priority and so forth, with the highest spatial frequency components receiving the lowest priority. The Zonal method of priority coding in conjunction with the map signalling methods of FIGS. 8A and 8B and the "Blanking" method of this invention provide the ability to reconstruct an image at the receiver which is entirely free of image components belonging exclusively to previous image frames and no longer are valid components of the present image. A presumption is made here that a single transmission File Period is sufficiently long to accommodate at a minimum all of the lowest spatial frequency and map components of an image. In the Pyramid Transform case said components are the Band 1 B-functions.

Significantly, notwithstanding the fact that the receiver transform model memory may contain multiple coefficients and map data which are no longer valid for the present image, such coefficients and map data are automatically identified, isolated and prevented from being used in a present image reconstruction. This action is called "Blanking" and is initiated in any location of an image reconstruction wherein a receiver receives map data indicating the existence of a spatially aligned next higher band Change Map and coefficient data in at least one higher band, but subsequently does not receive said next higher band data in the same transmission File Period.

The "Blanking" technique provides the reconstruction transformer with zero valued coefficients rather than any coefficients actually retained in the receiver model memory. At the locations where Change Directories were expected but not received, "Expectation" markers are inserted into the transform model at both the transmitter and receiver. These serve to initiate Blanking at the receiver and to mark the locations at both receiver and transmitter where data may be received and inserted at the receiver and inserted at the transmitter without new map signalling pointers in a subsequent File Period. Once Blanking is initiated at a spatial location in a certain band, coefficients at that location in said band and coefficients spatially aligned in all higher bands which are issued to the reconstruction transformer are given the value of zero until that time when the Expectation is removed by either reception of the expected Change Map and coefficient data or by Cancel or Erase commands to be discussed shortly.

The selection process consists of first allocating an amount of data space to be used considering the transmission channel capacity in bits per second and the length of a File Period in seconds or fraction thereof. The next step involves performing a trial replenishment process previously introduced as the Transmitter Process Two. This trial replenishment process includes all replenishment steps except the one of modifying the Model Memory 84 in FIG. 9 with any new data. The quantity of data is determined for each band by measurement after all coding operations are performed on the basic Change Map and coefficient data. Such coding operations include variable length coding, as implemented by Huffman methods, and based on the statistical distribution of the coefficient data.

After the measurements have been completed, a determination is made of how many of the bands starting with the lowest can have all of their data transmitted. This process involves first the subtraction of the measured data for the Band 1 B-functions, or equivalently the lowest spatial frequencies and the Sub-band map coding to be discussed later from that, allocated to the File Period, since said "B" functions have the highest priority. Again, it is presumed that the transmission File Period length has been pre-selected to accommodate at a minimum all Band 1 B-functions and the Sub-band coding. From this first remainder the amount of data required for the transmission of the Band 1 coefficients and map data is next subtracted. If this second remainder is zero or positive then all of the Band 1 map and coefficient data can be transmitted; if it is negative then only all of the Band 1 "B" functions can be completely transmitted. This general process is repeated until a band is identified which can have only a fraction of its data transmitted, referred to herein as Band "I". Once Band "I" is identified it is known that all bands lower than "I" can have all of their data transmitted, all bands higher than "I" can have none of their data transmitted and that Band "I" can have an amount transmitted equal to the remainder after the total data to be transmitted for Band "I−1" was subtracted from the then remaining capacity. The results of the trial replenishment measurement process is the determination of a value for "I", and the number of bits "J" available for Band "I". Both results of said measurement process are used at the transmitter and also transmitted to the receiver as File Period information at the start of a File Period.

Transmission Operation

The next operation is an actual transmission of data to the receiver and an actual replenishment of data in the Transform Model Memory 84 of FIG. 9 as was introduced above as Transmitter Process Three.

This two-pass operation consisting of a trial and then actual replenishment is made necessary, rather than a single combined operation, because the chosen order for reconstruction of the transform coefficients is first by horizontal strip starting at the top of the image and proceeding downward and secondly by band number, whereas the coefficient prioritization is first by Band number and secondly by horizontal strip. The chosen reconstruction method as an order of data transmission is preferred so as to minimize the Status memory size and the storage requirement of intermediate transform data and to perform the reconstruction of all bands starting in horizontal strips at the top of the image and successively working downward in subsequent strips. Each strip is one Band 1 processing block high, two Band 2 processing blocks high, four Band 3 processing blocks high and so forth. All horizontal strips are the complete width of the image. This method is also the natural way in which reconstruction of coefficient data is performed to generate said coefficient data for a reconstruction transformer which operates in synchronism with the scanning process of a television display device. A one-pass operation is not possible because the horizontal strip reconstruction order requires a transmrssion decision for coefficients of all bands in a strip before it is known how many coefficients must be transmitted in lower bands for the remaining strips and whether any higher band coefficients can be transmitted, consistent with the prioritization method. A one pass operation would be possible but would require that coefficient reconstruction be performed such that all Band 1 reconstructions be performed prior to any Band 2 reconstructions, that all Band 2 reconstructions be performed prior to any Band 3 reconstructions and so forth so as to determine the aforementioned Band "I" before any Band "I+1" data be incorrectly selected and transmitted. Reconstruction in this order would require considerably more memory for the Status data which is saved over as part of the output from a processing operation in a band, say Band L, to be later input to a spatially aligned processing block operation in Band L+1, as well as the intermediate calculated results in the actual transform reconstruction, and is therefore not the method selected.

The actual replenishment process proceeds wherein all map data and coefficients in all strips in all bands below Band "I" are permitted to be transmitted and to replenish the model at the transmitter. No map or coefficient data in any band above "I" is permitted to be transmitted. The Queuing Processor 80 includes a counter employed to count the number of bits required to transmit map and coefficient data for Band "I" starting with the strip at the top of the image. When the count in the counter reaches the previously determined value "J" no further Band "I" data is permitted to be transmitted nor permitted to replenish the model at the transmitter, except the number of bits necessary to complete data transmission for that processing block whose data transmission is already in progress when the counter reaches the value "J".

The replenished transform coefficient model is issued by Replenishment Processor 8 in FIG. 9 and delivered to the Transform Model Map Generator 83 via the FIFO Memory 82. The Generator 83 performs the "washing" operation by generating a new map and issues the resulting map and coefficients to Transform Model Memory 84.

Figure 10B:
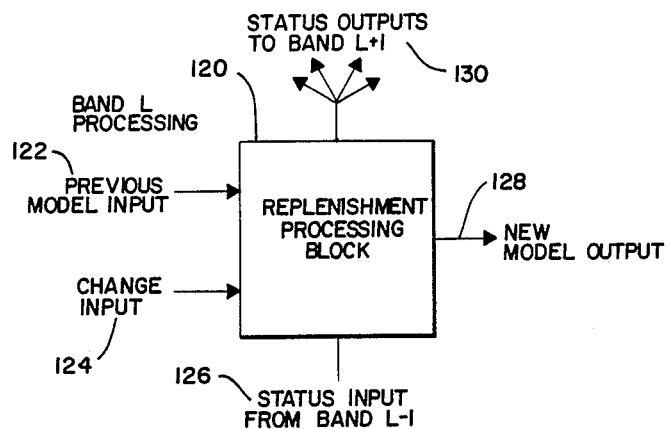
FIG. 10B similarly depicts a basic processing block, including its inputs and outputs, for use in the FIG. 9 replenishment processor for subsequently replenishing the transform coefficient model using the Change map and coefficients.

The first trial reconstruction does not involve any replenishment operation whereas the actual replenishment operation is performed on a block basis as shown in FIG. 10B. The Replenishment Processing Block 120 performs these operations using as inputs the Previous Model 122, the Change Input 124 which was produced as Change Output 110 in the previous processing of Block 100 and subsequently limited by the aforementioned prioritization operation, and the Status Input 126 from Band L−1. The outputs from Block 120 are the New Model Output 128 and the Status Outputs to Band L+1.

Change Identifier Processing

The operation of the Change Identifier Processing Block 78 of FIG. 9 is described next below with reference to the simplified diagram shown in FIG. 11. There are basically three processing groups, namely, Content Processing, Input Status Processing and Output Status Processing.

The Content Processing proceeds in two steps, the first of which is to make two arithmetic comparisons for each pair of coefficient inputs, one of the pair being from the New Transform Coefficients 145, the other from the memory containing the Transform Model 143 of the previous image. This is performed in Processor 132. The second step is to determine a single Contents output which is the highest common descriptor applicable to effect the required changes in the coefficients of the same processing block. This action is accomplished by Processor 134. As employed here, the term "descriptor" generally corresponds to a component of the change map, although it additionally includes information which optimizes descriptor selection at successively lower bands.

The first arithmetic comparison yields a binary one if the absolute value of the difference between the new coefficient and the corresponding previous coefficient exceeds a Change Threshold, CT. This variable is termed CHG. As described hereinbelow, the Change Threshold CT can have two different values: one for use without Expectations, CHGH, and a second lower valued threshold, CHGL, for use in the case of Expectations.

Another arithmetic comparison yields a binary one at its output if the absolute value of the new coefficient exceeds an Absolute Threshold, AT. This variable is termed NMNZ. A third binary outcome, termed TMNZ, is a binary one if the previous model coefficient was non-zero. The use of all four of these variables allows some hysteresis to be implemented for coefficient values near zero, and for coefficients in blocks with Expectations. This minimizes a situation from occurring where additive noise could otherwise cause a coefficient around a single threshold to be alternately erased and then later re-established as a non-zero value coefficient, both actions undesirably requiring transmission channel capacity for signalling. Also prevented is the situation where a coefficient value has changed a small amount and with the presence of video noise could otherwise establish an Expectation and then later cancel it when the noise contribution caused the single threshold to no longer be exceeded.

The aforementioned Absolute Threshold, AT, is always preset to a lower value than the Change Threshold, CT, to produce the aforementioned desired hysteresis action. When the thresholds are set in this relationship the hysteresis region is a width equal to the difference between the two thresholds: CT minus AT. For a coefficient previously having a value of zero to change so as to achieve a non-zero value, the absolute value of the new coefficient must exceed the threshold CT. For a coefficient previously having a non-zero value to acquire the value of zero, the new coefficient must fall below or equal the threshold AT.

There are seven different descriptors generated in the Effective Contents Processor 134 in the second step of the Content Processing in response to the aforementioned inputs CHGL, CHGH, NMNZ, TMNZ and the Expectation bit from the Directory of the coefficient model of the previous image. This processing is next described and is implemented by a Programmable Read-Only-Memory (PROM). Contents processing involving the aforementioned two steps proceeds in an iterative manner in FIG. 11 although fundamentally it could also be performed in a simultaneous manner, but at the expense of a larger size PROM.

The fact that there are seven descriptors whereas the final category of Change Map descriptors (Map components) to be transmitted, i.e. Change, No Change, Cancel and Erase, contains only four, permits temporary inclusion of extra information which provides visibility later in a lower band to combine multiple descriptor results in the most efficient way. The seven descriptors and their meanings are defined as follows:

| Table of Effective Contents Processor Descriptors | |
|---|---|
| No Change (E) | No change from the previous coefficient value is required. The previous coefficient value is zero. The (E) is used to indicate that the coefficient location is empty with a zero value coefficient implied and could have a Cancel or Erase applied to it as well when combined with other outcomes without altering its state. |
| No Change (O) | No change from the previous coefficient value is required. The previous coefficient value is non-zero. The (O) is used to indicate that the coefficient location is occupied with an actual coefficient and could later have a Cancel applied to it but not an Erase, which would adversely alter its state. |
| No Change (Cond): | A Change condition is present but no change is required to be reported via the Change Map because an Expectation already marks this location at the transmitter and receiver which is to receive a Directory, etc. However, the Directory, any Content word, any Existence word and any non-zero value coefficients identified by the Change Identifier Processor must be saved to be included as transmitted data, subject to the subsequent prioritization process. This type of No Change is conditional on there being an Expectation marker already at this location. |
| Cancel (E): | A previously established Expectation is to be removed. The Change condition which generated an Expectation in a previous File Period no longer exists resulting in the desired removal of said Expectation. The (E) indicates the previous model coefficient value at that location is presently zero, so that an Erase could later be used in a combined command to accomplish the same result without adverse effect. |
| Cancel (O): | A previously established Expectation is to be removed. The Change condition which generated an Expectation in a previous File Period no longer exists resulting in the desired removal of said Expectation. The (O) indicates that a non-zero value coefficient presently exists at that location in the previous model memory. A later combination with an Erase command is not possible. |
| Erase: | A non-zero value coefficient in the previous model is to be given a value of zero. |
| Change: | A non-zero value, different from the previous model value, is to be given to the coefficient. |

TABLE 3 below shows the operation of Effective Contents Processor 134 for the first of the comparisons in a sequence of comparisons. The two inputs CHGH and CHGL are grouped in a single column CHG, although the logic performed in Processor 134 uses the CHGH threshold for cases with no Expectation and the CHGL threshold for cases with an Expectation. The outcome exits Processor 134 and is stored in Register 136 at the conclusion of the first comparison. This outcome includes both a three bit descriptor and a two bit preliminary coefficient action. Bit 0 of the latter serves as the selector input to the multiplexer 133 in FIG. 11 and determines whether the "Y" output is the new transform coefficient value itself from Register 136 or a value of zero. This selected output is stored in Delay Pipeline 135 which can store in the present example four coefficients in a sequence from a Sub-processing block. Bit 1 of the Preliminary coefficient action is stored in a serial-in, parallel-out shift register 138 which is of a length equal to the number of coefficients being processed, the present example having four. The preliminary coefficient action is later finalized by storing or not storing Content word 147 after the final descriptor has been determined and all preliminary actions have been completed.

TABLE 3

| CHG | TMNZ | NMNZ | No Expectation Outcome | Expectation Outcome | Preliminary Coefficient Action | Code |
|---|---|---|---|---|---|---|
| 0 | 0 | 0 | No Change (E) | Cancel (E) | None | 0 0 |
| 0 | 0 | 1 | No Change (E) | Cancel (E) | None | 0 0 |
| 0 | 1 | 0 | Erase | No Change (C) | Zero Value | 1 0 |
| 0 | 1 | 1 | No Change (O) | Cancel (O) | None | 0 0 |
| 1 | 0 | 0 | Not Possible | Not Possible | None | 0 0 |
| 1 | 0 | 1 | Change | No Change (C) | New Coeff. | 1 1 |
| 1 | 1 | 0 | Erase | No Change (C) | Zero Value | 1 0 |
| 1 | 1 | 1 | Change | No Change (C) | New Coeff. | 1 1 |

In the Preliminary coefficient action code in TABLE 3 the right bit is Bit 0 and the left bit is Bit 1. During the second iteration of Contents Processing, a second pair of coefficients one each from the new transform coefficients and the other corresponding one from the memory containing the model of the previous image, are compared in Processor 132 with the result being binary values for CHGL, CHGH, TMNZ and NMNZ. As before the previous model coefficient is determined to be either of zero or non-zero value by Processor 132 and TMNZ made equal to one if said coefficient is non-zero, or equal to zero if said coefficient is zero valued. The Expectation remains the same for the entire sequence of coefficients in the same processing block.

The Effective Contents Processor 134 performs two functions during the second and subsequent iterations. The preliminary action function is the same as during the first iteration and results directly in a two bit wide preliminary coefficient action outcome from Q(4) and Q(5) of Processor 134 stored in Register 136 and the ensuing actions following the clock transition to Register 136 of multiplexer 133, Delay Pipeline 135 and Shift Register 138. The second function during the second iteration is to combine the descriptor results of the first and second iterations, the first stored in Register 136 and the second determined from the present CHGH, CHGL, NMNZ, TMNZ and the Expectation bit supplied to Processor 134. Specifically one of the aforementioned seven descriptors is to be determined which is applicable to the results of both the first and second iterations.

Figure 12B:
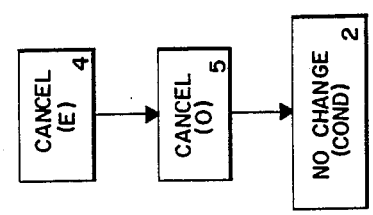
FIG. 12B similiarly depicts the hierarchy of Contents descriptors with the presence of Expectations.
Figure 12A:
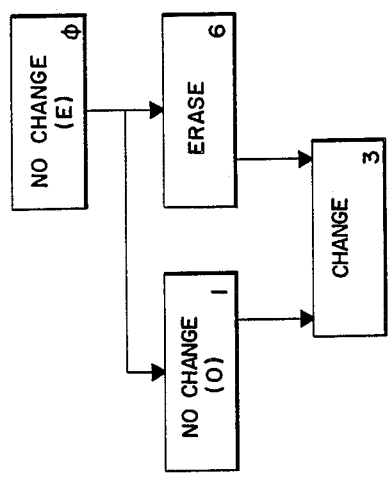
FIG. 12A depicts the hierarchy of Contents descriptors without the presence of Expectations, and the method of determination of a combinatorial output state when multiple input states are given.

FIGS. 12A and 12B depict the hierarchy of descriptors for the respective cases of No Expectation, and with an Expectation. The highest level possible descriptor is selected which is applicable to all iterations of a processing block. The highest level in FIG. 12A is No Change (E), and in FIG. 12B is Cancel (E). The highest common descriptor is selected consistent with finding said common descriptor by moving only in directions indicated by arrows, however. As an example, the highest common descriptor between a No Change (0) and a No Change (E) is a No Chanqe (0), whereas the highest common descriptor between a No Change (0) and an Erase is a Change. At the end of the second iteration, Register 136 receives the outcome which is the highest common descriptor of the first and second iterations. The same process as performed for the second iteration is performed for the third and so forth until all applicable coefficients for the processing block have been treated.

Figure 11:
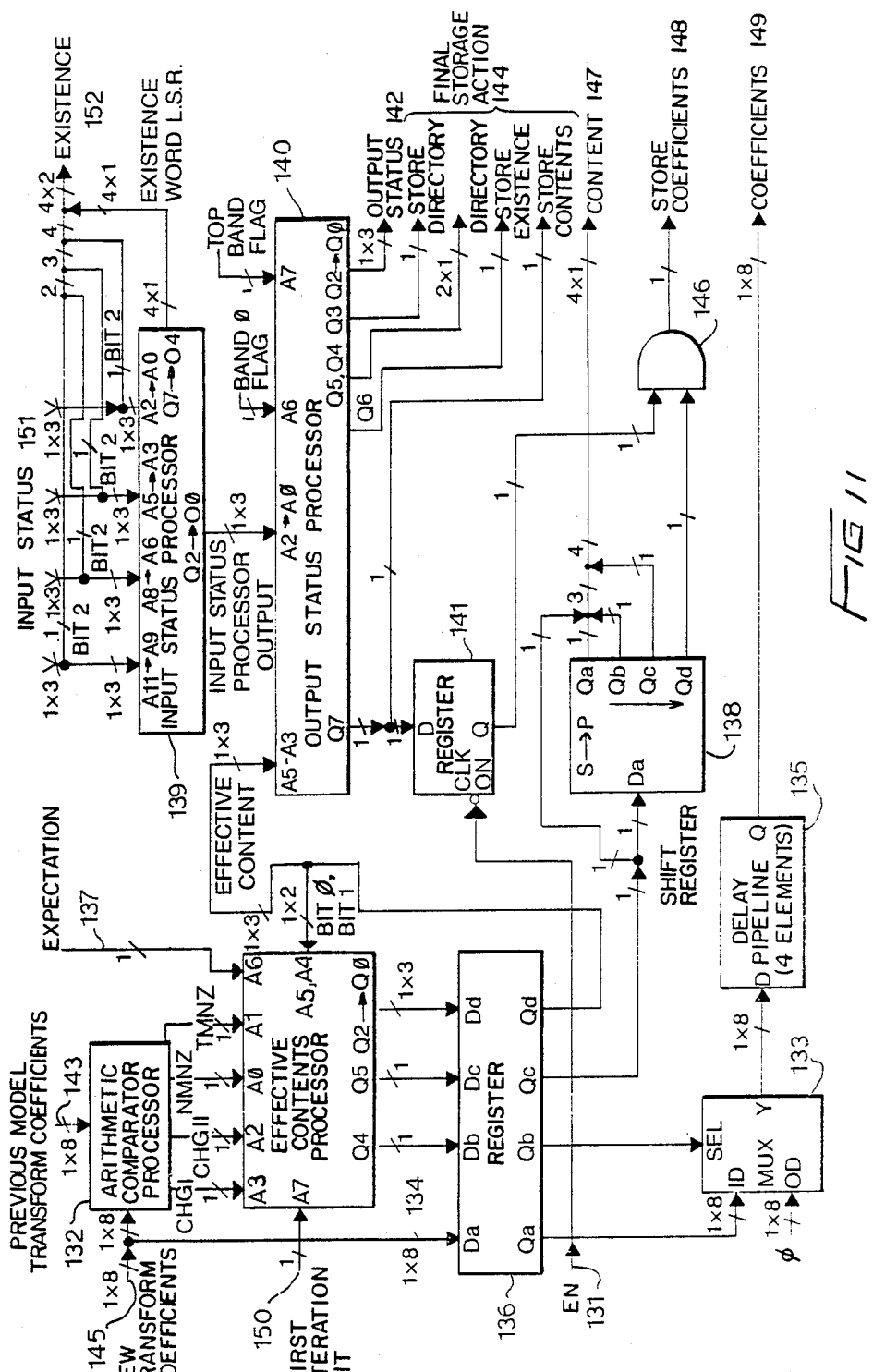
FIG. 11 is an overall block diagram of the Change Identifier for generating a Change Map and associated coefficients and Output Status.

The FIG. 11 Effective Contents Processor 134 which performs the operations just described advantageously is implemented as a 256 word by eight bit PROM whose contents comprise, in essence, a look-up table defining, for each possible combination of inputs, the appropriate output. Thus inputs to the Effective Contents Processor 134 are PROM address selection inputs, and outputs from the Effective Contents Processor are PROM data outputs.

More particularly, the PROM 134 address inputs are:

A0—NMNZ, from Comparator Processor 132
A1—TMNZ, from Comparator Processor 132
A2—CHGH, from Comparator Processor 132
A3—CHGL, from Comparator Processor 132
A4—Previous Descriptor—from Q0 via Reg. 136
A5—Previous Descriptor—from Q1 via Reg. 136
A6—Expectation Bit (from previous model)
A7—First Iteration Bit The PROM 134 outputs are:

Q0—Highest Common Descriptor (L.S.B., also fed back via Reg. 136 to A4)
Q1—Highest Common Descriptor (also fed back, via Reg. 136 to A5)
Q2—Highest Common Descriptor (M.S.B.)
Q3—Not Used
Q4—Preliminary Coefficient Action (L.S.B.)
Q5—Preliminary Coefficient Action (M.S.B.)
Q6—Not Used
Q7—Not Used The actual PROM 134 contents are given, in hex dump form, in the following Table 5. The first column in TABLE 4 is the address of the first byte of the particular line, and the sixteen succeeding bytes are the actual contents:

TABLE 4

| 0  | 0 0 | 26 | 1 0 | 0 | 0 0 | 0 | 0  | 26 | 1  | 0 | 33 | 26 | 33 |
|----|-----|----|-----|---|-----|---|----|----|----|---|----|----|----|
| 10 | 1 1 | 23 | 1 0 | 0 | 0 0 | 0 | 1  | 23 | 1  | 0 | 33 | 23 | 33 |
| 20 | 6 6 | 26 | 3 0 | 0 | 0 0 | 0 | 6  | 26 | 3  | 0 | 33 | 26 | 33 |
| 30 | 3 3 | 23 | 3 0 | 0 | 0 0 | 0 | 3  | 23 | 3  | 0 | 33 | 23 | 33 |
| 40 | 4 4 | 22 | 5 0 | 0 | 0 0 | 0 | 32 | 22 | 32 | 0 | 32 | 22 | 32 |
| 50 | 5 5 | 22 | 5 0 | 0 | 0 0 | 0 | 32 | 22 | 32 | 0 | 32 | 22 | 32 |
| 60 | 2 2 | 22 | 2 0 | 0 | 0 0 | 0 | 32 | 22 | 32 | 0 | 32 | 22 | 32 |
| 70 | 0 0 | 0  | 0 0 | 0 | 0 0 | 0 | 0  | 0  | 0  | 0 | 0  | 0  | 0  |
| 80 | 0 0 | 26 | 1 0 | 0 | 0 0 | 0 | 0  | 26 | 1  | 0 | 33 | 26 | 33 |
| 90 | 0 0 | 26 | 1 0 | 0 | 0 0 | 0 | 0  | 26 | 1  | 0 | 33 | 26 | 33 |
| A0 | 0 0 | 26 | 1 0 | 0 | 0 0 | 0 | 0  | 26 | 1  | 0 | 33 | 26 | 33 |
| B0 | 0 0 | 26 | 1 0 | 0 | 0 0 | 0 | 0  | 26 | 1  | 0 | 33 | 26 | 33 |
| C0 | 4 4 | 22 | 5 0 | 0 | 0 0 | 0 | 32 | 22 | 32 | 0 | 32 | 22 | 32 |
| D0 | 4 4 | 22 | 5 0 | 0 | 0 0 | 0 | 32 | 22 | 32 | 0 | 32 | 22 | 32 |
| E0 | 4 4 | 22 | 5 0 | 0 | 0 0 | 0 | 32 | 22 | 32 | 0 | 32 | 22 | 32 |
| F0 | 4 4 | 22 | 5 0 | 0 | 0 0 | 0 | 32 | 22 | 32 | 0 | 32 | 22 | 32 |

Two Change Thresholds are designated as the A2 and A3 PROM inputs above. The A2 input, CHGH, is the higher of the two thresholds and is used in cases where no Expectation exists. The A3 input, CHGL, is the lower of the two thresholds and is used in cases where an Expectation exists. The case of CHGL=0 and CHGH=1 is not possible since the lower threshold must be exceeded in order for the higher threshold to be exceeded. The other three cases of these two variables are possible. The two independent threshold operations are both performed by the Arithmetic Comparator Processor 132.

Described next below is the manner in which the contents of the PROM-134. comprising the FIG. 11 Effective Contents Processor are developed. Briefly, the PROM 134 is programmed during a simulation run using the numbers in the lower right corner of each block in the hierarchies of FIGS. 12A and 12B in conjunction with a computer program presented in the Appendix hereto as Listing 1. The program of Listing 1 is written in Microsoft BASIC-80, release 5.0. The program generates numbers in hexadecimal form, which become the contents of the PROM 134.

In the preferred implementation, the various programs and program flow charts presented herein are used to generate the PROM contents, which then in effect embody the processes of the programs. Stated in other words, the programs and flow charts presented herein accurately represent the detailed processes of the invention. It will be appreciated that, where speed is not as critical as it is in the case of processing real time television imagery, the invention can be implemented largely in software, directly employing programs based on the programs presented herein to perform the processing.

The program of Listing 1 includes a FOR/NEXT loop between statements 120 and 640 which generates all possible ROM address inputs in sequence. By simulation, the program in effect decodes each address to determine a value for CHGH, CHGL, NMNZ, TMNZ, the first iteration flag, the Expectation, and the previously-determined descriptor in FIG. 11 Register 136. FIG. 13A is an overall flowchart of the operations performed in this loop, with the blocks of the FIG. 13A referenced by the corresponding statement line number in Listing 1. FIGS. 13B and 13C are subsidiary flowcharts which are in effect inserted where indicated in the flowchart of FIG. 13A.

The numbers representing the blocks in FIGS. 12A and 12B are set up as octal string variables in the computer program of Listing 1. A string which is the string sum of: (1) the accumulated result of the previous iterations; and (2) the present iteration input, is formed in either statement 410 or statement 530 in response to each PROM address input combination, which is then searched according to the flow chart in FIG. 13A to determine the outcome. The hierarchy of the flow,chart of FIG. 13B is implemented in computer program steps 420 through 460. The hierarchy of the flow chart of FIG. 13C is implemented in computer program steps 540 through 550.

In Listing 1, the subroutine at 670 operates to decode the previously determined highest common descriptor. Although only two bits are used as inputs in this implementation, all seven possible cases can be uniquely determined because the Expectation bit at the A(6) input remains the same for all iterations of a processing block. As examples, an apparent "2" when observed as an input, modulo 4, due to only the least two significant bits showing, could come from either an actual "2" or an actual "6". If no Expectation bit is present it must come from a "6"; if an Expectation bit is present it must come from a "2". Similarly, an apparent "1" could come from either a "1" or a "5", modulo 4. Again the expectation bit determines which it is. The step at 570 and the use of P=7, which is none of the seven possible outcomes, is employed in the computer proqram to distinguish between writing a new non-zero coefficient and writing a zero for the Preliminary Coefficient Action portion of the output.

The Preliminary Coefficient Actions have the following codes:

| Bit 1 | Bit 0 | Action |
|---|---|---|
| 0 | 0 | No Change |
| 1 | 1 | Write a new coefficient |
| 1 | 0 | Write a zero |

The second of the three major processing groups or blocks in the FIG. 9 Change Identifier Processor 78 shown in greater detail in FIG. 11 is the FIG. 11 Input Status Processor 139. This processor 139 is similiarly implemented in a 4096 word by eight bit PROM. The PROM 139 receives as inputs four three-bit codes from the Status memory corresponding to the Output Status of four spatially aligned next higher band processing blocks. These are received simultaneously by FIG. 11 Processor 139, rather than through an iterative sequential procedure as in the case of the Contents Processor, although either procedure could be used in practice.

Figure 14A:
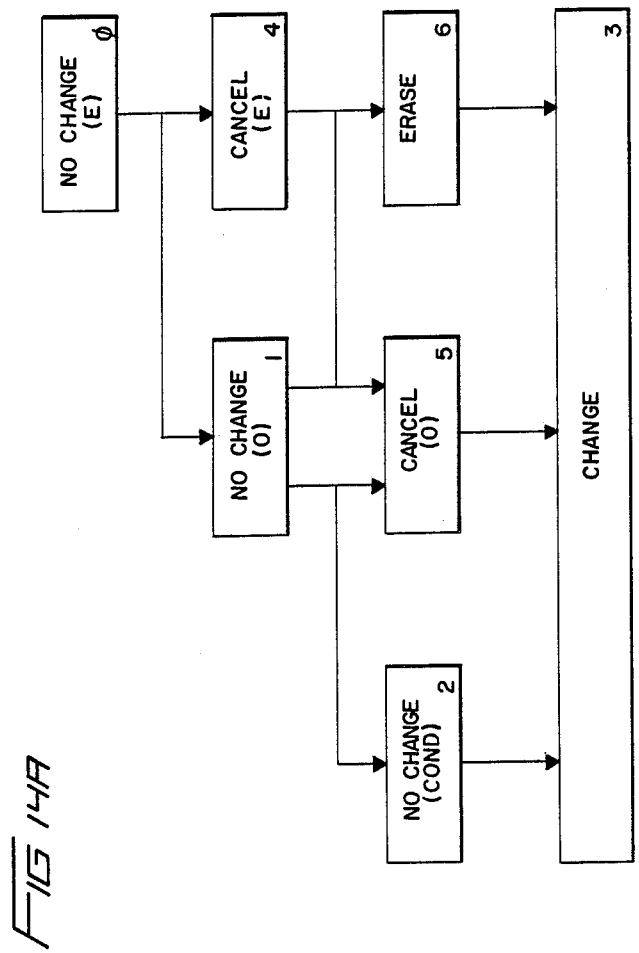
FIG. 14A depicts the hierarchy of the Input Status states and a method of determination of the combinatorial output state when multiple input states are given.

The task of Processor 139 is to determine a highest common descriptor which will acceptably apply to all four input groups and to develop four two-bit Preliminary Action Change Model Existence sub-words. The selection process is similar to the one used for the Contents Processing. A hierarchy of seven descriptors is also used here and the entries are grouped as shown in FIG. 14A. The code number for each descriptor is in the bottom right of each block in FIG. 14A. The highest common descriptor suitable for all four input status words is selected.

As in the case of PROM 134, in order to predetermine the contents of PROM 139 to cover all possible input situations, a simulation is run in accordance with the program flow chart of FIG. 4B and the corresponding BASIC computer program of Listing 2 in the Appendix hereto. The program of Listing 2 has a structure very similar to the program of Listing ).

The Input Status PROM 139 input Address bits are:
A0—Input Status A (L.S.B.)
A1—Input Status A
A2—Input Status A (M.S.B.)
A3—Input Status B (L.S.B.)
A4—Input Status B
A5—Input Status B (M.S.B.)
A6—Input Status C (L.S.B.)
A7—Input Status C
A8—Input Status C (M.S.B.)
A9—Input Status D (L.S.B.)
A10—Input Status D
A11—Input Status D (M.S.B.)

The Input Status PROM 139 Outputs are:
Q0—Status Output (L.S.B.)
Q1—Status Output
Q2—Status Output (M.S.B.)
Q3—Not used
Q4—Existence Word A (L.S.B.)
Q5—Existence Word B (L.S.B.)
Q6—Existence Word C (L.S.B.)
Q7—Existence Word D (L.S.B.)

The four Preliminary Action Change Model Existence sub-words are each formed using, as an MSB (most significant bit) the MSB of the corresponding Input Status. During simulation, the LSB (Least Significant Bit) of these words is determined for the PROM 139 Outputs Q4 through 07 by Listing 2 program statements 250 through 330. The following correspondence in TABLE 5 is thereby achieved between an Input Status and an Existence Word Output for each of the four Change Existence Words.

TABLE 5

| Binary Code | Input Status Word | Change Existence Word | Binary Code |
|---|---|---|---|
| 000 | No Change (E) | No Change | 00 |
| 001 | No Change (O) | No Change | 00 |
| 010 | No Change (C) | No Change | 00 |
| 011 | Change | Change | 01 |
| 100 | Cancel (E) | Cancel | 10 |
| 101 | Cancel (O) | Cancel | 10 |
| 110 | Erase | Erase | 11 |
| 111 | Not Used | | |

The third of the three major processing groups or blocks in the FIG. 9 Change Identifier Processor 78 shown in greater detail in FIG. 11 is the FIG. 11 Output Status Processor 140. This processor is implemented in a 256 word by eight bit PROM which receives as inputs the three bit descriptor from the output of the Contents Processor Register 136, the three bit descriptor from the Input Status Processor 39, a Band 0 identifier bit and a top Band identifier bit.

Figure 15A:
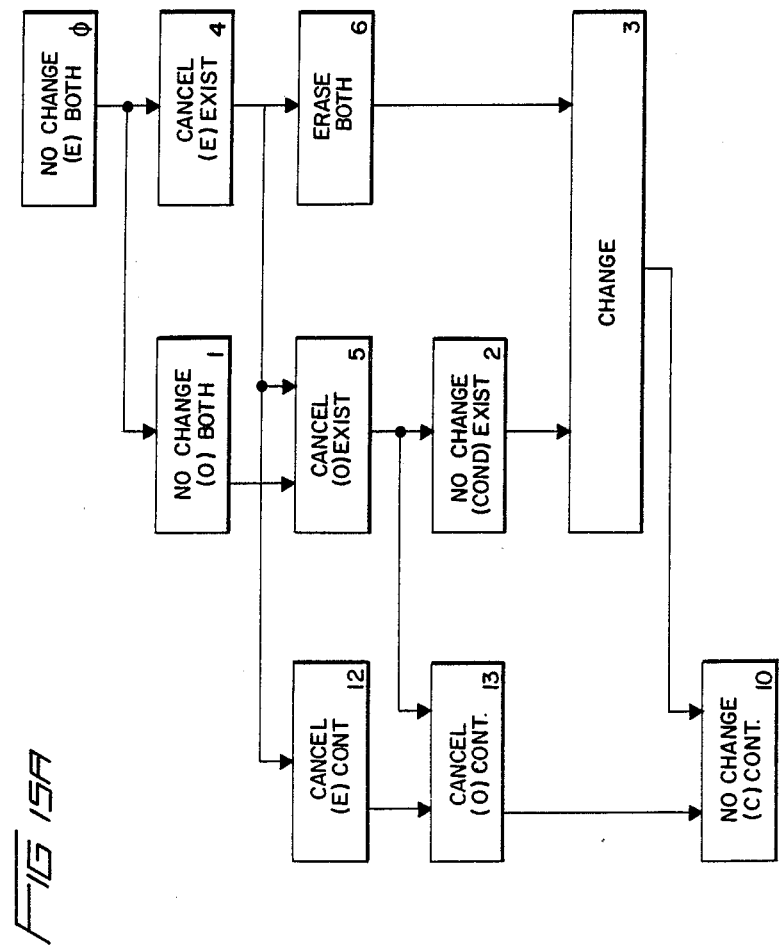
FIG. 15A depicts the hierarchy for determination of the Output Status of the Change Identifier Processor given various states from the Effective Contents and Input Status Processors.

Processor 140 implements the combinational hierarchy of descriptors shown in FIG. 5A. The seven previously defined descriptors have herein been expanded to ten by subdividing the Cancel (E), the Cancel (O) and the No Change (C) each into two separate descriptors based on whether they originate from the Contents Processor Register 136 and show a "Cont." in their boxes in FIG. 15A or from the Input Status Processor 139 and show an "Exist." in their boxes in FIG. 15A. This separation is necessary to provide for the different effects that the Cancel (E), Cancel (O) and No Change (C) have on signalling depending on their origin. The highest common descriptor based on the hierarchy of FIG. 15A is selected.

Figure 15B:
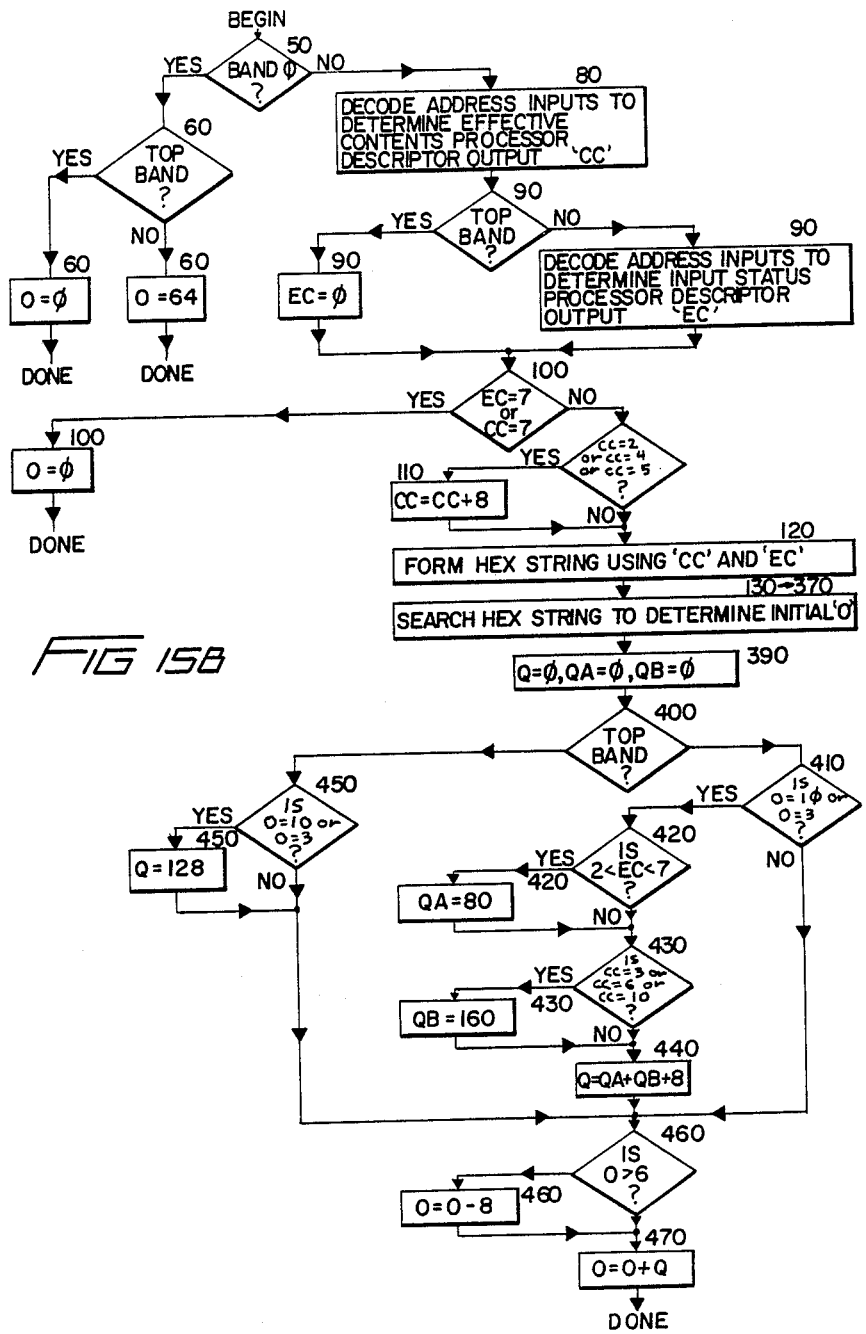

In the same manner as described above, in order to predetermine the contents of PROM 140 to cover all possible input situations, a simulation is run in accordance with the program of Listing 3 of the Appendix hereto corresponding to the flowchart of FIGS. 15B and 15C, FIG. 15C being subsidiary to FIG. 15B.

By the simulation, and by the PROM 140, itself during actual operation, the combined output of the Output Status 142 in FIG. 11 and the Final Storage Action 144 in FIG. 11 are determined. The Final Storage Action takes into account that in Band 0 there are only Existence words stored and one is stored for each and every block. Also in the top band there are no Directory or Existence words stored, only Content words and coefficients where so signalled.

The PROM inputs for the FIG. 11 Output Status Processor 140 are:

A0—Input Status Processor Output (L.S.B.)
A1—Input Status Processor Output
A2—Input Status Processor Output (M.S.B.)
A3—Effective Content Output (L.S.B.)
A4—Effective Content Output
A5—Effective Content Output (M.S.B.)
A6—Band 0 Flag
A7—Top Band Flag The PROM outputs for the FIG. 11 Output Status Processor 140 are:

Q0—Output Status (L.S.B.)
Q1—Output Status
Q2—Output Status (M.S.B.)
Q3—Store Directory Command
Q4—Directory Existence Bit
Q5—Directory Content Bit
Q6—Store Existence Word Command
Q7—Store Content Word Command The actual contents of the PROM 140 as generated by the program of Listing 3 is given in the following TABLE 6:

TABLE 6

| 0 | 0 | 1 | 2 | 5B | 4 | 5 | 6 | 0 |
|---|---|---|---|---|---|---|---|---|
| 8 | 1 | 1 | 2 | 5B | 5 | 5 | 5B | 0 |
| 10 | AA | AA | AA | FA | FA | FA | FA | 0 |
| 18 | AB | AB | AB | FB | FB | FB | FB | 0 |
| 20 | 4 | 5 | A | 5A | 4 | 5 | 5A | 0 |
| 28 | 5 | 5 | A | 5A | 5 | 5 | 5A | 0 |
| 30 | 6 | AB | AB | FB | 6 | FB | 6 | 0 |
| 38 | 0 | 0 | 0 | 0 | 0 | 0 | 0 | 0 |
| 40 | 40 | 40 | 40 | 40 | 40 | 40 | 40 | 40 |
| 48 | 40 | 40 | 40 | 40 | 40 | 40 | 40 | 40 |
| 50 | 40 | 40 | 40 | 40 | 40 | 40 | 40 | 40 |
| 58 | 40 | 40 | 40 | 40 | 40 | 40 | 40 | 40 |
| 60 | 40 | 40 | 40 | 40 | 40 | 40 | 40 | 40 |
| 68 | 40 | 40 | 40 | 40 | 40 | 40 | 40 | 40 |
| 70 | 40 | 40 | 40 | 40 | 40 | 40 | 40 | 40 |
| 78 | 40 | 40 | 40 | 40 | 40 | 40 | 40 | 40 |
| 80 | 0 | 0 | 0 | 0 | 0 | 0 | 0 | 0 |
| 88 | 1 | 1 | 1 | 1 | 1 | 1 | 1 | 1 |
| 90 | 82 | 82 | 82 | 82 | 82 | 82 | 82 | 82 |
| 98 | 83 | 83 | 83 | 83 | 83 | 83 | 83 | 83 |
| A0 | 4 | 4 | 4 | 4 | 4 | 4 | 4 | 4 |
| A8 | 5 | 5 | 5 | 5 | 5 | 5 | 5 | 5 |
| B0 | 6 | 6 | 6 | 6 | 6 | 6 | 6 | 6 |
| B8 | 0 | 0 | 0 | 0 | 0 | 0 | 0 | 0 |
| C0 | 0 | 0 | 0 | 0 | 0 | 0 | 0 | 0 |
| C8 | 0 | 0 | 0 | 0 | 0 | 0 | 0 | 0 |
| D0 | 0 | 0 | 0 | 0 | 0 | 0 | 0 | 0 |
| D8 | 0 | 0 | 0 | 0 | 0 | 0 | 0 | 0 |
| E0 | 0 | 0 | 0 | 0 | 0 | 0 | 0 | 0 |
| E8 | 0 | 0 | 0 | 0 | 0 | 0 | 0 | 0 |
| F0 | 0 | 0 | 0 | 0 | 0 | 0 | 0 | 0 |
| F8 | 0 | 0 | 0 | 0 | 0 | 0 | 0 | 0 |

TABLE 7 below shows the conditions under which storage actions are commanded via Processor 140 PROM Outputs Q3 through Q7 as defined above. An amount is added to that determined for the Output Status alone which affects only the PROM storage bits Q3 through Q7. Thus the only possible numbers which can be added singly or in combination are 8, 16, 32, 64 and 128.

TABLE 7

| TOP BAND | BAND 0 | Condition | Add |
|---|---|---|---|
| Yes | No | No Data | 0 |
| Yes | No | Content (Change or Expec.) | 128 |
| No | No | Null Directory | 8 |
| No | No | No Data | 0 |
| No | No | Content Only | 8 + 32 + 128 |
| No | No | Existence Only | 8 + 16 + 64 |
| No | No | Content and Existence | 8 + 16 + 32 + 64 + 128 |

TABLE 7-continued

| TOP BAND | BAND 0 | Condition | Add |
|---|---|---|---|
| No | Yes | Existence Only | 64 |

During operation, at the time when the final Preliminary coefficient action bit of the block of coefficients being processed has appeared at the output Q(C) of Register 136, the complete content word output 147 is available. Three bits are in Shift Register 138 positions Q(1) through Q(3) and the fourth from Q(C) of Register 136 at the Register 138 D input. These four bits are stored as a map word in the Change Memory if and only if the Store Content Bit from Q(7) of Output Status Processor 140 so instructs. Q(7) is also delayed and stored in Register 141 whose output is one of the two inputs to AND gate 146 to permit, if high, storage of subsequent coefficients. Register 138 is shifted one more time to cause the fourth bit at its input to enter and for all four bits which have been shifted into it to appear at the outputs Q(1) through Q(4). Actual storage of each coefficient is determined by the AND combination of the stored Q(7) and a delayed Bit 1 from Register 138 which determined the preliminary coefficient action. Register 138 and Delay Pipeline 135 are clocked in synchronism such that the correct Bit 1 from said action appears at the Register 138 Q(D) output when the corresponding coefficient appears at the output of Pipeline 135. Thus the correct coefficient from Pipeline 135 is stored if so commanded by the Store Coefficients command 148 from the AND gate 146.

Trial Selective Replenishment Operation

The means for performing the trial Selective Replenishment and the actual Selective Replenishment methods will now be described in greater detail. Specifically, and with reference to FIG. 9, these are operations performed by the Change Model Reconstructor 77, the Transform Model Reconstructor 86 and the Replenishment processor 81. As indicated by the line going from Reconstructor 86 to Reconstructor 77 and also from Reconstructor 86 to Processor 81, the Expectation map data is provided to Reconstructor 77 to retrieve coefficients from the Change Model Memory 79 not directly indicated by Change Model map data, and to Processor 81 to indicate the presence of the Expectation for replenishment processing purposes. The Transform Model Existence words are also required by the Change Model Reconstructor 77 to generate a variable length Change Existence word code and by the Queuing Processor 80 to determine the length, from four to eight bits, of the Change Existence word code to be transmitted to the receiver. Both Reconstructor 77 and Reconstructor 86 provide transform coefficients to Processor 81. A "Start" input to Reconstructor 86 causes it to provide zero value Band 0 Existence words, and as a result, zero value map and coefficient data for all subsequent outputs during the reconstruction of a first image frame. The "Start" signal is also supplied to Change Model Reconstructor 77 to prevent reconstruction of random data existing in Change Model Memory 79 which might otherwise not commence operation with a "null" image with all zero value coefficients. Transform Model Reconstructor 97 at the receiver is provided a "Start" signal to provide a "null" image with all zero value coefficients such that both transmitter and receiver start with the same zero-value coefficient model.

FIG. 16A shows in greater detail the structure and operation of the FIG. 9 Change Model Reconstructor 77. Map reconstruction is performed directly or indirectly by a Map Reconstruction PROM 160, which is 256 words by eight bits. The "R Directory" output Q(0) is determined by the CM Status input, A(0) and A(1), the Expectation A(4), and the control inputs A(5) through A(7). When the Q(0) signal level is high a Directory is commanded to be read from the Change Model Memory; when low it is not. Q(0) also selects either a Directory from the Memory 167 or a zero value Directory in multiplexer 162. The two bit Directory so selected is stored in Register 164 for further use. Directories are not commanded to be read from Band 0 or from Band N. The "R Content" output Q(1) is determined by PROM 160 using the Directory output from Register 162 and control inputs A(5) through A(7). In Band N, Content words are read in response to the CM Status A(0) and A(1), the Expectation A(4) and the control A(6). Q(1) also serves to select a four bit data word at multiplexer 166 from either the Change Memory or a zero value input. The Content word from multiplexer 166 is subsequently stored in Register 168 and in the parallel-in, serial-out shift register 170. The "R Existence" output Q(2) from PROM 160 commands an Existence word to be read from the Change Memory dependent on the Directory input from Register 164 and control inputs A(5) through A(7). Q(2) also selects, if a binary "1", actual Existence words from the Change Memory or if a binary "0", zero valued words via Multiplexer 153. Coefficients are subsequently read from the Change Memory by the read command signal from the output of Register 170. Said signal also selects in multiplexer 172 either the coefficient read from memory or a value of zero. The multiplexer output is subsequently stored in Register 174.

The Map Reconstruction PROM 160 generates outputs in accordance with the programmed contents of the PROM determined during a simulation in the manner described above. The simulation program for determining the contents of PROM 160 is shown in the flowchart of FIGS. 17A and 17B and the corresponding program of Listing 4 in the Appendix hereto. In the program and flowchart the variables RD, RC and RE are used respectively for Directory, Content and Existence word fetches wherein a "1" outcome results in a read, or equivalently a fetch, and a "0" outcome results in no read.

The PROM 160 has the following address inputs:

A0—Change Input Status Bit 0
A1—Change Input Status Bit 1
A2—Change Directory Bit 0, (L.S.B. - Content)
A3—Change Directory Bit 1, (M.S.B. - Existence)
A4—Expectation Input
A5—Band 0
A6—Top Band
A7—Dir/not (Cont. & Exist.)

The PROM Outputs are:

Q0—Read Change Directory Command
Q1—Read Change Contents Command
Q2—Read Change Existence Command The contents of the PROM 160, in hex dump form, are given in the following Table 8:

TABLE 8

| | | | | | | | | |
|---|---|---|---|---|---|---|---|---|
| 0  | 0 | 0 | 0 | 0 | 0 | 0 | 2 | 0 | 0 |
| 8  | 0 | 4 | 0 | 0 | 0 | 6 | 0 | 0 |
| 10 | 0 | 0 | 0 | 0 | 2 | 2 | 0 | 0 |
| 18 | 4 | 4 | 0 | 0 | 6 | 6 | 0 | 0 |
| 20 | 4 | 4 | 4 | 4 | 4 | 4 | 4 | 4 |
| 28 | 4 | 4 | 4 | 4 | 4 | 4 | 4 | 4 |
| 30 | 4 | 4 | 4 | 4 | 4 | 4 | 4 | 4 |
| 38 | 4 | 4 | 4 | 4 | 4 | 4 | 4 | 4 |
| 40 | 0 | 2 | 0 | 0 | 0 | 2 | 0 | 0 |
| 48 | 0 | 2 | 0 | 0 | 0 | 2 | 0 | 0 |
| 50 | 2 | 2 | 0 | 0 | 2 | 2 | 0 | 0 |
| 58 | 2 | 2 | 0 | 0 | 2 | 2 | 0 | 0 |
| 60 | 0 | 0 | 0 | 0 | 0 | 0 | 0 | 0 |
| 68 | 0 | 0 | 0 | 0 | 0 | 0 | 0 | 0 |
| 70 | 0 | 0 | 0 | 0 | 0 | 0 | 0 | 0 |
| 78 | 0 | 0 | 0 | 0 | 0 | 0 | 0 | 0 |
| 80 | 0 | 1 | 0 | 0 | 0 | 1 | 0 | 0 |
| 88 | 0 | 1 | 0 | 0 | 0 | 1 | 0 | 0 |
| 90 | 1 | 1 | 0 | 0 | 1 | 1 | 0 | 0 |
| 98 | 1 | 1 | 0 | 0 | 1 | 1 | 0 | 0 |
| A0 | 0 | 0 | 0 | 0 | 0 | 0 | 0 | 0 |
| A8 | 0 | 0 | 0 | 0 | 0 | 0 | 0 | 0 |
| B0 | 0 | 0 | 0 | 0 | 0 | 0 | 0 | 0 |
| B8 | 0 | 0 | 0 | 0 | 0 | 0 | 0 | 0 |
| C0 | 0 | 0 | 0 | 0 | 0 | 0 | 0 | 0 |
| C8 | 0 | 0 | 0 | 0 | 0 | 0 | 0 | 0 |
| D0 | 0 | 0 | 0 | 0 | 0 | 0 | 0 | 0 |
| D8 | 0 | 0 | 0 | 0 | 0 | 0 | 0 | 0 |
| E0 | 0 | 0 | 0 | 0 | 0 | 0 | 0 | 0 |
| E8 | 0 | 0 | 0 | 0 | 0 | 0 | 0 | 0 |
| F0 | 0 | 0 | 0 | 0 | 0 | 0 | 0 | 0 |
| F8 | 0 | 0 | 0 | 0 | 0 | 0 | 0 | 0 |

Change Status processing is performed in FIG. 16A PROM 176 using inputs from the incoming CM Status 161, Register 168 and the Band 0 control input. PROM 176 output is the Change Model Status to be written back into the Status Memory to be used in four spatially aligned next higher Band processing blocks.

Figure 17C:
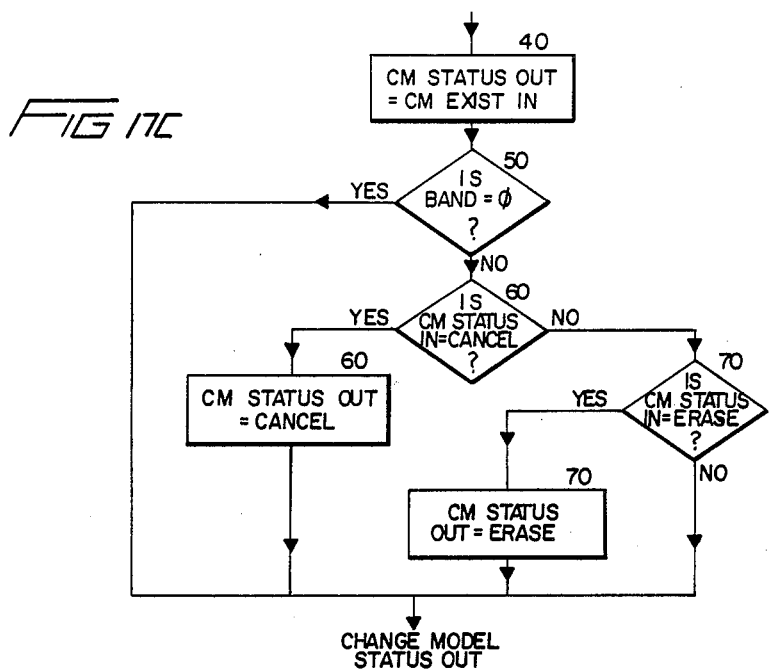
FIG. 17C is a flow chart for the programming of the FIG. 16A Change Status Processor PROM which produces the correct Change Output Status.
Figure 17A:
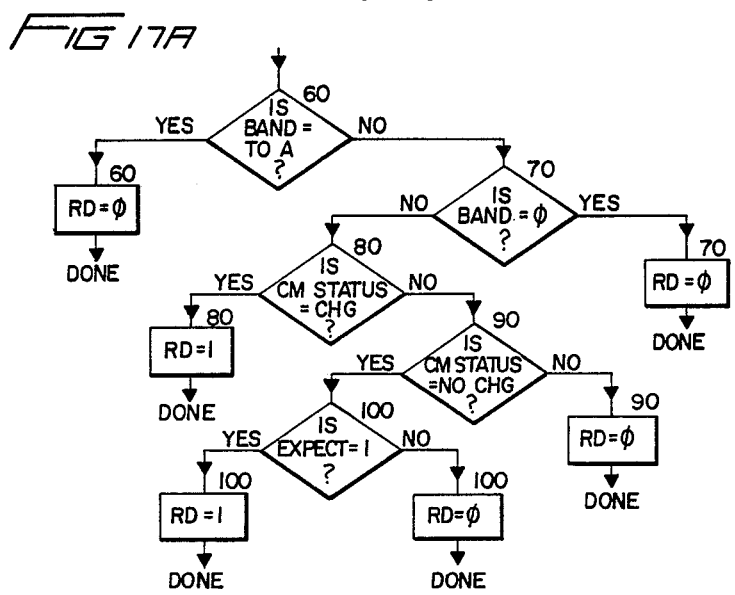

Status Reconstructor PROM 176 is a 2048 word, right bit PROM having contents determined during a simulation by the program of flowchart FIG. 17C and the corresponding. program of Listing 5.

The Status Reconstructor PROM 176 address inputs are:

A0—Change Existence A (L.S.B.)
A1—Change Existence A (M.S.B.)
A2—Change Existence B (L.S.B.)
A3—Change Existence B (M.S.B.)
A4—Change Existence C (L.S.B.)
A5—Change Existence C (M.S.B.)
A6—Change Existence D (L.S.B.)
A7—Change Existence D (M.S.B.)
A8—Change Status Input (L.S.B.)
A9—Change Status Input (M.S.B.)
A10—Band 0 Flag The Status Reconstructor outputs from PROM 176 are:

Q0—Output Status A (L.S.B.)
Q1—Output Status A (M.S.B.)
Q2—Output Status B (L.S.B.)
Q3—Output Status B (M.S.B.)
Q4—Output Status C (L.S.B.)
Q5—Output Status C (M.S.B.)
Q6—Output Status D (L.S.B.)
Q7—Output Status D (M.S.B.)

Outputs from the FIG. 16A Change Model Reconstructor, in addition to the Status and Change Memory Read command signals, are the Change information to the Queuing Processor and the Change coefficients to the Replenishment Processor. Signals to the Queuing Processor include the "Directory P", which indicates whether or not a Directory is present to send to the Queuing Processor, and the two bit Directory itself, a "Content P" indicating the presence or absence of a Content word, the Content word itself, a succession of four "Coefficient P" bits, up to four coefficients in succession, the "Existence P" indicating the presence or absence of an Existence word and the Existence word from the Existence Coding PROM 178. The outputs to the Replenishment Processor include the Serial Content Bit (the same as the "Coefficient P" bit to the Queuing Processor) and the coefficients which are the same as sent to the Queuing Processor.

The Existence Coding PROM 178 more particularly provides for compression of the Existence word issued to the Queuinq Processor. The Existence word will be as short as four bits and as long as eight bits as determined by the Existence word from the Transform Model Reconstructor 159. For each binary "1" in the Transform Model Existence word two bits will occur in the Change Existence word. For each binary "0" in the Transform Model Existence word there will be one bit in the Change Existence word. For this latter case a single Change Existence bit which indicates "Change" if a binary "1" and "No Change" if a binary "0" is all that is required, since the zero valued corresponding Transform Model Existence bit indicates the absence of any spatially aligned higher band coefficients, map words or Expectations in the Transform Model Memory; hence there is no need or use at this location in the Existence word of the Cancel or Erase commands.

The compressed Existence word is uniquely decodable at the receiver since the identical Transform Model Existence word is available at both transmitter and receiver to determine whether a one or two bit Existence command has been transmitted.

The Existence Coding PROM 178 provides an eight bit output word to the Queuing Processor wherein only the number of bits actually required for the variable length Existence word are valid. The Queuing Processor using the same Transform Model Existence word separately determines the actual length of the transferred word and uses only the correct number of Existence word bits to send to the receiver. PROM 178 is bypassed for Band 0 Existence so that the Existence word from Register 168 is sent without use of PROM 178 to the Queuing Processor via buffer 179.

The Existence coding PROM 178 is programmed to perform the above stated function during a simulation as shown in the flowchart of FIG. 17D and the corresponding computer program of Listing 6.

The PROM 178 Address inputs are:

A0 L.S.B. of first Change Model Existence sub-word
A1 M.S.B. of first Change Model Existence sub-word
A2 L.S.B. of second Change Model Existence sub-word
A3 M.S.B. of second Change Model Existence sub-word
A4 L.S.B. of third Change Model Existence sub-word
A5 M.S.B. of third Change Model Existence sub-word
A6 L.S.B. of fourth Change Model Existence sub-word
A7 M.S.B. of fourth Change Model Existence sub-word
A8 Bit 0 of the Transform Model Existence word
A9 Bit 1 of the Transform Model Existence word
A10 Bit 2 of the Transform Model Existence word A11 Bit 3 of the Transform Model Existence word The PROM 178 outputs are:

Q0 Bit 0 of the Compressed Existence Output
Q1 Bit 1 of the Compressed Existence Output
Q2 Bit 2 of the Compressed Existence Output
Q3 Bit 3 of the Compressed Existence Output
Q4 Bit 4 of the Compressed Existence Output, when valid
Q5 Bit 5 of the Compressed Existence Output, when valid
Q6 Bit 6 of the Compressed Existence Output, when valid
Q7 Bit 7 of the Compressed Existence Output, when valid Several input combinations are not possible in practice in that newly generated Cancel and Erase commands will not occur for the case where the Transform Existence is a binary zero indicating the absence of any higher Band coefficients or map components. The PROM 178 is programmed to generate a "No Change" command at the output for these non-occurring inputs, however.

Replenishment Processor

FIG. 16B shows in greater detail the FIG. 9 Replenishment Processor 81 in the transmitter portion, as well as the Replenishment Processor 92 in the receiver portion, since the Replenishment Processor functions of both transmitter and receiver are nearly identical. The inputs, outputs and multiplexer marked with an asterisk are used only for Processor 92 (receiver) and are unnecessary for Processor 81 (transmitter).

The Replenishment Processor 81 is required, in cycles other than an actual replenishment cycle, to pass the Transform Model coefficients without modification through the two stage Delay Pipeline 180 and Multiplexer 182 to the output 184. In these cases the "Send" input to Replenishment Status PROM 188, A(3), is caused to be a low level which in turn causes the select input on Multiplexer 182 to select only the Transform Model coefficients. During an actual replenishment cycle the "Send" signal is controlled by the Queuing Processor to indicate that data is being sent to the receiver and that the new Change Model data should be selected at Multiplexer 182 for replenishment of the Transform Model at the transmitter.

The Replenishment Processor of FIG. 16B both reads and writes a Status bit from and to an inter-Band memory, in the same way previously described processors use a status memory for inter-Band communication between spatially aligned processing blocks. This status bit is used to later indicate in the next higher band whether or not map or coefficient data was accepted for replenishment from the the lower block initiating said status bit. The saved over status bit is called "Sent" and is equal to "1" if the block was transmitted and used for replenishment, and equal to "0" otherwise.

The determination of the "Sent" status bit and also of the output Expectation bit, and of the "Blanking" bit which is only used at a receiver, is implemented in the FIG. 16B 128 word Replenishment Status PROM 188.

Figure 17E:
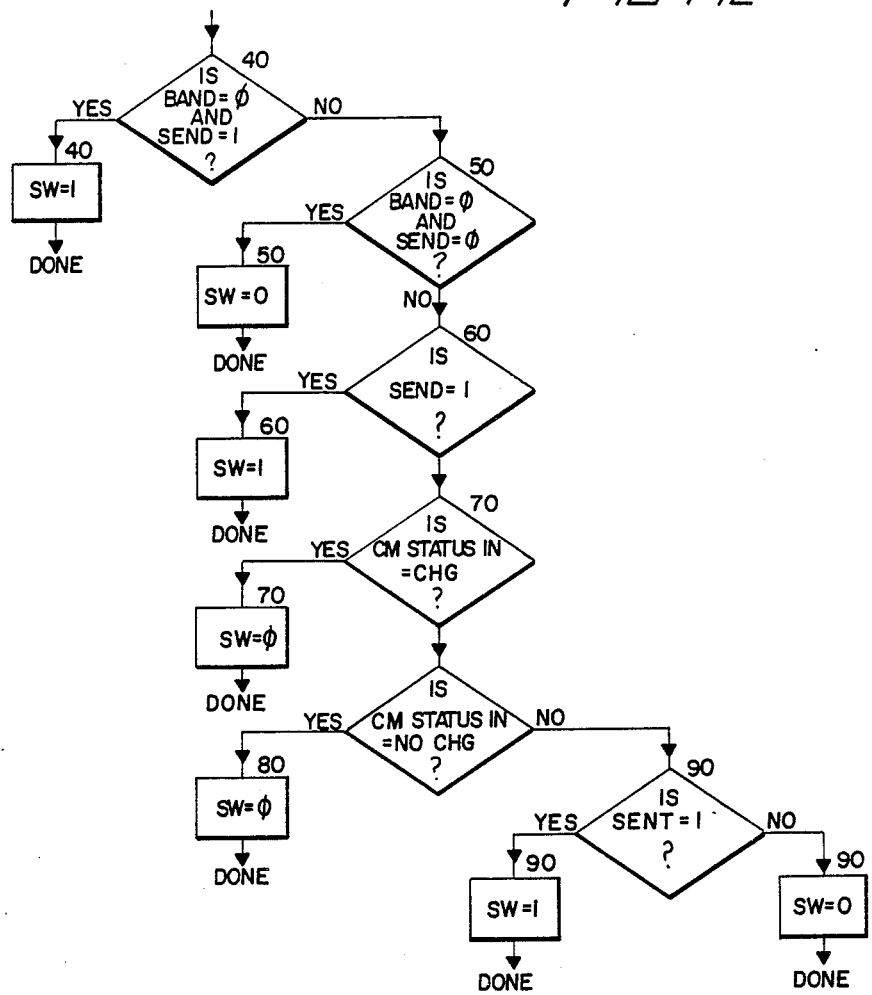
FIG. 17E is a flow chart for the programming of a PROM which generates the correct Sent Status bit in selective Replenishment motion image processing.

A simulation flowchart to determine the Status Bit Q(0) is shown in FIG. 17E. The flow chart to determine the Expectation bit and the Blanking bit is shown in FIG. 17F. The corresponding computer program to determine the PROM 188 contents is shown in annexed Listing 7. The hexadecimal PROM 188 contents shown in the following TABLE 9.

TABLE 9

| 0  | 0 0 | 0 | 0 | 0 | 6 | 1 | 1 1 | 1 | 1 | 1 | 1 | 1 | 1 1 |
|----|-----|---|---|---|---|---|-----|---|---|---|---|---|-----|
| 10 | 6 6 | 6 | 6 | 6 | 1 | 1 7 | 7 | 7 | 1 | 1 | 1 | 1 1 |
| 20 | 0 0 | 0 | 0 | 0 | 0 | 0 | 0 1 | 1 | 1 | 1 | 1 | 1 | 1 1 |
| 30 | 0 0 | 0 | 0 | 0 | 0 | 0 | 0 1 | 1 | 1 | 1 | 1 | 1 | 1 1 |
| 40 | 4 4 | 4 | 4 | 4 | 6 | 5 | 5 5 | 5 | 5 | 5 | 5 | 5 | 5 5 |
| 50 | 6 6 | 6 | 6 | 6 | 6 | 5 | 5 7 | 7 | 7 | 7 | 5 | 5 | 5 5 |
| 60 | 0 0 | 0 | 0 | 0 | 0 | 0 | 0 1 | 1 | 1 | 1 | 1 | 1 | 1 1 |
| 70 | 0 0 | 0 | 0 | 0 | 0 | 0 | 0 1 | 1 | 1 | 1 | 1 | 1 | 1 1 |

The PROM 188 address inputs are:

A0—Input Change Status (L.S.B.) from Register 186
A1—Input Change Status (M.S.B.) from Register 186
A2—Sent bit from Replenishment Status Input 198
A3—Send 181 from Queuing Processor through Register 186
A4—Input Expectation 185 through Register 186
A5—Band 0 indicator
A6—Blanking from Status Input 198 (Receiver only)

The PROM 188 outputs are:

Q0—Sent Status bit to be written into the Status Memory
Q1—Expectation bit output
Q2—Blanking The Replenishment coefficient model is formed from a combination of coefficients from the previous model and from the Change model. This selection is determined one at a time for each coefficient by using the Sent bit read from the Status Memory, the Change Model Status read from the Status Memory and the Change Model serial content bit appropriate to the particular coefficient being selected in sequence. The following TABLE 10 shows how the selection of each coefficient for the new model is made.

TABLE 10

| SENT (read) | Serial Change Content Bit | Change Model Status(read) | Coefficient Selection From | Mux 162 Select |
|---|---|---|---|---|
| 0 (No) | X | X | Previous Model | 0 |
| 1 (Yes) | No Change | No Change | Previous Model | 0 |
| 1 (Yes) | No Change | Change | Previous Model | 0 |
| 1 (Yes) | Change | No Change | Change Model | 1 |
| 1 (Yes) | Change | Change | Change Model | 1 |
| 1 (Yes) | X | Cancel | Previous Model | 0 |
| 1 (Yes) | X | Erase | Change Model | 1 |

The logic to determine the selection operation of TABLE 10 is implemented by gates 192, 193, 194 and 195 and the actual selection is performed by FIG. 16B Multiplexer 182. The output of gate 195, (not Z), selects Transform Model coefficients at the Multiplexer 182 0D input when a binary "0", and selects Change Model coefficients at the 1D input when a binary "1". The selected coefficients exit Multiplexer 182 at the Y output to become the Transform Model Coefficients to the FIFO Memory, 184, and to supply the Blanking Multiplexer, 187. The logic performed by gates 192, 193, 194 and 195 is (not Z)=A*B*(not C)+A*C*D, where A is the Q(B) from Register 190, B is Q(A) from Delay Pipeline 180, C is the Change Model Status bit 1 and D is the Change Model Status bit 0, the last two both from Q(D)

of Register 190. The Blanking Multiplexer 87 is used only when the Replenishment Processor of FIG. 16B is also used as a processor at the receiver.

FIG. 9 Receiver Elements

The receiver which provides for reception of coefficients from the transmitter and for revising the coefficient model of the image will now be described in greater detail. With reference to FIG. 9, Blocks 93, 94, 96 and 97 provide identical functions at the receiver as blocks 82, 83, 84 and 86 perform at the transmitter. The receiver Replenishment Processor 92 will be described with reference to the transmitter Replenishment Processor 81 and the Blanking function provided at the receiver not required at the transmitter. The Transmission Channel 85 in FIG. 9 supplies a serial data bit stream to Receiver Transmission Channel Buffer 86. Buffer 86 in turn sub-divides said data into component parts and supplies said parts to Buffer 88 and to the Sub-band and Band 1 B-function processor, the latter not shown in FIG. 9 but described separately hereinafter beginning with reference to FIG. 20A.

Receiver Change Reconstructor 90

Change Reconstructor 90 is shown in detail in FIG. 18A and comprises Change Decoder 272, Queuing Counters and Comparators 274 and Coefficient Buffer 276.

The Change Data from the Receiver Transmission Channel Buffer 88 in FIG. 9 is provided to FIG. 18A Change Decoder 272. The decoder 272 receives the Band 0 Existence words from one dedicated section of Buffer 88 containing said words by activating the Band 0 Pop Stack Command emanating from FIG. 18A Decoder 272. FIG. 9 Buffer 88 supplies the data containing the run-out Band number and quantity of data directly to Queuing Counters and Comparators 274. The Change map and coefficient data contained in FIG. 9 Buffer 88 is accessed by FIG. 18A Decoder 272 by activating the Band 1 through Top Band Stack Pop command which indexes a memory pointer in Buffer 88 and supplies the Band 1 through Top Band Change Stack Data Input.

Decoder 272 decodes both the map data and the coefficients for Band 1 through the highest band, Band N, and provides the number of bits of incoming data used in each decoding operation to block 274 and provides the Change Coefficients themselves to Coefficient Buffer 276. In turn, Coefficient Buffer 276 supplies said coefficients to the FIG. 9 Change Coefficient Replenishment Processor 92. FIG. 18A Decoder 272 supplies the Serial Change Contents bit which indicates which coefficients are to be changed, directly to the FIG. 9 Coefficient Replenishment Processor 92. In addition, the sub-processing block Expectation bit and the Transform Model Existence word, both from FIG. 9 Reconstructor 97, are supplied to FIG. 11A Decoder 272 to signal the expected arrival of new map and coefficient data not directly signalled by Change map data, and to permit proper decoding of Change Existence words in Decoder 272 respectively. Queuing Counters and Comparators 274 retains the information sent prior to transmission of the map and coefficient data concerning the quantity of data to be sent and in which Band the data is terminated for the present File Period. During the Change Decoding operation block 274 supplies a "Send" signal to Decoder 272 which indicates, if a binary "1", that Change Data for the present Band and spatial location is available to be decoded, and if a binary "0" that said Change data is not available. The "Send" signal may alternate many times between a "1" and a "0" during the decoding of Change Data in a File Period due to the order of transmission of coefficients. If the order of the data is first by horizontal strip starting at the top and proceeding downward and second by Band number starting with Band 1 and proceeding upward as described previously in the description of the transmitter then the "Send" signal must alternate to be able to direct the active decoding of Change Data in some bands but not others in each successive strip. Block 274 also provides a "Send" signal to the FIG. 9 Replenishment Processor 92.

Figure 18B:
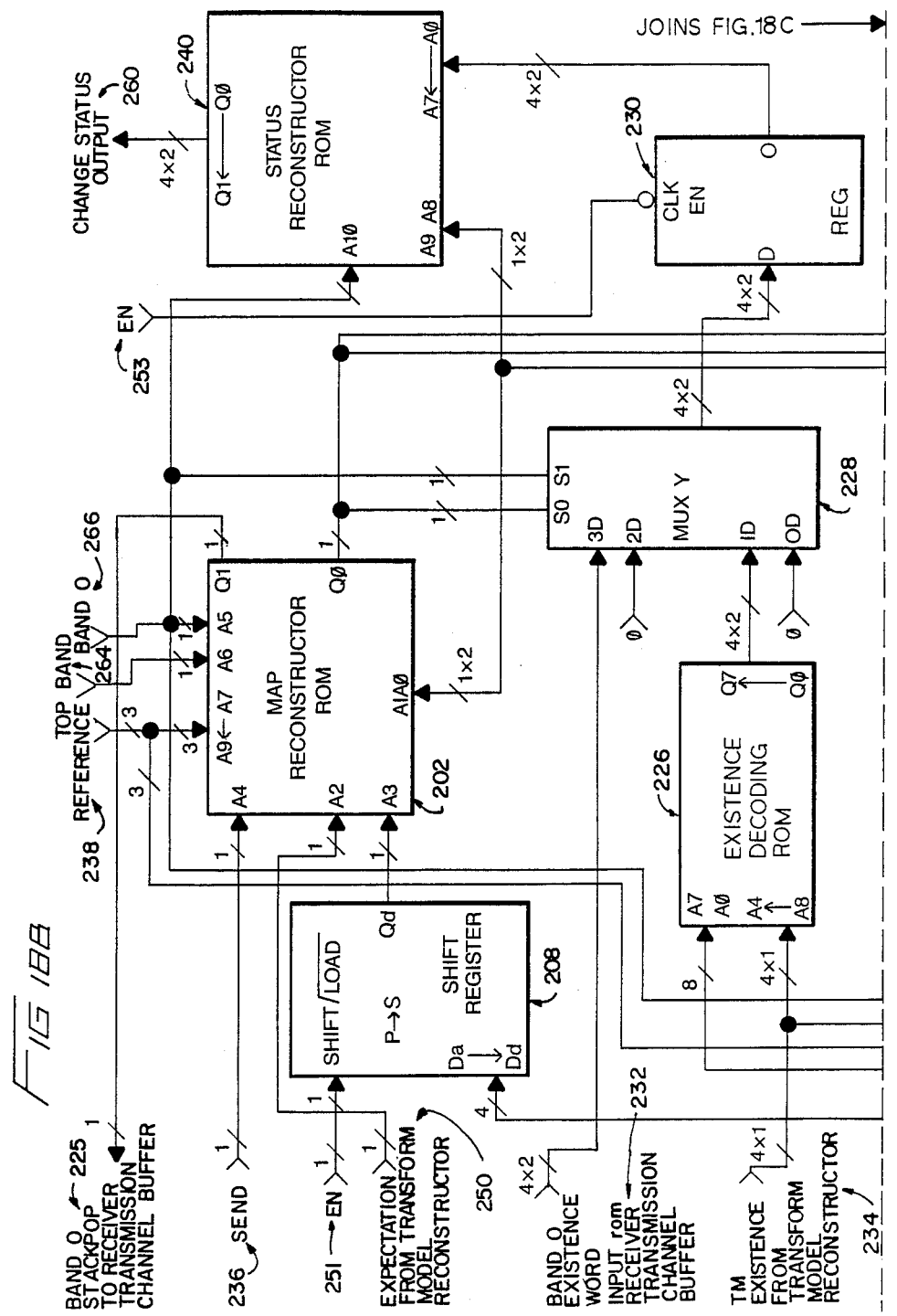
FIG. 18B is a more detailed diagram of the FIG. 18A Change Decoder at the receiver.

With reference now to FIG. 18B, shown are the details of the Change Decoder 272 of FIG. 18A. The Change Data 218 of FIG. 18B is available to the Fixed to Variable Length Converter 216 of the Change Decoder as a pre-determined sequence of fixed length data words. Although the words are of fixed length the data within these words are of variable length and any single said data word might be wholly contained within a fixed length word or could be contained partly in one fixed length word and partly in the following word. The function of Converter 216 is to output in parallel twelve bits, corresponding to but not limited to the presently greatest length coefficient word, such that the first previously unused bit is positioned in the least significant bit location of the parallel output word each time an output is to be taken from Converter 216 and the next 15 bits successively occupying the more significant bit positions. External devices which perform the decoding of the output word in turn provide Converter 216 with the number of bits of the 16 bit word which were actually used, starting with the least significant bit. Converter 216 in turn then relocates the first unused bit from the operation just concluded in the least siqnificant bit position and the process is ready to repeat. New words are taken from input 218 as required. After a complete fixed length word from input 218 has been used by Converter 16 said Converter generates a binary "1" state at Pop Change Stack command 220 which causes a counter in the FIG. 9 Buffer Memory 88 to be indexed by one which in turn then addresses the next word in the buffer memory which in turn becomes available at FIG. 18B input 218. The Converter 216 operates only on map and coefficient data in Bands 1 through N where N is the highest band used in the system. Sub-band map coding and Band 1 B-functions are processed elsewhere and described later.

The Map Reconstructor PROM 202 output Q(0) determines if Change data are to be accessed from Converter 216. Said data can be either map or coefficient data. When a Directory or Contents pointers are accessed they are stored in Parallel-to-Serial Shift Register 208 to be used one at a time by Reconstructor PROM 202 in accessing further Change data. A two bit Directory is entered into Register 208 with the Existence bit first presented at its output to the A(3) input of Reconstructor PROM 202. The next data accessed from Converter 216, if and only if said Existence bit is a binary "1", is an Existence word which is supplied to PROM 226. After the Existence word operation is performed Register 208 shifts the Directory data such that the next bit which is the Contents bit is presented to A(3) of PROM 202. If a Change Contents word is indicated to be present in the data presented to Converter 216 then a four bit Contents word is loaded into Register 208. This four bit word is subsequently used one bit at a time to identify and fetch Change coefficients indicated to be present in the Converter 216 data. Should no Change Content word be indicated by the Content Directory bit then the Q(0) output of Reconstructor PROM 202 is a low signal level and causes Multiplexer 206 to supply a zero value Content word to Register 208.

Change Existence words when accessed are issued by Converter 216 and supplied to Existence Decoding Prom 226 at inputs A(0) through A(7). During this process the Transform Model Existence words from the Transform Model Reconstructor for the same processing sub-block 234 are supplied to both PROM 226 and the Existence Number of Bits PROM 210 to both properly decode the Change Existence word and supply it to Multiplexer 228 and to decode the number of bits of input Change data in the Existence word. Multiplexer 228, in this case, passes the decoded eight bit Existence word on to Register 230 which in turn supplies it to the Status Reconstructor PROM 240 inputs A(0) through A(7).

Change Contents words accessed by Converter 216 pass through Multiplexer 206 and are stored in the Parallel-to-serial Shift Register 246 to be subsequently output one bit at a time through Register 249 as the Serial Change Content bit 252.

Change coefficients issuing from Converter 216 are supplied to the Variable Length Coefficient Decoder 211 This decoder respectively decodes the number of bits present in the variable length coefficient word and decodes said word itself providing a decoded fixed length (eight bits in the present implementation) Change coefficient output which is supplied to the 1D input of Multiplexer 212. The output word indicating the number of bits in the variable length representation for transmission is passed to the 1D input of Multiplexer 214 which in turn passes it to Converter 216 and Output 224. Map Reconstructor PROM 202 can indicate via a low signal level at output Q(0) that no data is to be read during the present clock cycle and this output is supplied to the select input on Multiplexer 214 to provide a zero value for the number of bits used at Output 224, and to Multiplexer 212 to provide for selecting either decoded Change coefficients when present or zero value coefficients when so indicated by either a Content bit or and Erase Change Status into PROM 202. A zero value at Output 224 is also supplied to Converter 216 to inhibit any other data access at this time.

The Number of Bits Output 224 is supplied to the Queuing Counters which maintain the sums of the number of bits received by Band number and particularly in the Band which the transmitter previously indicated did not have a complete number of bits for the entire image, i.e. the Band in which bit run-out occurs. When said run-out occurs a comparator in Block 274 of FIG. 18A indicates this fact and causes the "Send" command entering the Map Reconstructor 202 of FIG. 18B as input 236 to have a low signal level. Said input will thenceforth have a low level for all subsequent processing blocks in that same Band. The "Send" signal will always have a high value for all Bands below the Band in which run-out occurs and will always have a low output for all Bands above the Band in which run-out occurs.

The Map Reconstructor PROM 202 requires a three bit Reference input, 238 which instructs said PROM as to which type of data word is being decoded for the present clock cycle. The Number of Bits PROM 210 requires only two of three said reference bits, as shown in TABLE 11.

TABLE 11

| Binary Reference | Currently Decoded Data Word | Possible Number of Bits |
| --- | --- | --- |
| 0 | None | 0 |
| 1 | Directory | 0,2 |
| 2 | Existence | 0,4,5,6,7,8 |
| 3 | Contents | 0,4 |
| 4–7 | Coefficients | 0–12 |

In TABLE 11 any Binary Reference between four and seven inclusive signals a coefficient word.

Multiplexer 228 operates in the following manner for different conditions. Band 0 Change Existence words are selected from the 3D Multiplexer input. Said words are extracted from the receiver's input data stream and stored in Buffer 88 of FIG. 9 prior to starting of the present operations. Said words do not possess variable length codes and hence do not pass through PROM 226 or PROM 240. For Bands 1 through (N−1) multiplexer 228 selects the 1D input which passes an eight bit data word from PROM 226 on to Register 230 if a Change Existence word is present in the Change data. When said word is not present Multiplexer 228 selects the 0D input which causes a zero value word to be passed to Register 230. No Existence words are transmitted or expected for Band N and hence do not pass through PROM 226.

The Status Reconstruction PROM 240 in FIG. 18B is identical to the previously described Status Reconstruction PROM 176 used in the transmitter shown in FIG. 16A and is not described again here.

The Map Reconstructor PROM 202 provides the means for generating a control signal Q(0) which selects data sources for Multiplexers 206, 212, 214 228. A second output Q(1) provides the means for accessing Band 0 Existence data in sequence from Buffer 88 of FIG. 9.

The contents of the Map Reconstruction PROM 202 are developed by a simulation run in accordance with the program flowchart of FIG. 19A, and the corresponding program of Listing 8.

The inputs to PROM 202 are:

A(0) Change Status Input bit 0
A(1) Change Status Input bit 1
A(2) Expectation bit from Transform Model Reconstructor
A(3) Input from Parallel-to-Serial Shift Register 208
A(4) Send input from Queuing Counters and Comparators
A(5) Band 0 flag indicator
A(6) Top Band (Band N) indicator
A(7) Reference Code Bit 0 (re. Table 18)
A(8) Reference Code Bit 1 (re. Table 18)
A(9) Reference Code Bit 2 (re. Table 18)

The Directory, Contents and Existence Number of Bits PROM 210 provides the means for determining the length of the map codes and passing said length as a four bit output word Q(0) through Q(3) to the 1D input of Multiplexer 214.

The contents of the PROM 210 are developed by a simulation run in accordance with the program flowchart of FIG. 19B, and the corresponding program of Listing 9. The results of this simulation, which become the actual contents of the PROM 210 are as given in the following TABLE 12:

TABLE 12

| 0   | 0 0 | 0 | 0 | 0 | 0 0 | 0 | 0 0 | 0 | 0 | 0 | 0 | 0 0 |
|-----|-----|---|---|---|-----|---|-----|---|---|---|---|-----|
| 16  | 2 2 | 2 | 2 | 2 | 2 2 | 2 | 2 2 | 2 | 2 | 2 | 2 | 2 2 |
| 32  | 4 5 | 5 | 6 | 5 | 6 6 | 7 | 5 6 | 6 | 7 | 6 | 7 | 7 8 |
| 48  | 4 4 | 4 | 4 | 4 | 4 4 | 4 | 4 4 | 4 | 4 | 4 | 4 | 4 4 |
| 64  | 0 0 | 0 | 0 | 0 | 0 0 | 0 | 0 0 | 0 | 0 | 0 | 0 | 0 0 |
| 80  | 0 0 | 0 | 0 | 0 | 0 0 | 0 | 0 0 | 0 | 0 | 0 | 0 | 0 0 |
| 90  | 0 0 | 0 | 0 | 0 | 0 0 | 0 | 0 0 | 0 | 0 | 0 | 0 | 0 0 |
| 112 | 0 0 | 0 | 0 | 0 | 0 0 | 0 | 0 0 | 0 | 0 | 0 | 0 | 0 0 |

The inputs to PROM 210 are:

A(0) Transform Model Existence Bit 0
A(1) Transform Model Existence Bit 1
A(2) Transform Model Existence Bit 2
A(3) Transform Model Existence Bit 3
A(4) Reference Code Bit 0 (re. Table 18)
A(5) Reference Code Bit 1 (re. Table 18)
A(6) Band 0 Indicator The Existence Decoding PROM 226 provides the decoding function which is the inverse of the coding function performed by PROM 178 of FIG. 16A. The eight bit output of this 4096 word PROM provides the input at 1D of Multiplexer 228 which in turn passes, when so selected, to Register 230 and then to the Status Reconstruction PROM 240.

The contents of the Existence Decoding PROM 226 for providing the required outputs Q(0) through Q(7) are developed by a simulation run in accordance with the program flowchart of FIG. 19C and the corresponding program of Listing 10.

The FIG. 9 Replenishment Processor 92 is identical to that shown in detail in FIG. 16B for the transmitter. The Blanking Multiplexer 187 of FIG. 16B was not described previously as it is not used for transmitter operation. Said multiplexer 187 serves to select either the coefficients issuing from Multiplexer 182 of FIG. 16B or zero valued coefficients for a Reconstruction Transformer such as described in U.S. Pat. No. 4,447,886, dependent upon the receipt of coefficient data which has been signalled by Change Existence words spatially aligned in the next lower Band, or by the satisfying of Expectations from the Transform Model Coefficient Memory. Multiplexer 187 selects zero value coefficients when either of two cases occurs. The first is when Change Existence words signal the presence of next higher band Change data but that data is not forthcoming in the present File Period due to insufficient space in said File Period. The second is when an Expectation existing in the receiver Transform Model memory is not satisfied in the present File Period, also due to insufficient space in said File Period. In addition, all higher band sub-processing blocks spatially aligned with any block in which coefficients were "blanked" by Multiplexer 187 and zero valued ones issued at its output are similarly blanked by Multiplexer 187 in response to its Select input from Q(C) of Register 190. The means for accomplishing this is the Blanking signal which is written into the Status Memory and read out in the spatially aligned next higher band processing blocks. This action is the important means by which a moving image is maintained free of image components no longer a valid part of the current image. The result of this action is to cause a loss of resolution, due to some higher-band coefficients not being present, in spatial areas of motion containing higher-band components but to prevent objectionable image trailing wherein higher-band components no longer valid remain a part of the most recently presented image a the receiver.

Map Signalling For Band 1 B-Functions

Map signalling applying to the Band 1 B-functions of the Pyramid Transform and the relationship with the previously described map signalling for the coefficients is now described. Coding of the Band 1 B-functions into an equal number of Band 1 B-function Descriptors for efficient transmission is discussed subsequent to the map signalling.

FIG. 20A depicts the hierarchy of this signalling. The lowest element of the chain is the Sub-band Directory which if a binary "1" indicates the presence of an accompanying Sub-band Existence word. Conversely a binary "0" for said Directory indicates the absence of said Sub-band Existence word. The absence of said Sub-band Existence word indicates that no changes are transmitted for the four spatially aligned Band 1 B-functions, and no signalling is transmitted for any spatially aligned coefficients except which can occur for the case of a pre-existing Expectation marker. Each Sub-band Existence word, if it exists, contains four bits, each of which points to the existence or absence of a Band 0 Directory. Again, a binary "1" indicates the presence of said Band 0 Directory and a binary "0" indicates its absence.

Each Band 0 Directory contains two bits, of which the first indicates the presence or absence of a B-function Content word and the second indicates the presence or absence of a Band 0 Existence word by a binary "1" or a binary "0" respectively. In turn, each B-function Content word, when present, indicates the presence of one or more B-function Descriptors and the presence of a value for said Descriptors. The form of this B-function Descriptor is described hereinbelow subsequent to this present map signalling description, and is not shown in FIG. 20A. A binary "0" in the B function Contents word indicates No Change in the applicable B-function Descriptor whereas a binary "1" indicates the presence of a Change and following the Content word and Band 0 Existence word, if any, the value of each Descriptor change. Thus, a single Sub-band Directory has control over the presence or absence of sixteen Band 1 B-function Descriptors and four Band 0 Existence words.

Each of the Band 0 Existence words has, in this present example, three two-bit words. Each two-bit word has as possible outcomes:

0 0—No Change
0 1—Change
1 0—Cancel
1 1—Erase

Each Band 0 Existence word pertains to and controls the three Directories, which in turn control three Content words, three Band 1 Existence words and twelve Band 1 coefficients, of a Band 1 processing block. Each processing block is divided into three separate sub-processing blocks, for separate Horizontal (H), Vertical (V), and Diagonal (D) signalling, although said separation is not a necessary requirement of this signalling. The Existence word signalling from each Band 0 Existence word to three Directories in Band 1 is different from that used within the previously described coefficient processing wherein a Band "L" Existence word of either the horizontal, the vertical or the diagonal kind signals information concerning four spatially aligned sub-processing blocks of the same kind in Band "L+1". If and only if all three two-bit codes in the Band 0 Existence word are zero valued, meaning no changes in any of the H, V or D paths, then the associated Band 0 Directory bit is a zero value. Since each H, V or D path directly controls four coefficients in Band 1, each Sub-band Directory controls 48 said Band 1 coefficients, in addition to the sixteen Band 1 B-function descriptors. In extension, each Sub-band Directory controls 192 Band 2 coefficients and so forth. In a five band system each Sub-Band Directory controls 16,384 coefficients and Band 1 B-functions. In a total image having approximately 256 thousand coefficients and Band 1 B-functions only 16 Sub-band Directories control all of said coefficients and Band 1 B-functions.

Figures 20B, 20C:
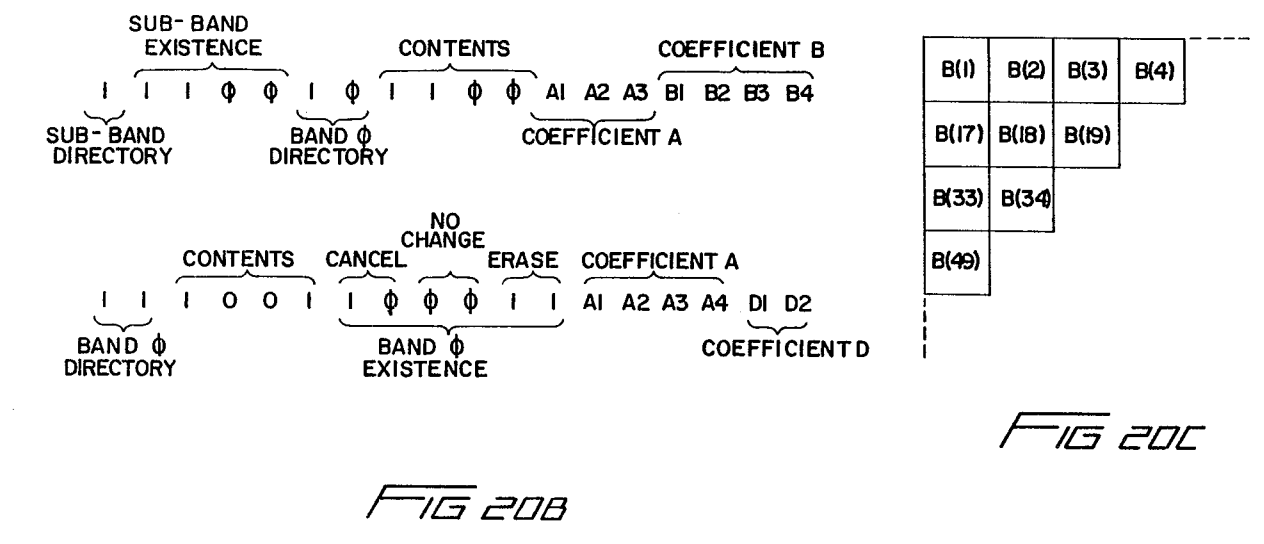

FIG. 20B shows a serial bit stream corresponding to the example of FIG. 20A. Said stream is the result of data shown in FIG. 20A, as well as coefficient data, at the transmitter, and is the cause of the data of FIG. 20A and the accompanying coefficient data at the receiver. Said serial bit stream starts with a Sub-band Directory and is followed by a Sub-band Existence word if and only if said Sub-band Directory bit has a binary value of "1". No Sub-band Existence word follows, nor do any of the map components to which it might point if it did exist, follow if said Sub-band Directory has a binary value of "0". A zero-valued Sub-band Directory is always followed by the next Sub-Band Directory in sequence, unless it is the final Sub-band Directory in which case there is no further Sub-band or Band 0 signalling in the File Period.

As shown in FIG. 20B a Band 0 Directory follows a Sub-band Existence word if the latter is present. A Band 0 Directory exists for each of the binary 1's present in the Sub-band Existence word. The left bit in the Band 0 Directory indicates with a binary "1" the presence of an accompanying B-function Contents word in the bit stream or, with a binary "0" the absence of an accompanying B-function Contents word. The right bit of said Directory in the same way as with the Contents word indicates the presence or absence of the Band 0 Existence word in the bit stream. Following the Band 0 Directory is the B-function Contents word subject to the condition that its presence is indicated by the Band 0 Directory. Following the B-function Contents word, or if said word is not present the Band 0 Directory itself, is the Band 0 Existence word, subject to the condition that its presence is indicated by the Band 0 Directory. Following the Band 0 Existence word, if said word is present, or the Contents word if no Band 0 Existence word is present, are the B-function Descriptors subject to the condition that one or more of them are indicated to be present by the B-function Content word.

Coding of the Band 1 B-functions for transmission is now described. Said functions are the lowest spatial frequency elements to be transmitted, directly or in the preferred form of Band 1 B-function Descriptors. Their quantity depends on the number of bands used in the transform process as well as the number of pixels in the original digitized image. An example which will be used here contains 16 horizontal by 16 vertical Band 1 B-functions. This section describes a novel coding method to reduce the quantity of data required for the transmission of those fraction of said B-functions which require change in a motion image. Said coding method takes advantage of the fact that Band 1 B-functions have footprints on the original pixel space which partially overlap each other and also that there is usually some statistical correlation in natural images between spatially adjacent areas. The quantity of data required to be transmitted per Band 1 B-function can be reduced from about ten bits to four or five bits on the average using variable length coding.

The method in general is to model the amplitude of a particular element of the Band 1 B-function group both at the transmitter and the receiver by an amount equal to one-half the sum of two of said element's nearest neighbors. A difference is then formed between said model and the actual element. Said difference is then coded by a variable length (Huffman) coding process to take advantage of a statistical amplitude distribution highly peaked near zero amplitude and the result transmitted to the receiver. At said receiver the aforementioned difference is recovered from the variable length code and said difference then added to the same model of the element formed at the receiver to recover the actual Band 1 B-function value. A similar but modified procedure is used at two of the four edges of the image. FIG. 20C shows the top left portion of an image and the organization of Band 1 B-functions. The top row contains 16 elements which are B(1) through B(16), the second row contains 16 elements which are B(17) through B(32) and so forth. As an example of the aforementioned coding method, element B(34) is now processed. The model of B(34) is formed by using the neighbor above it B(18) and the neighbor to its left B(33):

$$B(34\ Model) = 0.5 * (B(18) + B(33)).$$

The difference to be variable length coded is:

$$B1(34) = B(34) - B(34\ Model).$$

At the receiver the same model B(34 Model) is formed. When B1(34) is received from the transmitter, B(34) is reconstructed by:

$$B(34) = B(34\ Model) + B1(34).$$

This formulation is used for all elements except the top row and the left column. For the top left corner, the Band 1 B-function is transmitted directly. In the previous nomenclature, $$B1(1) = B(1).$$

For the remainder of the top row,
$$B1(N) = B(N) - B(N-1),$$

where N refers to elements along the top row. For the left column, $$B1(J) = B(J) - B(J-16),$$

where J refers to elements in the left column. Obviously one could have started this process in a different corner of the image to generate equations with different element relationships but the general method would still be the same.

It might appear that it is necessary to quantize the B1(·)elements to provide for values of an integer plus one-half as shown in the example where B(18)=20, B(33)=39 and B(34)=28:

$B1(34) = 28 - 0.5*(20 + 39) = -1.5.$

However it is possible to use only integers for transmission and subsequently reconstruct exactly the same values at the receiver by employing a numerical truncation process at the transmitter and a numerical rounding process at the receiver. Examples of the truncation used here are:

| Value | Truncated Value |
| --- | --- |
| 1 | 1 |
| 1.5 | 1 |
| 2 | 2 |
| −1 | −1 |
| −1.5 | −2 |
| −2 | −2 | and so forth. At the receiver the aforementioned calculation is performed using the descriptor received from the transmitter and the model formed at the receiver. The result is then rounded as follows:

| Value | Rounded Value |
| --- | --- |
| −.5 | 0 |
| 0 | 0 |
| +.5 | 1 |
| 1 | 1 |
| 1.5 | 2 |
| 2 | 2 | and so forth.

In the above example of the method B1(34) has a value of −1.5 and is truncated to −2. At the receiver the value of B(34) is calculated as the sum of the model and the transmitted B1(34) which is 29.5−2 which, when rounded, is the desired value of 28.

Sub-Band Coding

Figure 21:
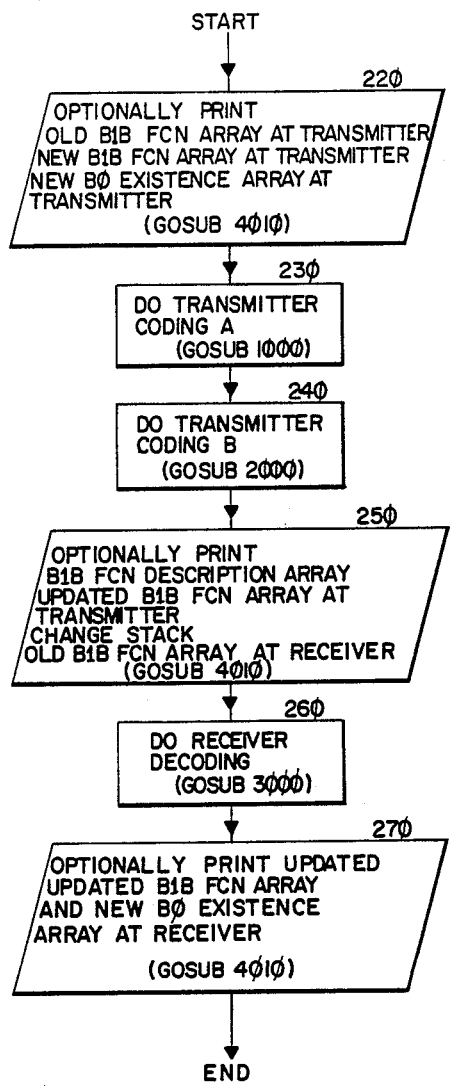
FIG. 21 is an overall flow chart showing the organization of a computer program to perform Sub-band coding operations and the calculation of Band 1 B-function Descriptors at the transmitter and reconstruction of the B-functions at the receiver.

The means of implementation of the methods of the Sub-band Coding and of the Band 1 B-function Coding is now described. Because there are only 256 Band 1 B-functions in the aforementioned example the data processing rate is much lower than that for performing the basic transform itself and implementation by microcomputer is feasible and practical. FIG. 21 shows a flow chart outline for a computer program which performs all of the data processing for both the transmitter coding and receiver decoding methods. Following FIG. 21 are flow charts showing detailed implementation of the methods. Also, the flow charts are further implemented and described by listings of a BASIC computer program to demonstrate their operations. The computer programs also contain optional Print statements to show initial, intermediate and final values of processing results as an aid to understanding the operation of the methods.

The numbers 220, 230, 240, 250, 260 and 270 in FIG. 21 refer to the program statement numbers in Listing 11. It should be noted that the BASIC computer program itself will not usually execute sufficiently rapidly to perform all of the described operations in the intended real time application. The specific BASIC coding example, however, permits additional clarity of the intended operations and allows one to more directly implement them in a faster machine language coding using any one of a number of available microcomputers.

The first block in FIG. 21 executes the print out of the old Band 1 B-functions which are the results of processing prior to the present processing operations. Also printed are new Band 1 B-functions which have issued from the new forward transform process, and new Band 0 Existence words which have issued as a portion of the map outputs of the previously described Coefficient Processor. The second block performs the Transmitter Coding A function and the third block performs the Transmitter Coding B function which in combination comprise the complete transmitter processing function. The fourth block provides for printing the Band 1 B-function Descriptor array, the revised Band 1 B-function array at the transmitter, the Change Stack, and the old Band 1 B-function array at the receiver. The fifth block contains the receiver decoding function such as to supply map coding and Band 1 B-functions to the correct locations in the receiver arrays. The sixth block executes the printing of the revised Band 1 B-function array and the new Band 0 Existence map held at the receiver after receipt of the data from the transmitter. The Sub-block Coding and Band 1 B-function Processing operations are at this point completed at both transmitter and receiver until the next File Period.

The Transmitter Coding A is performed by the subroutine at statement 1000 and is called by statement 230 shown in FIG. 21 whereas Transmitter Coding B is performed by a subroutine at statement 2000 and called by statement 240. BP(·) is the array of 16 by 16 previous Band 1 B-functions, BN(·) is the array of 16 by 16 new transform Band 1 B-functions, and A(·) is the 8 by 8 array of new Band 0 Existence words from the Coefficient Processor. The Coding A operation also includes the revision of the array of Band 1 B Functions BP(·) to reflect changes between BN(·) and BP(·) which have occurred in the new File Period. Transmitter Coding B produces a stream of combined data T(·) from the operations of Transmitter Coding A. The B-function Descriptors can be coded by variable length codes using the well known Huffman Coding technique, said technique not being herein shown.

The Receiver Decoding operates on the output of the variable length coded signal received from the transmitter which is taken herein to be the same array T(·) as produced by the Transmitter Coding B operation. Computer statements starting at 3000 provide for revision of the array of Band 1 B-functions at the receiver RP(·) such as to be identical to those revised at the Transmitter, and to provide the array of Band 0 Existence words RA(·). The subroutine starting at statement 4010 provides for printing out data arrays called by statements at 220, 250 and 270.

The Transmitter Coding A uses the aforementioned data input arrays BP(·), BN(·) and A(·) and forms the arrays:
(1) Band 1 B Function Descriptors, DE(·),
(2) Band 1 B Function Content Words, C(·),
(3) Band 0 Directory, D(·), and,
(4) Sub-band Existence Words, E(·).

Also performed is the revision of the array BP(·) at the transmitter to include changes determined to have occurred between previous elements of BP(·) and corresponding elements of the new BN(·).

The Arrays DE(·), A(·), C(·), D(·), and E(·) are required to provide temporary buffer storage of data to be transmitted, since the data is generally transmitted in the reverse order to its formation. The rearrangement for transmission is provided by the Coding B operation.

Figure 22A:
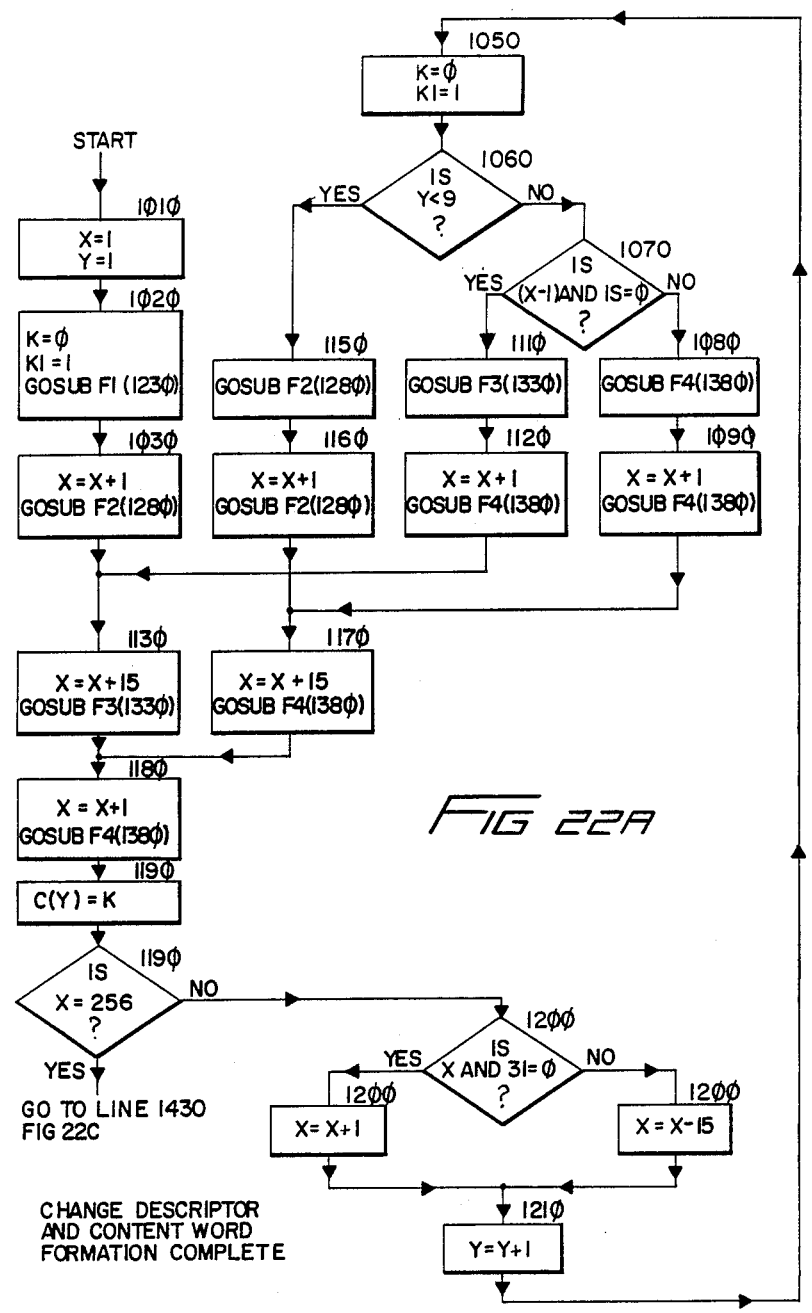

A detailed flowchart for the first part of Transmitter Coding A is shown in FIGS. 22A and 22B. The statement numbers adjacent to the blocks are the statement numbers in the computer program of Table 24. Herein are formed the Band 1 B-function Change Content words including the zero value content words when applicable. At Band 1 B-function locations where the magnitude of the difference between the previous value and the new value of the Band 1 B-function exceeds a threshold value, TH, then the following operations additionally occur:

(1) The previous values of Band 1 B-function are replaced by the corresponding new values, and
(2) A value for a B-function Descriptor is calculated.

Calculation of B-function Descriptors is performed by one of four different methods in accordance with the flow chart shown in FIG. 22B and the computer program statements 1230 through 1410 of Listing 12. Subroutine F1 calculates a Descriptor if the B-function is at the upper left corner of the image and is implemented by statements 1230 through 1260. Subroutine F2 calculates a Descriptor if the B-function is along the top edge of the image, but not at the left corner, and is implemented by statements 1280 through 1310 of Listing 12. Subroutine F3 calculates a Descriptor if the B-function is at the left edge of the image, but not at the top, and is implemented by statements 1330 through 1360 of Table 24. Subroutine F4 calculates a Descriptor if the B-function is elsewhere than specified for the three previous cases and is implemented by statements 1380 through 1410 of Listing 12. The appropriate subroutine to be used in FIG. 22B is identified in the flowchart of FIG. 22A.

Figure 22C:
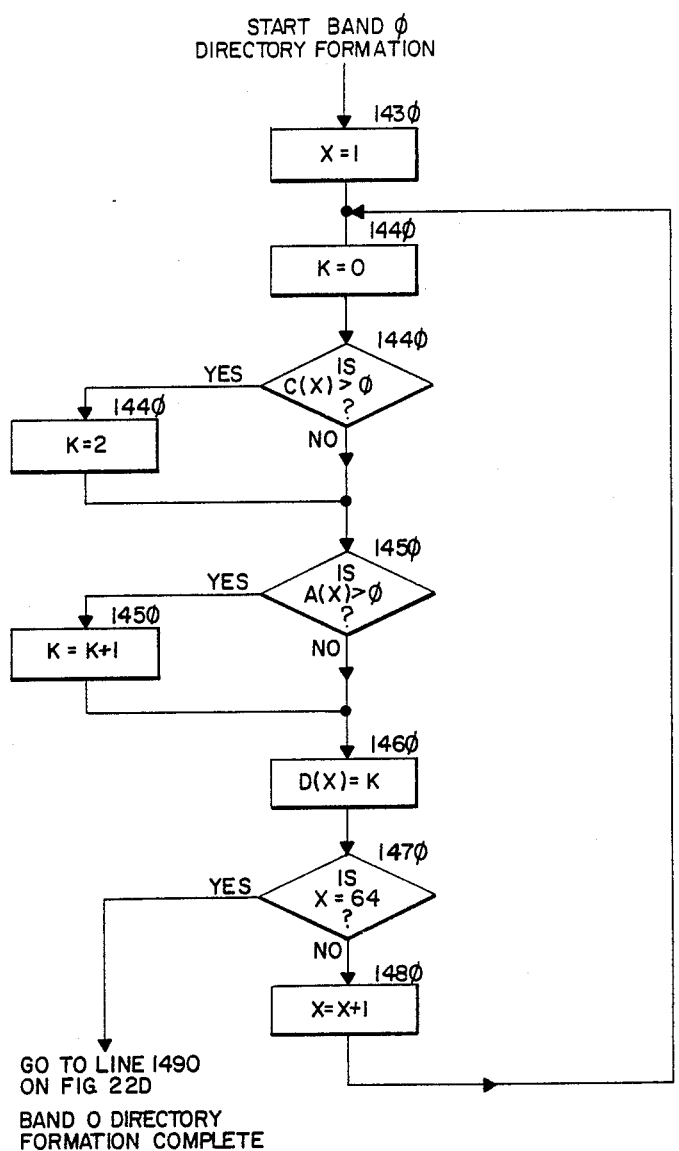
Figure 220:
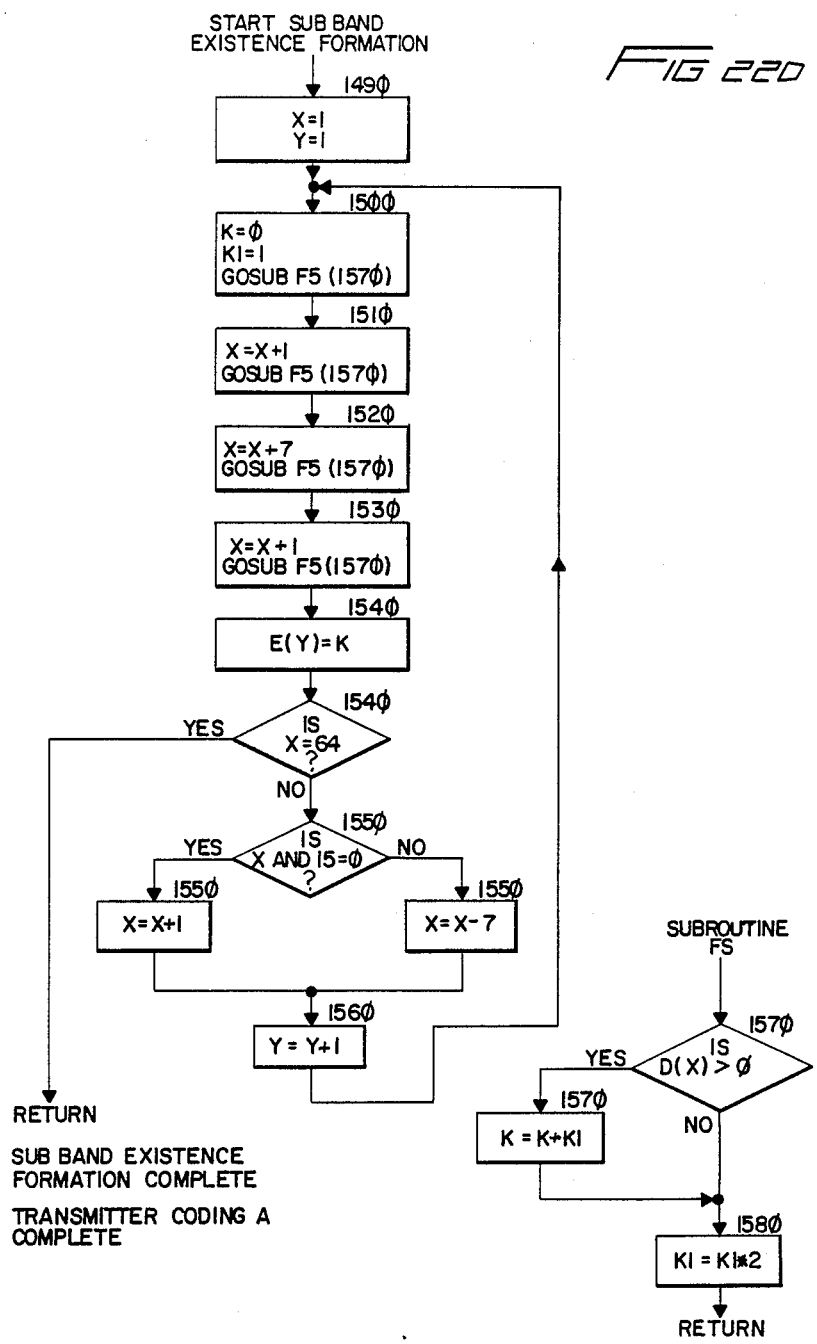

The second part of Transmitter Coding A is shown in FIGS. 22C and 22D and is implemented by computer program statements 1420 through 1600 in Listing 12. This part produces the Band 0 Directory and the Sub-band Existence map pointers in order from Band 0 down to the Sub-band. Specifically, the flowchart of FIG. 22C generates values for the Band 0 Directory, including all zero value Directories, based on the previously determined elements of the Band 0 Existence and Band 1 B-function Change Content arrays. Newly generated Band 0 Directory words are stored in the D(·) array. Program implementation occurs in statements 1430 through 1480 of Listing 12.

FIG. 22D shows the flow chart for generation of the Sub-band Existence words, including all zero value words, and is based on the Band 0 Directories just formed by the flowchart of FIG. 22C. Sub-band Existence words are stored in the E(·) array. Program implementation occurs in statements 1490 through 1580 of Listing 12 completes the Transmitter Coding A operations.

The Transmitter Coding B operations are shown in the flowcharts of FIGS. 23A and 23B, are implemented in computer program statements 2000 through 2480 of Listing 13 and are called by statement 240 shown in FIG. 21. Used as inputs to the processing are:

(1) Sub-band Existence array, E(·),
(2) Band 0 Directory array, D(·),
(3) Band 1 B Function Change Content array, C(·),
(4) Band 0 Existence word array, A(·), and
(5) Band 1 Function Descriptor array, DE(·).

The outputs generated are:

(1) Stack of Change data words, T(·),
(2) Stack Instruction words, NB(·), and,
(3) A single value, NT, indicating the number of words in the Stack, T(·).

The number of words in Stack, T(·) is variable and depends on the number of changes to be transmitted to the receiver. Said Stack contains all of the map and Descriptor words to be transmitted to the receiver, prior to the parallel to serial conversion for transmission. There are also NT words in the Stack NB(·) which indicate:

(1) The number of bits to be used from the corresponding word in T(·), encoded in bits 0 through 3 of the NB(·) word, and,
(2) The type of the Change data word encoded in bits 4 through 6 of the same NB(·) word.

The NB(·) words are used solely by the parallel to serial converter to indicate the number of bits to be taken from each word in the T(·) array and are not transmitted to the receiver. The data stream is analyzed at the receiver to determine where each variable length word starts and stops since that information is inherent in the variable length codes employed. To be transmitted, any element other than a Sub-band Directory must be specifically pointed to with a binary "1" by the appropriate Existence pointer. The receiver assumes by predetermined agreement that any said element is not transmitted unless so pointed to by the appropriate pointer.

Specifically the data is placed on the T(·) Stack in accordance with FIGS. 20A and 20B and is in the following order. Every Sub-band Directory is placed on the T(·) stack and each one is conditionally followed by other data if said Sub-band Directory is a binary "1". The Sub-band Existence word associated with said Sub-band Directory is placed on the T(·) Stack if and only if it is non-zero. This is implemented in the flowchart of FIG. 23A and by statements 2020 through 2090 of the computer program in Listing 13. Next, each of the four bits of a non-zero value Sub-band Existence word is examined. For each bit of said Sub-band Existence word which is non-zero the associated Band 0 Directory to which it points is placed on the Stack T(·). This last action is performed by calling sub-routine A in FIG. 23B, to be discussed subsequently. In turn, words which are pointed to by the non-zero value Band 0 Directory are placed on Stack T(·). These, in order, are the Band 1 B-function Contents word, the Band 0 Existence word and any Band 1 B-function Descriptors pointed to by said Contents word. All words pointed to by each individual Sub-band Directory and included in array Stack T(·) are processed prior to proceeding to the next subsequent Sub-band Directory. This is shown in FIG. 23A and is implemented by statements 2100 through 2170 of the computer program. Subroutine calls are made to the flow charts of FIG. 23B as needed to assemble data on Stack T(·).

FIG. 23B contains two sub-routines. Sub-routine A is implemented by computer statements 2220 through 2430 in the BASIC computer program of Listing 13. First, the present non-zero Band 0 Directory is placed onto the Stack T(·) using statements 2220 and 2230.

Next, the left bit of the non-zero Band Directory is examined in statement 2240. If said bit is non-zero then the corresponding Band 1 B-function change content word is placed on Stack T(·) in statements 2290 and 2300. If said bit is zero then the corresponding Content is not placed on Stack T(·). The right bit of the same non-zero Band 0 Directory is next examined, either in statement 2310 if the left bit was non-zero, or in statement 2250 if the left bit was zero. If the right bit is non-zero the corresponding Band 0 existence word is placed on Stack T(·) in either statements 2320 through 2330 or statements 2260 through 2270, again depending on whether or not a Content word was previously placed on Stack T(·). If the Content word was placed on Stack T(·) in statements 2290 through 2300 then each bit of said Content word is tested and for each bit found to be non-zero a corresponding Band 1 B-function Descriptor is placed on Stack T(·). This is implemented in computer statements 2340 through 2430 and by sub-routine B, statements 2240 and 2450, which is called by statements 2360, 2380, 2400 and 2420. This completes the transmitter means of implementation discussion.

The receiver for decoding the data developed by the transmitter is now described with reference to the flow charts in FIGS. 24A, 24B and 24C and to the computer program of Listing 14. The input data available to the receiver is the Stack T(·) from the transmitter, and RP(·), the array of previous Band 1 B-functions at the receiver. The output data determined are the array of revised Band 1 B-functions RP(·) and the array of new Band 0 Existence words RA(·) at the receiver. The reconstruction of said output data and the intermediate signalling data is almost in the same order as that of the Coding B sequence at the transmitter. A consequence of this is an absence of need to save temporary arrays of intermediate signalling data at the receiver.

The first element placed on the T(·) Stack at the transmitter and now taken from it is the first Sub-band Directory. With reference to FIG. 24A and Listing 14 the first operation which includes computer statements 3020 through 3080 is to examine the next available word in Stack T(·) to determine whether or not the Sub-band Directory is a binary one or zero. If said Directory is a one then the next available word is taken from Stack, T(·) which is the Sub-band Existence word. If said Directory is a zero then a word is not taken from Stack T(·) at this point, and the Sub-band Existence word is assigned a value of zero.

Next, each bit of the Sub-band Existence word is examined in sequence to direct the reconstruction of a Band 0 Directory value, whether zero or non-zero in value, and any other subsequent data items pointed to by said Existence word bit being tested. This is implemented in the flowchart of FIG. 24A and the computer program of Listing 14 in statements 3090 through 3130. Reconstruction of the Band 0 Directory and all subsequent data is implemented in a series of nested sub-routines R1, R2 and R3 in FIG. 24B, and sub-routine R4 in FIG. 24C.

Sub-routine R1 tests one bit of the current Sub-band Existence word each time it is called. If the value of a bit is a binary one then the next word from Stack T(·) is taken and used as the Band 0 Directory pointed to by said bit. If the value of said bit is zero then no word is taken from Stack T(·) and the Band 0 Directory pointed to it is assigned a value of zero. After assignment of a value to a Band 0 Directory, sub-routine R2 is called prior to return to the program of FIG. 24A. Sub-routine R1 is implemented by statements 3180 through 3230 in Listing 14.

Figure 24B:
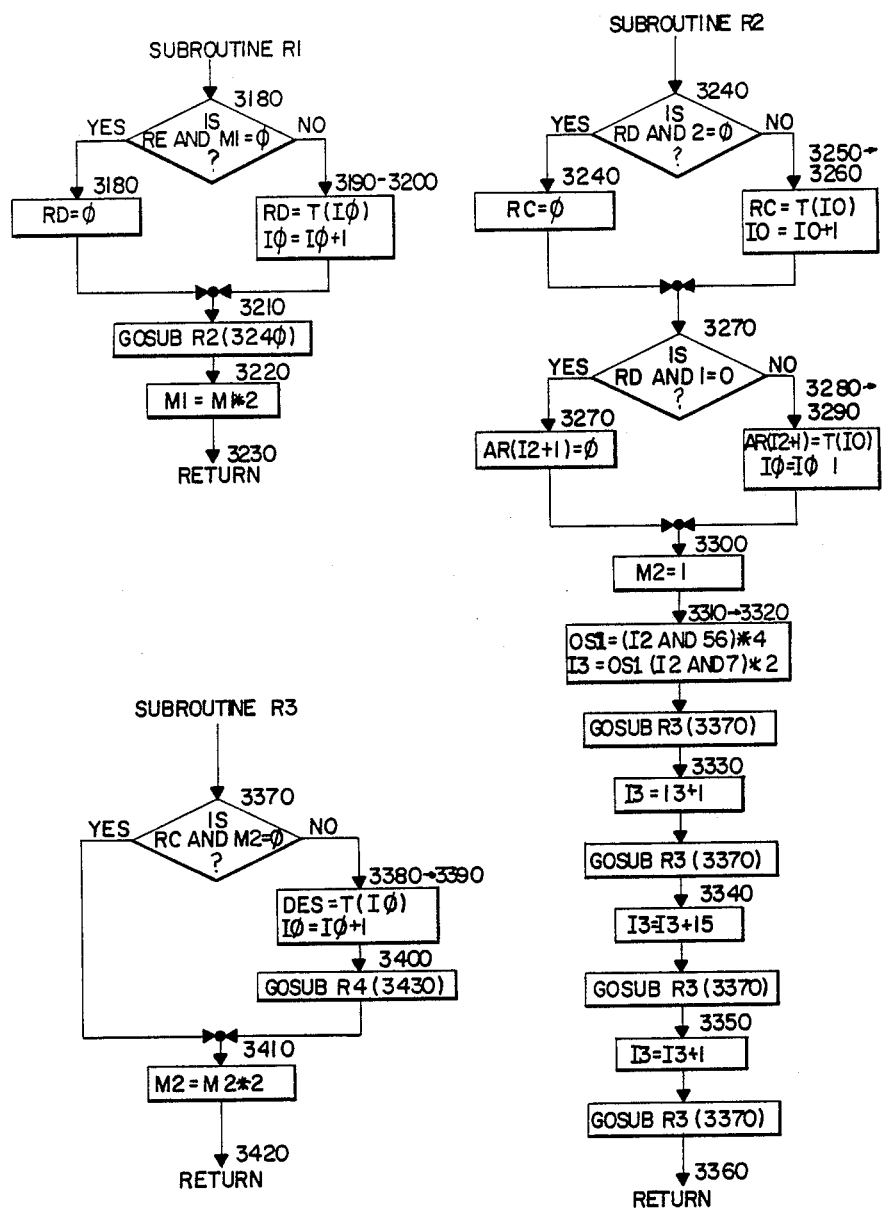

Sub-routine R2 in FIG. 24B examines each of the two bits of a Band 0 Directory in sequence. If the left bit of said Directory is a binary one then the next word is taken from Stack T(·) and assigned as the Band 1 B-function Content word. If said Directory bit is zero then said Content word is assigned the value of zero. Similarly the right bit is examined and the next word from Stack T(·) used as the Band 0 Existence word if said bit is a one, or if said bit is a zero, no word is taken from said Stack and a value of zero is assigned to said Existence word. This portion of sub-routine R2 is implemented by statements 3240 through 3290 in Listing 14.

The next part of sub-routine R2 examines the Band 1 B-function Content word one bit at a time to determine any Band 1 B-function Descriptors pointed to by said Content word bit. This part of sub-routine R2 is implemented by statements 3300 through 3360. Four calls are made to sub-routine R3, one for each of the four Content word bits, wherein a Band 1 B-function Descriptor is taken from Stack T(·) if and only if the corresponding Content word bit is one. Sub-routine R3 is implemented by statements 3370 through 3420. For each said bit equal to one in said Content word sub-routine R3 calls sub-routine R4 shown in the flow chart of FIG. 24C, which is implemented by statements 3430 through 3480 Sub-routine R4 has two decision levels which determine which one of the four calculation methods are to be used in determination of a Band 1 B-function value in receiver array RP(·). These four methods have been previously described in the section on Band 1 B-function Descriptor coding and decoding. The upper left corner calculation is implemented by statement 3440. The top edge, but not left corner, is implemented by statement 3450. The left edge, but not the upper left corner, is implemented by statement 3470. All other locations are implemented by statement 3480.

When this Transmitter and Receiver coding method is first used it is necessary to initialize the Band 1 B-function array at the receiver to the same as that of the transmitter. The preferred initialization method is to arbitrarily assign zero values to all elements of said arrays.

Validation

Listing 15 contains sub-routines which print the data arrays as a means of validation of the transmitter and receiver correctly coding and decoding the Band 1 B-functions to be changed and the non-zero value Band 0 Existence words. It is not a necessary part of the means of implementation. Statement 210 in Listing 11 assigns a value to the print variable "Z" which is used to instruct the sub-routines of Listing 15 to selectively print the various arrays of data when these print sub-routines are called by within statements 220, 250 and 270. The bits of variable "Z" are encoded as, and to enable printing of, the following:

Bit 0: The previous Band 1 B-function array at the transmitter prior to transmitter encoding,
Bit 1: The array of new Band 1 B-functions at the transmitter,
Bit 2: The Band 0 Existence word array at the transmitter,
Bit 3: The array of Band 1 B-function Descriptors resulting from Transmitter Coding "A" operation, Bit 4: The revised Band 1 B-function array at the transmitter after transmitter coding,
Bit 5: The Stack of Change data words created by the transmitter coding to be input to the receiver coding,
Bit 6: The previous Band 1 B-function array at the receiver prior to receiver decoding,
Bit 7: The revised Band 1 B-function array at the receiver after the completion of receiver decoding, and
Bit 8: The Band 0 Existence word array at the receiver.

When a bit is set to "1" the corresponding print routine will execute whereas a "0" will disable the same print routine.

Lines 50 through 80 in Listing 11 establish an example by assigning input values to the Band 1 B-functions, the Band 0 Existence, and the thresholds.

While specific embodiments of the invention have been illustrated and described herein, it is realized that numerous modifications and changes will occur to those skilled in the art. It is therefore to be understood that the appended claims are intended to cover all such changes as fall within the true spirit and scope of the invention.

APPENDIX

Presented here are the program listings referred to hereinabove. These programs are written in Microsoft BASIC-80, release 5.0. It may be noted that, in the various "LPRINT USING" statements where a backslash is intended, a forward slash (/) is employed herein instead. These occurrences are all apparent from the context, and should be read as the backslash character.

LISTING 1

(Corresponding Flowchart FIGS. 13A, 13B, 13C)

```
100 REM Selective Replenishment—Contents Program SR8
110 A=15:DEFSTR I
120 FOR N=0 TO 255
130 IF (N AND 12)=4 THEN 720
140 IF ((N AND 12)>0) AND ((N AND 3)=0) THEN 720
150 N1=N AND 64:IF N1>0 THEN 270
160 N1=N AND 7:ON N1+1 GOTO 170, 180, 190, 200, 210, 220, 230, 240
170 P=0:GOTO 250
180 P=0:GOTO 250
190 P=6:GOTO 250
200 P=1:GOTO 250
210 P=0:GOTO 250
220 P=3:GOTO 250
230 P=6:GOTO 250
240 P=3
250 N1=N AND 128:IF N1=0 THEN 400
260 O=P:GOTO 470
270 N1=N AND 15:IF N1>3 THEN N1=N1 OR 4
280 N1=N1 AND 7:ON N1+1 GOTO 290, 300, 310, 320, 330, 340, 350, 360
290 P=4:GOTO 370
300 P=4:GOTO 370
310 P=7:GOTO 370
320 P=5:GOTO 370
330 P=0:GOTO 370
340 P=2:GOTO 370
350 P=7:GOTO 370
360 P=2:GOTO 370
370 N1=N AND 128:IF N1=0 THEN 500
380 IF P=7 THEN O=2 ELSE O=P
390 GOTO 560
400 GOSUB 670
410 I=STR$(P)+STR$(N3)
420 IF INSTR(I,"3")>0 THEN O=3:GOTO 470
430 IF INSTR(I,"6")>0 THEN O=6:GOTO 460
440 IF INSTR(I,"1")>0 THEN O=1:GOTO 470
450 O=0:GOTO 470
460 IF INSTR(I,"1")>0 THEN O=3
470 IF P=3 THEN O=O+48:REM NON ZERO COEFFICIENT ACTION
480 IF P=6 THEN O=O+32:REM ZERO COEFFICIENT ACTION
490 GOTO 580
500 IF P=7 THEN Q=2 ELSE Q=P
510 GOSUB 670
520 IF N3=3 THEN 720
530 I=STR$(Q)+STR$(N3)
540 IF INSTR (I,"2")>0 THEN O=2:GOTO 560
550 IF INSTR (I,"5")>0 THEN O=5 ELSE O=4
560 IF P=2 THEN O=O+48:REM NON ZERO COEFFICIENT ACTION
570 IF P=7 THEN O=O+32:REM ZERO COEFFICIENT ACTION
580 REM PRINT OR FILE PROCESSING
590 IF A=15 THEN 620
600 LPRINT USING "/    /";HEX$(O);
610 A=A+1:GOTO 640
620 A=0 LPRINT:LPRINT USING "/    /";HEX$(N);
630 LPRINT USING "/    /";HEX$(O);
640 NEXT N
650 END
660 CONVERT ACCUMULATED CODE TO "BASEBAND" AND REMAP
670 N3=(N AND 48)/16:N2=N AND 64:IF N2=0 THEN 700
680 IF N3<2 THEN N3=N3+4
690 RETURN
700 IF N3=2 THEN N3=6
710 RETURN
720 O=0:GOTO 580:REM ZERO UNUSED STATES
730 END
```

LISTING 2

(Corresponding Flowchart FIG. 14B)

```
10 REM INPUT STATUS PROCESSOR (SR5)
90 DEFINT O
100 DEFSTR I
110 FOR K=0 TO 4095
120 I5=OCT$(K)
130 IF INSTR(I5,"7")>0 THEN O=0:GOTO 250
140 IF INSTR(I5,"3")>0 THEN O=3:GOTO 250
150 IF INSTR(I5,"6")>0 THEN O=6:GOTO 220
160 IF INSTR(I5,"5")>0 THEN O=5:GOTO 240
170 IF INSTR(I5,"4")>0 THEN O=4:GOTO 210
180 IF INSTR(I5,"2")>0 THEN O=2:GOTO 250
190 IF INSTR(I5,"1")>0 THEN O=1:GOTO 250
200 O=0:GOTO 250
210 IF INSTR(I5,"1")>0 THEN O=5:GOTO 240
220 IF INSTR(I5,"5")>0 THEN O=3:GOTO 250
230 IF INSTR(I5,"1")>0 THEN O=3:GOTO 250
240 IF INSTR(I5,"2")>0 THEN O=3:GOTO 250
245 REM GET AUXILIARY EXISTENCE WORD BIT
250 X=0:X1=512
```

```
260 Y=1 TO 4
270 J=(K AND (7*X1))/X1
280 B=0:X1=X1/8
290 IF J=7 THEN X=0:GOTO 335
300 IF J=3 OR J=6 THEN B=1
305 REM ASSEMBLE AUXILIARY EXISTENCE WORD BITS
310 X=X*2+B
330 NEXT Y
332 REM ASSEMBLE EXISTENCE CODE AND AUXILIARLY EXIST. BITS
335 O3=X*16+O
338 REM CONVERT TO HEX
340 I9=HEX$(O3)
350 PRINT K, I9
600 NEXT
```

LISTING 3

(Corresponding Flowchart FIGS. 15B, 15C)

```
10 REM STATUS PROM
20 A=7
30 DEFSTR I
40 FOR N=0 TO 255
50 IF (N AND 64)>0 THEN 60 ELSE 80
60 IF (N AND 128)>0 THEN O=0 ELSE O=64
70 GOTO 480
80 N1=N AND 56:CC=N1/8
90 IF (N AND 128)>0 THEN EC=0 ELSE EC=(N AND 7)
100 IF EC=7 OR CC=7 THEN O=0:GOTO 480
110 IF CC=2 OR CC=4 OR CC=5 THEN CC=CC+8
120 I5=HEX$(EC+16*CC)
130 IF INSTR(I5,"A")>0 THEN =10:GOTO 380
140 IF INSTR(I5,"3")>0 THEN 360
150 IF INSTR(I5,"2")>0 THEN 330
160 IF INSTR(I5,"5")>0 THEN 300
170 IF INSTR(I5,"6")>0 THEN 270
180 IF INSTR(I5,"D")>0 THEN O=13:GOTO 380
190 IF INSTR(I5,"C")>0 THEN 250
200 IF INSTR(I5,"4")>0 THEN 230
210 IF INSTR(I5,"1")>0 THEN O=1:GOTO 380
220 O=0:GOTO 380
230 IF INSTR(I5,"1")>0 THEN O=5:GOTO 380
240 O=4:GOTO 380
250 IF INSTR(I5,"1")>0 THEN O=13:GOTO 380
260 O=12:GOTO 380
270 IF INSTR(I5,"C")>0 OR INSTR(I5,"D")>0 THEN O=10:GOTO 380
280 IF INSTR(I5,"1")>0 THEN O=3:GOTO 380
290 O=6:GOTO 380
300 IF INSTR(I5,"6")>0 THEN O=3:GOTO 380
310 IF INSTR(I5,"C")>0 OR INSTR(I5,"D")>0 THEN O=13:GOTO 380
320 O=5:GOTO 380
330 IF INSTR (I5,"C")>0 OR INSTR(I5,"D")>0 THEN O=10:GOTO 380
340 IF INSTR (I5,"6")>0 THEN O=3:GOTO 380
350 O=2:GOTO 380
360 IF INSTR (I5,"C")>0 OR INSTR(I5,"D")>0 THEN O=10:GOTO 380
370 O=3:GOTO 380
380 REM STORE PROCESSING
390 Q=0:QA=0:QB=0
400 IF (N AND 128)>0 THEN 450
410 IF O=3 OR O=10 THEN 420 ELSE 460
420 IF EC>2 AND EC<7 THEN QA=80
430 IF CC=3 OR CC=6 OR CC=10 THEN QB=160
440 Q=QA+QB+8:GOTO 460
450 IF O=3 OR O=10 THEN Q=128
460 IF O>6 THEN O=O-8
470 O=O+Q
480 REM PRINT PROCESSING
490 IF A=7 THEN 520
500 LPRINT USING "/   /";HEX$(O);
510 A=A+1:GOTO 540
520     A=0:LPRINT:LPRINT USING "/   /";HEX$(N);
530 LPRINT USING "/   /";HEX$(O);
540 NEXT N
550 END
```

LISTING 4

(Corresponding Flowchart FIGS. 17A, 17B)

```
10 REM SR12 CHANGE DIRECTORY, CONTENT & EXISTENCE READ INPUTS
20 A=7
30 FOR N=0 TO 255
40 IF (N AND 96)=96 THEN RD=0:RC=0:RE=0:GOTO 240
50 IF (N AND 128)=0 THEN RD=0:GOTO 110
60 IF (N AND 64)>0 THEN RD=0:GOTO 110
70 IF (N AND 32)>0 THEN RD=0:GOTO 110
80 IF (N AND 3)=1 THEN RD=1:GOTO 110
90 IF (N AND 3)>0 THEN RD=0:GOTO 110
100 IF (N AND 16)>0 THEN RD=1 ELSE RD=0
110 IF (N AND 128)>0 THEN RC=0:RE=0:GOTO 240
120 IF (N AND 32)>0 THEN RC=0:RE=1:GOTO 240
130 IF (N AND 64)>0 THEN 210
140 N1=N AND 3:IF N1=1 THEN 180
150 IF N1=0 THEN 160 ELSE 170
160 IF (N AND 16)>0 THEN 180
170 RC=0:RE=0:GOTO 240
180 IF (N AND 4)>0 THEN RC=1 ELSE RC=0
190 IF (N AND 8)>0 THEN RE=1 ELSE RE=0
200 GOTO 240
210 RE=0:IF(N AND 3)=1 THEN RC=1:GOTO 240
220 IF (N AND 3)>0 THEN RC=0:GOTO 240
230 IF (N AND 16)>0 THEN RC=1 ELSE RC=0
240 OT=4*RE+2*RC+RD
250 IF A=7 THEN 280
260 LPRINT USING "/   /"; HEX$(OT);
270 A=A+1:GOTO 300
280     A=0::LPRINT:LPRINT USING "/   /";HEX$(N);
290 LPRINT USING "/   /";HEX$(OT);
300 NEXT N
```

LISTING 5

(Corresponding Flowchart FIG. 17C)

```
10 REM SR11 CHANGE STATUS OUTPUT
20 A=15
30 FOR N=0 TO 2047
40 OT=(N AND 255)
50 IF (N AND 1024)=1024 THEN 80
60 IF (N AND 768)=512 THEN OT=170:GOTO 80
70 IF (N AND 768)=768 THEN OT=255
80 IF A=15 THEN 110
90 LPRINT USING "/   /";HEX$(OT);
100 A=A+1:GOTO 130
```

110 A=0:LPRINT:LPRINT USING "/ /";HEX$(N);
120 LPRINT USING "/ /"; HEX$(OT);
130 NEXT N
140 END

LISTING 6

(Corresponding Flowchart FIG. 17D)

10 REM "ECODE"
20 REM X1=TRANSFORM MODEL BIT POINTER
30 REM X2=CHANGE MODEL BIT POINTER
40 REM Z=OUTPUT; Z1=BASE OUTPUT POINTER; Z2=NUMBER OF OUTPUT BITS
50 REM Y=PROM ADDRESS INPUT FROM 0 TO 4095
60 FOR Y=0 TO 4095
70 X1=256:X2=1:Z=0:Z1=1:Z2=0
80 FOR I=1 TO 4
90 J=Y AND X1:K=(Y AND (3*X2))/X2
100 IF J>0 THEN Z=Z+K*Z1:Z1=Z1*4:Z2=Z2+2:GOTO 130
110 IF K=1 THEN Z=Z+Z1
120 Z1=Z1*2:Z2=Z2+1
130 X1=X1*2:X2=X2*4:NEXT I
140 PRINT Y, Z2, Z
150 NEXT Y

LISTING 7

(Corresponding Flowchart FIGS. 17E, 17F)

10 REM SR15 STATUS WRITE & EXPECTATION WRITE & BLANK WRITE
20 A=15
30 FOR N=0 TO 127
40 IF ((N AND 32)>0 AND (N AND 8)>0) THEN SW=1:GOTO 100
50 IF ((N AND 32)>0 AND (N AND 8)=0) THEN SW=0:GOTO100
60 IF (N AND 8)>0 THEN SW=1:GOTO 100
70 IF (N AND 3)=1 THEN SW=0:GOTO 100
80 IF (N AND 3)=0 THEN SW=0:GOTO 100
90 IF (N AND 4)>0 THEN SW=1 ELSE SW=0
100 IF (N AND 32)>0 THEN EO=0:BW=0:GOTO 190
110 N1=(N AND 3):IF (N AND 16)>0 THEN E0=1 ELSE EO=0
120 IF (N AND 4)=0 THEN 180
130 IF N1=2 OR N1=3 THEN EO=0:GOTO 180
140 IF N1=1 THEN 160
150 IF EO=1 THEN 160 ELSE 180
160 IF (N AND 8)>0 THEN EO=0:GOTO 180
170 EO=1
180 IF EO=1 OR (N AND 64)>0 THEN BW=1 ELSE BW=0
190 T=SW+2*EO+4*BW
200 IF A=15 THEN 230
210 LPRINT USING "/ /";HEX$(OT);
220 A=A+1:GOTO 250
230 A=0:LPRINT:LPRINT USING "/ /";HEX$(N);
240 LPRINT USING "/ /";HEX$(OT);
250 NEXT N

LISTING 8

(Corresponding Flowchart FIG. 19A)

10 REM SR13 RECEIVER MAP RECONSTRUCTION ROM
20 FOR A=0 TO 1023
30 IF (A AND 16)=0 THEN R=0:GOTO 240
40 IF (A AND 96)=96 THEN R=0:GOTO 240
50 REF=(A AND &H380)/128
60 STAT=A AND 3
70 IF (A AND 32)=0, THEN 100
80 IF REF=2 THEN R=3:GOTO 240
90 R=0:GOTO 240
100 IF (A AND 64)>0 THEN 140
110 IF REF=1 THEN 170
120 IF REF>1 THEN 220
130 R=0:GOTO 240
140 IF REF=3 THEN 170
150 IF REF>3 THEN 220
160 R=0:GOTO 240
170 IF (A AND 4)=0 THEN 200
180 IF STAT=0 THEN R=1:GOTO 240
190 R=0:GOTO 240
200 IF STAT=1 THEN R=1:GOTO 240
210 R=0:GOTO 240
220 IF (A AND 8)=0 THEN R=0:GOTO 240
230 R=1
240 REM PRINT ROUTINE
250 IF (A AND 15)=0 THEN LPRINT:LPRINT HEX$(A),
260 LPRINT USING "###";R;
270 NEXT A
280 END

LISTING 9

(Corresponding Flowchart FIG. 19B)

10 REM NUMBITS
20 FOR A=0 TO 127
30 IF (A AND 64)>0 THEN NB=0:GOTO 90
40 REF=(A AND 48)/16
50 IF REF=0 THEN NB=0:GOTO 90
60 IF REF=1 THEN NB=2:GOTO 90
70 IF REF=3 THEN NB=4:GOTO 90
80 NB=4+(A AND 1)+(A AND 2)/2+(A AND 4)/4+(A AND 8)/8
90 REM PRINT ROUTINE
100 IF (A AND 15)=0 THEN LPRINT:LPRINT A,
110 LPRINT USING "###";NB;
120 NEXT A
130 LPRINT
140 END

LISTING 10

(Corresponding Flowchart FIG. 19C)

10 REM "ECODE"
20 REM X1=TRANSFORM MODEL BIT POINTER
30 REM X2=CHANGE MODEL BIT POINTER
40 REM Z=OUTPUT; Z1=BASE OUTPUT POINTER
50 REM Y=PROM ADDRESS INPUT FROM 0 TO 4095
60 FOR Y=0 TO 4095
70 X1=256:X2=1:Z=0:Z1=1
80 FOR I=1 TO 4
90 J=Y AND X1

```
100 IF J>0 THEN K=(Y AND
    (3*X2))/X2:X2=X2*4:GOTO 120
110 K=(Y AND X2)/X2:X2=X2*2
120 Z=Z+Z1*K
130 X1=X1*2:Z1=Z1*4:NEXT I
140 PRINT Y,Z
150 NEXT Y
```

LISTING 11

(Corresponding Flowchart FIG. 21)

```
10 REM BAND 0 & SUB-BAND CODING (SBC)
20 DIM A(64):DIM C(64):DIM D(64):DIM E(16)
   :DIM AR(64)
30 DIM BP(256):DIM BN(256):DIM DE(256):DIM
   RP(256)
40 DIM T(480):DIM NB(480)
50 TH=3
60 A(5)=27
70 BN(85)=10:BN(93)=2
80 BN(1)=50:BN(11)=11:BN(16)=16:BN(17)=17:B-
   N(33)=33
200 REM MAIN ROUTINE
210 Z=0:REM Z IS PRINT ENABLE WORD
220 SEQ=0:GOSUB 4010:REM DO PRINT ROU-
    TINES
230 GOSUB 1000:REM DO TRANSMITTER COD-
    ING A
240 GOSUB 2000:REM DO TRANSMITTER COD-
    ING B
250 SEQ=1:GOSUB 4010:REM DO PRINT ROU-
    TINES
260 GOSUB 3000:REM DO RECEIVER DECOD-
    ING
270 SEQ=2:GOSUB 4010:REM DO PRINT ROUN-
    TINES
280 END
```

LISTING 12

(Corresponding Flowchart FIGS. 22A, 22B, 22C, 22D)

```
1000 REM TRANSMITTER CODING A
1010 X=1:Y=1
1020 K=0:K1=1:GOSUB 1230
1030 X=X+1:GOSUB 1280
1040 GOTO 1130
1050 K=0:K1=1
1060 IF Y<9 THEN 1150
1070 IF ((X-1) AND 15)=0 THEN 1110
1080 GOSUB 1380
1090 X=X+1:GOSUB 1380
1100 GOTO 1170
1110 GOSUB 1330
1120 X=X+1:GOSUB 1380
1130 X=X+15:GOSUB 1330
1140 GOTO 1180
1150 GOSUB 1280
1160 X=X+1:GOSUB 1280
1170 X=X+15:GOSUB 1380
1180 X=X+1:GOSUB 1380
1190 C(Y)=K:IF X=256 THEN 1430
1200 IF (X AND 31)=0 THEN X=X+1 ELSE
     X=X-15
1210 Y=Y+1:GOTO 1050
1220 REM SUBROUTINE 1
1230 IF ABS(BN(X)-BP(X))<=TH THEN 1260
1240 K=K+K1
1250 DE(1)=BN(1):BP(1)=BN(1)
1260 K1=K1*2:RETURN
1270 REM SUBROUTINE 2
1280 IF ABS(BN(X)-BP(X))<=TH THEN 1310
1290 K=K+K1
1300 DE(X)=BN(X)-BP(X-1):BP(X)=BN(X)
1310 K1=K1*2:RETURN
1320 REM SUBROUTINE 3
1330 IF ABS(BN(X)-BP(X))<=TH THEN 1360
1340 K=K+K1
1350 DE(X)=BN(X)=BP(X-16):BP(X)=BN(X)
1360 K1=K1*2:RETURN
1370 REM SUBROUTINE 4
1380 IF ABS(BN(X)-BP(X))<=TH THEN 1410
1390 K=K+K1
1400 DE(X-
     )=INT(BN(X)-(BP(X-1)+BP(X-16))/2):BP(X-
     )=BN(X)
1410 K1=K*2:RETURN
1420 REM DET. BAND 0 DIRECTORY
1430 X=1
1440 K=0:IF C(X)>0 THEN K=2
1450 IF A(X)>0 THEN K=K+1
1460 D(X)=K
1470 IF X=64 THEN 1490
1480 X=X+1:GOTO 1440
1490 X=1:Y=1
1500 K=0:K1=1:GOSUB 1570
1510 X=X+1:GOSUB 1570
1520 X=X+7:GOSUB 1570
1530 X=X+1:GOSUB 1570
1540 E(Y)=K:IF X=64 THEN 1590
1550 IF (X AND 15)=0 THEN X=X+1 ELSE
     X=X-7
1560 Y=Y+1:GOTO 1500
1570 IF D(X)>0 THEN, K=K+K1
1580 K1=K1*2:RETURN
1590 PRINT "TRANSMITTER CODING A COM-
     PLETE"
1600 RETURN
```

LISTING 13

(Corresponding Flowchart FIGS. 23A, 23B)

```
2000 REM TRANSMITTER CODING B
2010 OS0=0:I0=1:I1=0
2020 IF E(I1+1)>0 THEN 2060
2030 T(I0)=0:NB(I0)=1+16
2040 I0=I0+1
2050 GOTO 2180
2060 T(I0)=1:NB(I0)=1+16
2070 I0=I0+1
2080 T(I0)=E(I1+1):NB(I0)=4+32
2090 I0=I0+1
2100 I2=OS0+(I1 AND 3)*2
2110 IF (E(I1+1)AND 1)>0 THEN GOSUB 2220
2120 IF (E(I+1) AND 2)>0 THEN GOSUB 2220
2120 IP2=I2+7
2120 IF (E(I1+1) AND 4)>0 THEN GOSUB 2220
2130 IF (E(I1+1) AND 8)>0 THEN GOSUB 2220
2140 IF (I1 AND 3)=3 THEN OS0=OS0+16
2150 IF (E(i1+1) AND 4)>0 THEN GOSUB 2220
2160 I2=I2+1
2170 IF (EI1+1) AND 8)>0 THEN GOSUB 2220
2180 IF (I1 AND 3)=3 THEN OS0=OS0+16
2190 I1=I1+1
2200 IF I1>15 THEN 2460
2210 GOTO 2020
2220 T(I0)=D(I2+(1):NB(I0)=2+48
```

2230 I0=I0+1
2240 IF (D(I2+1) AND (2)>0 THEN 2290
2250 IF (D(I2+1) AND (1)=0 THEN 2430
2260 T(I0)=A(I2+1):NB(I0=)6
2270 I0=I0+1
2280 GOTO 2430
2290 T(I0)=C(I2+1):NB(I0)=4+64
2300 I0=I0+1
2310 IF(D(I2+1) AND 1)=0 THEN 2340
2320 T(I0)=A(I2+1):NB(I0)=6+80
2330 I0=I0+1
2340 OS1=(I2 AND 56)*4
2350 I3=OS1+(I2 AND 7)*2
2360 IF (C(I2+1) AND (1)>0 THEN GOSUB 2440
2370 I3=I3+1
2380 IF (C(I2+1) AND (2)>0 THEN GOSUB 2440
2390 I3=I3+15
2400 IF (C(I2+1) AND (4)>0 THEN GOSUB 2440
2410 I3=I3+1
2420 IF (C(I2+1) AND (8)>0 THEN GOSUB 2440
2430 RETURN
2440 T(I0)=DE(I3+1):NB(I0)=3+96
2450 I0+I0+1:RETURN
2460 NT=I0−1
2470 PRINT "TRANSMITTER CODING B COMPLETE"
2480 RETURN

LISTING 14

Figure 24C:
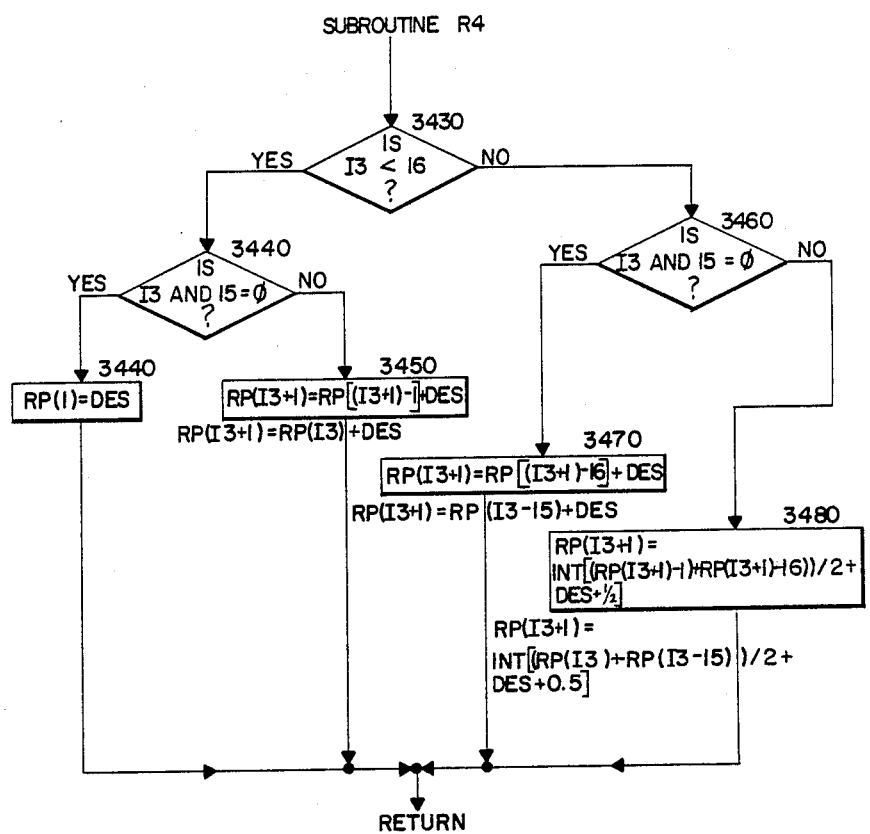

(Corresponding Flowchart FIGS. 24A, 24B, 24C)

3000 REM RECEIVER DECODING
3010 OS0=0:I0=1:I1=0
3020 IF T(I0)=0 THEN 3070
3030 I0=I0+1
3040 RE=T(I0)
3050 I0=I+1
3060 GOTO 3090
3070 I0=I0+1
3080 RE=0
3090 M1=1
3100 I2=OS0+(I1 AND 3)*2:GOSUB 3180
3110 I2=I2+1 GOSUB 3180
3120 I2=I2+7:GOSUB 3180
3130 I2=I2+1:GOSUB 3180
3140 IF (I1 AND 3)=3 THEN OS0=OS0+16
3150 I1=I1+1
3160 IF I1>15 THEN 3490
3170 GOTO 3020
3180 IF (RE AND M1)=0 THEN RD=0:GOTO 3210
3190 RD=T(I0)
3200 I0=I0+1
3210 GOSUB 3240
3220 M1=M1*2
3230 RETURN
3240 IF(RD AND 2)=0 THEN RC=0:GOTO 3270
3250 RC=T(I0)
3260 I0=I0+1
3270 IF(RD AND 1)=0 THEN AR(I2+1)=0:GOTO 3300
3280 AR(I2+1)=T(I0)
3290 I0=I0+1
3300 M2=1
3310 OS1=(I2 AND 56)*4
3320 I3=OSI+(I2 AND 7)*2:GOSUB 3370
3330 I3=I3+1:GOSUB 3370
3340 I3=I3+15:GOSUB 3370
3350 I3=I3+1:GOSUB 3370
3360 RETURN
3370 IF (RC AND M2)=0 THEN 3410
3380 DES=T(I0)
3390 I0=I0+1
3400 GOSUB 3430
3410 M2=M2*2
3420 RETURN
3430 IF I3<16 THEN 3440 ELSE 3460
3440 IF (I3 AND 15)=0 THEN RP(1)=DES:-RETURN
3450 RP (I3+1)=RP(I3)+DES:RETURN
3460 IF (I3 AND 15)=0 THEN 3470 ELSE 3480
3470 RP (I3+1)=RP(I3=15)+DES:RETURN
3480 RP (I3+1)=INT((RP(I3)+RP(I3=15))/2-+DES+0.5):RETURN
3490 PRINT "RECEIVER DECODING COMPLETE"
3500 RETURN

LISTING 15

4000 REM PRINT CONTROL ROUTINE
4010 IF SEQ<>0 THEN 4120
4020 IF (Z AND 1)=0 THEN 4050
4030 LPRINT "PREVIOUS BAND 1 B ARRAY AT TRANSMITTER:" LPRINT
4040 FOR X=1 TO 256:pR=Bp(X):GOSUB 5000:NEXT X:LPRINT
4050 IF (Z AND 2)=0 THEN 4080
4060 LPRINT "NEW BAND 1 B ARRAY AT TRANSMITTER":LPRINT
4070 FOR X=1 TO 256:PR=BN(X):GOSUB 5000:NEXT X:LPRINT
4080 IF (Z AND 4)=0 THEN RETURN
4090 LPRINT "NEW BAND 0 EXISTENCE ARRAY AT TRANSMITTER":LPRINT
4100 FOR X=1 TO 64:PR=A(X):GOSUB 5000:-NEXT X:LPRINT
4110 RETURN
4120 IF SEQ<>1 THEN 4270
4130 IF (Z AND 8)=0 THEN 4160
4140 LPRINT "ARRAY OF CHANGE BAND 1 B DESCRIPTORS": LPRINT
4150 FOR X=1 TO 256:PR=DE(X):GOSUB 5000:NEXT X:LPRINT
4160 IF (Z AND 16)=0 THEN 4190
4170 LPRINT "UPDATED BAND 1B ARRAY AT TRANSMITTER": LPRINT
4180 FOR X=1 TO 256:PR=BP(X):GOSUB 5000:NEXT X
4190 IF (Z AND 32)=0 THEN 4230
4200 LPRINT "CHANGE DATA WORDS IN STACK FORMAT":LPRINT
4210 LPRINT "THE DEPTH OF THE STACK IS";NT:LPRINT
4220 GOSUB 5100:REM PRINT ROUTINE 2
4230 IF (Z AND 64)=0 THEN RETURN
4240 LPRINT "PREVIOUS BAND 1B ARRAY AT RECEIVER": LPRINT
4250 FOR X=1 TO 256:PR=RP(X):GOSUB 5000:NEXT X:LPRINT
4260 RETURN
4270 IF SEQ<>2 THEN RETURN
4280 IF (Z AND 128)=0 THEN 4310
4290 LPRINT "UPDATED BAND 1B ARRAY AT RECEIVER": LPRINT
4300 FOR X=1 TO 256:PR=RP(X):GOSUB 5000:NEXT X
4310 IF (Z AND 256)=0 THEN RETURN

```
4320 LPRINT "BAND 0 EXISTENCE ARRANY
    AT RECEIVER": LPRINT
4330 FOR  X=1  TO  64:PR=AR(X):GOSUB
    5000:NEXT X:LPRINT
4340 RETURN
5000 REM PRINT ROUTINE 1
5010 LPRINT USING "###";PR;
5020 IF((X−1) AND (15)=15 THEN LPRINT
5030 RETURN
5100 REM PRINT ROUTINE 2
5110 LPRINT
5120 FOR X=1 TO 480
5130 LPRINT USING "###";T(X);
5140 LPRINT USING "##";NB(X) AND 15;
5150     ON     (NB(X)/16)     GOTO
    5160,5170,5180,5190,5200,5210
5160 LPRINT "SBD";:GOTO 5220
5170 LPRINT "SBE";:GOTO 5220
5180 LPRINT "B0D";:GOTO 5220
5190 LPRINT "B1BC";:GOTO 5220
5200 LPRINT "B0E";:GOTO 5220
5210 LPRINT "B1BF";
5220 IF (X/5−INT(X/5))=0 THEN LPRINT
5230 IF X=NT THEN LPRINT:RETURN
5240 IF X=240 THEN LPRINT CHR$(12)
5250 NEXT X
5260 RETURN
```

I claim:

1. A system for transmitting transform domain coefficients corresponding to an image which is undergoing change with time as represented by a sequence of image frames, a last frame of which sequence is a current image frame, from a transmitter location having a forward transformer operating on data for each image frame in the sequence to generate the transform domain coefficients on a frame-by-frame basis for communication over a fixed data rate communication channel to a receiver location having an inverse transformer operating on the transform domain coefficients on a frame-by-frame basis to provide reconstructed data for each of the image frames in the sequence, said system comprising:

a transform coefficient model maintain at the transmitter and a substantially identical transform coefficient model maintained at the receiver, the coefficient models holding, subject to a limitation of communication channel data rate, transform coefficient data corresponding to the most recent transform coefficients generated from at least one previous image frame;

a change identifier at the transmitter for comparing incoming current image frame transform coefficient data from the forward transformer with the transform coefficient data held in the transform coefficient model maintained at the transmitter to provide a change data set representing transform coefficient changes necessary for the transform coefficient model to represent the current image frame;

means at the transmitter for selecting a subset of the change data set consistent with the communication channel data rate and or transmitting the selected subset;

means at the transmitter for replenishing the transmitter transform coefficient model based on the selected change data subset and means at the receiver for replenishing the receiver transform coefficient model based on the selected change data subset such that the transmitter and receiver transform coefficient models are identically replenished in a manner such that said coefficient models are driven in a direction towards correspondence with the current image frame; and means at the receiver for outputting transform domain coefficients to the inverse transformer based on the receiver transform coefficient model.

2. A system in accordance with claim 1, wherein said means at the transmitter for selecting a subset of the change data includes means for prioritizing the change data for selection on the basis of Zonal coding, giving lower frequency components of the change data a relatively higher priority than relatively higher frequency components.

3. A system for transmitting transform domain coefficients corresponding to an image which is undergoing change wtih time as represented by a sequence of image frames, a last frame of which sequence is a current image frame, from a transmitter location having a forward transformer operating on data for each of the image frames in the sequence to generate the transform domain coefficients on a frame-by-frame basis for communication over a fixed data rate communication channel to a receiver location having an inverse transformer operating on the transform domain coefficients on a frame-by-frame basis to provide reconstructed data for each of the image frames in the sequence, the transform domain coefficient data being organized in a hierarcial manner in multiple bands, said system comprising:

a transform coefficient model maintained at the transmitter and a substantially identical transform coefficient model maintained at the receiver, the coefficient models holding, subject to a limitation of communication channel data rate, transform coefficient data corresponding to the most recent transform coefficients generated from at least one previous image frame;

a change identifier at the transmitter for comparing incoming current image frame transform coefficient data from the forward transformer with the transform coefficient data held in the transform coefficient model maintained a the transmitter to provide a change data set representing transform coefficient changes necessary for the transform coefficient models to represent the current image frame;

means at the transmitter for selecting a subset of the change data set which can be transmitted during a predetermined file period consistent with the communication channel data rate and for transmitting the selected subset, said file period being one of a time sequence of file periods;

means at the transmitter for replenishing the transmitter transform coefficient model based on the selected change data subset and means at the receiver for replenishing the receiver transform coefficient model base on the selected change data subset such that the transmitter and receiver transform coefficient models are identically replenished in a manner such that said coefficient models are driven in a direction towards correspondence with the current image frame; and means at the receiver for outputting transform domain coefficients to the inverse transformer based on the receiver transform coefficient model.

4. A system in accordance with claim 3, wherein said means at the transmitter for selecting a subset of the change data includes means for prioritizing the change data for selection on the basis of Zonal coding, giving lower frequency components of the change data a relatively higher priority than relatively higher frequency components.

5. A system in accordance with claim 3, wherein the transform coefficient models include at least non-zero valued transform domain coefficients and a map having components to describe the location in the transform domain of said transform domain coefficients, the map components being organized in a branched manner beginning with a plurality of map components corresponding to the lowest band and continuing with a predetermined number of conditionally-existing map components for successive bands branched from each next proceeding band map component, each map component corresponding to coefficients in a particular band, and each map component including:
- conditionally an existence word indicating which further branches, if any, are present; and
- conditionally an expectation marker indicating whether changes in coefficient or map data at that particular band are expected in a subsequent file period.

6. A system in accordance with claim 5, which includes means at the transmitter for maintaining the transform coefficient model at the transmitter, and means at the receiver for maintaining the transform coefficient model at the receiver;
   said means for maintaining including means for generating an expectation marker at a particular band when an existence word in the preceeding lower band points to said particular band but data for said particular band does not arrive during the same file period as said preceeding band existence word.

7. A system in accordance with claim 5, wherein said means at the receiver for outputting transform domain coefficients to the inverse transformer includes means for assigning a value of zero to all coefficients for which changes are expected or are conditionally expected on the basis of expectation markers, even if the transform coefficient model at the receiver contains non-zero values for the coefficients.

8. A system in accordance with claim 5, wherein said means at the receiver for outputting transform domain coefficients to the inverse transformer includes means for assigning a value of zero to all coefficients for which changes are expected or are conditionally expected on the basis of expectation markers, beginning where an expectation marker is present and continuing with coefficients for all sucessively branched higher bands, even if the transform coefficient model at the receiver contains non-zero values for these coefficients.

9. A system in accordance with claim 6, wherein said means at the receiver for outputting transform domain coefficients to the inverse transformer includes means for assigning a value of zero to all coefficients for which changes are expected or are conditionally expected on the basis of expectation markers, even if the transform coefficient model at the receiver contains non-zero values for the coefficients.

10. A system in accordance with claim 6, wherein said means at the receiver for outputting transform domain coefficients to the inverse transformer includes means for assigning a value of zero to all coefficients for which changes are expected or are conditionally expected on the basis of expectation markers, beginning where an expectation marker is present and continuing with coefficients for all successively branched higher bands, even if the transform coefficient model at the receiver contains non-zero values for these coefficients.

11. A system in accordance with claim 3, wherein the change data set is organized as a set of change coefficients and a change map having components to describe the location in the transform domain of the change coefficients, the change map components being organized in a branched manner beginning with a plurality of map components corresponding to the lowest band and continuing with a predetermined number of conditionally-existing change map components for successive bands branched from each next preceeding level change map component, each change map component corresponding to change coefficients in a particular band, and each change map component conditionally including a change existence word indicating types of changes, if any, to be made to coefficients or map components in a higher band.

12. A system in accordance with claim 11, wherein the change existence words are capable of indicating an erase condition to designate that at least one non-zero coefficient in the transform coefficient models is to be given a value of zero; and
   which system includes means for changing coefficients in the transform domain coefficient models to zero for all successively branched higher bands when an erase condition is indicated.

13. A system in accordance with claim 5, wherein the change data set is organized as a set of change coefficients and a change map having components to describe the location in the transform domain of the change coefficients, the change map components being organized in a branched manner beginning with a plurality of map components corresponding to the lowest band and continuing with a predetermined number of conditionally-existing change map components for successive bands branched from each next preceeding band change map component, each change map component corresponding to change coefficients in a particular band and each change map component conditionally including a change existence word indicating types of changes, if any, to be made to coefficients in a higher band.

14. A system in accordance with claim 13, wherein the change existence words are capable of indicating a cancel condition to designate that at least one previously established expectation marker is to be removed; and
   which system includes means for removing expectation markers from the transform coefficient models for all successively branched higher bands when a cancel condition is indicated.

15. A system in accordance with claim 14, wherein the change existence words are also capable of indicating an erase condition to designate that at least one non-zero coefficient in the transform coefficient models is to be given a value of zero; and
   which system includes means for changing coefficients in the transform domain coefficient models to zero for all successively branched higher bands and for removing expectation markers from the transform coefficient models for all successively branched higher bands when an erase condition is indicated.

16. A system in accordance with claim 14, wherein said means at the receiver for outputting transform domain coefficients to the inverse transformer includes means for assigning a value of zero to all coefficients for which changes are expected or are conditionally expected on the basis of expectation markers, even if the transform coefficient model at the receiver contains non-zero values for the coefficients.

17. A system in accordance with claim 14, wherein said means at the receiver for outputting transform domain coefficients to the inverse transformer includes means for assigning a value of zero to all coefficients for which changes are expected or are conditionally expected on the basis of expectation markers, beginning where an expectation marker is present and continuing with coefficients for all successively branched higher bands, even if the transform coefficient model at the receiver contains non-zero values for these coefficients.

18. A system in accordance with claim 13, wherein the change existence words are capable of indicating an erase condition to designate that at least one non-zero coefficient in the transform coefficient models is to be given a value of zero; and which system includes means for changing coefficients in the transform domain coefficient models to zero for all successively branched higher bands and for removing expectation markers from the transform coefficient models for all successively branched higher bands when an erase condition is indicated.

19. A system in accordance with claim 16, wherein said means at the receiver for outputting transform domain coefficients to the inverse transformer includes means for assigning a value of zero to all coefficients for which changes are expected or are conditionally expected on the basis of expectation markers, even if the transform coefficient model at the receiver contains non-zero values for the coefficients.

20. A system in accordance with claim 18, wherein said means at the receiver for outputting transform domain coefficients to the inverse transformer includes means for assigning a value of zero to all coefficients for which changes are expected or are conditionally expected on the basis of expectation markers, beginning where an expectation marker is present and continuing with coefficients for all successively branched higher bands, even if the transform coefficient model at the receiver contains non-zero values for these coefficients.

21. A system in accordance with claim 6, wherein the change data set is organized as a set of change coefficients and a change map having components to describe the location in the transform domain of the change coefficients, the change map components being organized in a branched manner beginning with a plurality of map components corresponding to the lowest band and continuing with a predetermined number of conditionally-existing change map components for successive bands branched from each next preceeding level change map component, each change map component corresponding to change coefficients in a particular band, and each change map component conditionally including a change existence word indicating types of changes, if any, to be made to coefficients in a higher band.

22. A system in accordance with claim 21, wherein the change existence words are capable of indicating a cancel condition to designate that at least one previously established expectation marker is to be removed; and which system includes means for removing expectation markers from the transform coefficient models for all successively branched higher bands when a cancel condition is indicated.

23. A system in accordance with claim 22, wherein the change existence words are also capable of indicating an erase condition to designate that at least one non-zero coefficient in the transform coefficient models is to be given a value of zero; and which system includes means for changing coefficients in the transform domain coefficient models to zero for all successively branched higher bands and for removing expectation markers from the transform coefficient models for all successively branched higher bands when an erase condition is indicated.

24. A system in accordance with claim 22, wherein said means at the receiver for outputting transform domain coefficients to the inverse transformer includes means for assigning a value of zero to all coefficients for which changes are expected or are conditionally expected on the basis of expectation markers, even if the transform coefficient model at the receiver contains non-zero values for the coefficients.

25. A system in accordance with claim 22, wherein said means at the receiver for outputting transform domain coefficients to the inverse transformer includes means for assigning a value of zero to all coefficients for which changes are expected or are conditionally expected on the basis of expectation markers, beginning where an expectation marker is present and continuing with coefficients for all successively branched higher bands, even if the transform coefficient model at the receiver contains non-zero values for these coefficients.

26. A system in accordance with claim 21, wherein the change existence words are capable of indicating an erase condition to designate that at least one non-zero coefficient in the transform coefficient models is to be given a value of zero; and which system includes means for changing coefficients in the transform domain coefficient models to zero for all successively branched higher bands and for removing expectation markers from the transform coefficient models for all successively branched higher bands when an erase condition is indicated.

27. A system in accordance with claim 26, wherein said means at the receiver for outputting transform domain coefficients to the inverse transformer includes means for assigning a value of zero to all coefficients for which changes are expected or are conditionally expected on the basis of expectation markers, even if the transform coefficient model at the receiver contains non-zero values for the coefficients.

28. A system in accordance with claim 26, wherein said means at the receiver for outputting transform domain coefficients to the inverse transformer includes means for assigning a value of zero to all coefficients for which changes are expected or are conditionally expected on the basis of expectation markers, beginning where an expectation marker is present and continuing with coefficients for all successively branched higher bands, even if the transform coefficient model at the receiver contains non-zero values for these coefficients.

29. A system for transmitting transform domain coefficients corresponding to an image which is undergoing change with time as represented by a sequence of image frames, a last frame of which sequence is a current image frame, from a transmitter location having a forward transformer operating on data for each of the image frames in the sequence to generate the transform domain coefficients on a frame-by-frame basis for communication over a fixed data rate communication channel to a receiver location having an inverse transformer operating on the transform domain coefficients to provide reconstructed data for each of the image frames in the sequence, the forward transformer being one which applies to the image frame data from a multiple band hierarchial transform employing finite duration basis functions with subdivisions of basis functions by predetermined factors when going to each higher band, and the transform domain coefficient data being organized in a hierarchial manner in multiple bands corresponding to the hierarchy of the forward transformer, said system comprising:

a transform coefficient model maintained at the transmitter and a substantially identical transform coefficient model maintained at the receiver, the coefficient models holding, subject to a limitation of communication channel data rate, transform coefficient data corresponding to the most recent transform coefficients generated from at least one previous image frame;

a change identifier at the transmitter for comparing incoming current image frame transform coefficient data from the forward transformer with the transform coefficient data held in the transform coefficient model maintained at the transmitter to provide a change data set representing transform coefficient changes necessary for the transform coefficient models to represent the current image frame;

means at the transmitter for selecting a subset of the change data set which can be transmitted during a predetermined file period consistent with the communication channel data rate and for transmitting the selected subset, said file period being one of a time sequence of file periods;

means at the transmitter for replenishing the transmitter transform coefficient model based on the selected change data subset and means at the receiver for replenishing the receiver transform coefficient model based on the selected change data subset such that the transmitter and receiver transform coefficient models are identically replenished in a manner such that said coefficient models are driven in a direction towards correspondence with the current image frame; and means at the receiver for outputting transform domain coefficients to the inverse transformer based on the receiver transform coefficient model.

30. A system in accordance with claim 29, wherein said means at the transmitter for selecting a subset of the change data includes means for prioritizing the change data for selection on the basis of Zonal coding, giving lower frequency components of the change data a relatively higher priority than relatively higher frequency components.

31. A system in accordance with claim 29, wherein the transform coefficient models include at least non-zero valued transform domain coefficients and a map having components to describe the location in the transform domain of said transform domain coefficients, the map components being organized in a branched manner beginning with a plurality of map components corresponding to the lowest band and continuing with a predetermined number of conditionally-existing map components for successive bands branched from each next proceeding band map component, each map component corresponding to coefficients in a particular band, and each map component including:

conditionally an existence word indicating which further branches, if any, are present; and conditionally an expectation marker indicating whether changes in coefficient or map data at that particular band are expected in a subsequent file period.

32. A system in accordance with claim 31, which includes means at the transmitter for maintaining the transform coefficient model at the transmitter, and means at the receiver for maintaining the transform coefficient model at the receiver;

said means for maintaining including means for generating an expectation marker at a particular band when an existence word in the preceeding lower band points to said particular band but data for said particular band does not arrive during the same file period as said preceeding band existence word.

33. A system in accordance with claim 31, wherein said means at the receiver for outputting transform domain coefficients to the inverse transformer includes means for assigning a value of zero to all coefficients for which changes are expected or are conditionally expected on the basis of expectation markers, even if the transform coefficient model at the receiver contains non-zero values for the coefficients.

34. A system in accordance with claim 31, wherein said means at the receiver for outputting transform domain coefficients to the inverse transformer includes means for assigning a value of zero to all coefficients for which changes are expected or are conditionally expected on the basis of expectation markers, beginning where an expectation marker is present and continuing with coefficients for all sucessively branched higher bands, even if the transform coefficient model at the receiver contains non-zero values for these coefficients.

35. A system in accordance with claim 32, wherein said means at the receiver for outputting transform domain coefficients to the inverse transformer includes means for assigning a value of zero to all coefficients for which changes are expected or are conditionally expected on the basis of expectation markers, even if the transform coefficient model at the receiver contains non-zero values for the coefficients.

36. A system in accordance with claim 32, wherein said means at the receiver for outputting transform domain coefficients to the inverse transformer includes means for assigning a value of zero to all coefficients for which changes are expected or are conditionally expected on the basis of expectation markers, beginning where an expectation marker is present and continuing with coefficients for all successively branched higher bands, even if the transform coefficient model at the receiver contains non-zero values for these coefficients.

37. A system in accordance with claim 29, wherein the change data set is organized as a set of change coefficients and a change map having components to describe the location in the transform domain of the change coefficients, the change map components being organized in a branched manner beginning with a plurality of map components corresponding to the lowest band and continuing with a predetermined number of conditionally-existing change map components for successive bands branched from each next preceeding level change map component, each change map component corresponding to change coefficients in a particular band, and each change map component conditionally including a change existence word indicating types of changes, if any, to be made to coefficients or map components in a higher band.

38. A system in accordance with claim 37, wherein the change existence words are capable of indicating an erase condition to designate that at least one non-zero coefficient in the transform coefficient models is to be given a value of zero; and
which system includes means for changing coefficients in the transform domain coefficient models to zero for all successively branched higher bands when an erase condition is indicated.

39. A system in accordance with claim 31, wherein the change data set is organized as a set of change coefficients and a change map having components to describe the location in the transform domain of the change coefficients, the change map components being organized in a branched manner beginning with a plurality of map components corresponding to the lowest band and continuing with a predetermined number of conditionally-existing change map components for successive bands branched from each next preceeding level change map component, each change map component corresponding to change coefficients in a particular band, and each change map component conditionally including a change existence word indicating types of changes, if any, to be made to coefficients in a higher band.

40. A system in accordance with claim 37, wherein the change existence words are capable of indicating a cancel condition to designate that at least one previously established expectation marker is to be removed; and
which system includes means for removing expectation markers from the transform coefficient models for all successively branched higher bands when a cancel condition is indicated.

41. A system in accordance with claim 40, wherein the change existence words are also capable of indicating an erase condition to designate that at least one non-zero coefficient in the transform coefficient models is to be given a value of zero; and
which system includes means for changing coefficients in the transform domain coefficient models to zero for all successively branched higher bands and for removing expectation markers from the transform coefficient models for all successively branched higher bands when an erase condition is indicated.

42. A system in accordance with claim 40, wherein said means at the receiver for outputting transform domain coefficients to the inverse transformer includes means for assigning a value of zero to all coefficients for which changes are expected or are conditionally expected on the basis of expectation markers, even if the transform coefficient model at the receiver contains non-zero values for the coefficients.

43. A system in accordance with claim 40, wherein said means at the receiver for outputting transform domain coefficients to the inverse transformer includes means for assigning a value of zero to all coefficients for which changes are expected or are conditionally expected on the basis of expectation markers, beginning where an expectation marker is present and continuing with coefficients for all successively branched higher bands, even if the transform coefficient model at the receiver contains non-zero values for these coefficients.

44. A system in accordance with claim 39, wherein the change existence words are capable of indicating an erase condition to designate that at least one non-zero coefficient in the transform coefficient models is to be given a value of zero; and
which system includes means for changing coefficients in the transform domain coefficient models to zero for all successively branched higher bands and for removing expectation markers from the transform coefficient models for all successively branched higher bands when an erase condition is indicated.

45. A system in accordance with claim 44, wherein said means at the receiver for outputting transform domain coefficients to the inverse transformer includes means for assigning a value of zero to all coefficients for which changes are expected or are conditionally expected on the basis of expectation markers, even if the transform coefficient model at the receiver contains non-zero values for the coefficients.

46. A system in accordance with claim 44, wherein said means at the receiver for outputting transform domain coefficients to the inverse transformer includes means for assigning a value of zero to all coefficients for which changes are expected or are conditionally expected on the basis of expectation markers, beginning where an expectation marker is present and continuing with coefficients for all successively branched higher bands, even if the transform coefficient model at the receiver contains non-zero values for these coefficients.

47. A method for transmitting transform domain coefficients corresponding to an image which is undergoing change with time as represented by a sequence of image frames, a last frame of which sequence is a current image frame, from a transmitter location having a forward transformer operating on data for each of the image frames in the sequence to generate the transform domain coefficients on a frame-by-frame basis for communication over a fixed data rate communication channel to a receiver location having an inverse transformer operating on the transform domain coefficients on a frame-by-frame basis to provide reconstructed data for each of the image frames in the sequence, said method comprising the steps of:
maintaining a transform coefficient model at the transmitter and a substantially identical transform coefficient model at the receiver, the coefficient models holding, subject to a limitation of communication channel data rate, transform coefficient data corresponding to the most recent transform coefficients generated from at least one previous image frame;
comparing at the transmitter incoming current image frame transform coefficient data from the forward transformer with the transform coefficient data held in the transform coefficient model maintained at the transmitter to provide a change data set representing transform coefficient changes necessary for the transform coefficient models to represent the current image frame;
selecting at the transmitter a subset of the change data set which can be transmitted during a predetermined file period consistent with the communication channel data rate and transmitting the selected subset, said file period being one of a time sequence of file periods;

replenishing the transmitter transform coefficient model based on the selected change data subset and replenishing the receiver transform coefficient model based on the selected change data subset such that the transmitter and receiver transform coefficient models are identically replenished and such that the coefficient models are driven in a direction towards correspondence with the current image frame; and outputting transform domain coefficient at the receiver to the inverse transformer based on the receiver transform coefficient model.

48. A method in accordance with claim 47, wherein the step of selecting a subset of the change data includes prioritizing the change data for selection on the basis of Zonal coding, giving lower frequency components of the change data a relatively higher priority than relatively higher frequency components.

49. A method for transmitting transform domain coefficients corresponding to an image which is undergoing change with time as represented by a sequence of image frames, a last frame of which sequence is a current image frame, from a transmitter location having a forward transformer operating on data for each of the image frames in the sequence to generate the transform domain coefficients on a frame-by-frame basis for communication over a fixed data rate communication channel to a receiver location having an inverse transformer operating on the transform domain coefficients on a frame-by-frame basis to provide reconstructed data for each of the image frames in the sequence, the transform domain coefficient data being organized in a hierarchial manner in multiple bands, said method comprising the steps of:

maintaining a transform coefficient model at the transmitter and a substantially identical transform coefficient model at the receiver, the coefficient models holding, subject to a limitation of communication channel data rate, transform coefficient data corresponding to the most recent transform coefficients generated from at least one previous image frame;

comparing at the transmitter incoming current image frame transform coefficient data from the forward transformer with the transform coefficient data held in the transform coefficient model maintained at the transmitter to provide a change data set representing transform coefficient changes necessary for the transform coefficient models to represent the current image frame;

selecting at the transmitter a subset of the change data set which can be transmitted during a predetermined file period consistent with the communication channel data rate and transmitting the selected subset, said file period being one of a time sequence of file periods;

replenishing the transmitter transform coefficient model based on the selected change data subset and replenishing the receiver transform coefficient model based on the selected change data subset such that the transmitter and receiver transform coefficient models are identically replenished in a manner such that said coefficient models are driven in a direction towards correspondence with the current image frame; and outputting transform domain coefficients at the receiver to the inverse transformer based on the receiver transform coefficient model.

50. A method in accordance with claim 49, wherein the step of selecting a subset of the change data includes prioritizing the change data for selection on the basis of Zonal coding, giving lower frequency components of the change data a relatively higher priority than relatively higher frequency components.

51. A method in accordance with claim 49, wherein the maintained transform coefficient models include at least non-zero valued transform domain coefficients and a map having components to describe the location in the transform domain of the transform domain coefficients, the map components being organized in a branched manner beginning with a plurality of map components corresponding to the lowest band and continuing with a predetermined number of conditionally-existing map components for successive bands branched from each next proceeding band map component, each map component corresponding to coefficients in a particular band, and each map component including:

conditionally an existence word indicating which further branches, if any, are present; and conditionally an expectation marker indicating whether changes in coefficient or map data at that particular band are expected in a subsequent file period.

52. A method in accordance with claim 51, wherein the step of maintaining the transform coefficient models at the transmitter and at the receiver includes generating an expectation marker at a particular band when an existence word in the preceeding lower band points to the particular band but data for the particular band does not arrive during the same file period as the preceeding band existence word.

53. A method in accordance with claim 51, wherein the step of outputting transform domain coefficients to the inverse transformer at the receiver includes assigning a value of zero to all coefficients for which changes are expected or are conditionally expected on the basis of expectation markers, even if the transform coefficient model at the receiver contains non-zero values for the coefficients.

54. A method in accordance with claim 51, wherein the step of outputting transform domain coefficients to the inverse transformer at the receiver includes assigning a value of zero to all coefficients for which changes are expected or are conditionally expected on the basis of expectation markers, beginning where an expectation marker is present and continuing with coefficients for all sucessively branched higher bands, even if the transform coefficient model at the receiver contains non-zero values for these coefficients.

55. A method in accordance with claim 52, wherein the step of maintaining the transform coefficient models at the transmitter and at the receiver includes generating an expectation marker at a particular band when an existence word in the preceeding lower band points to the particular band but data for the particular band does not arrive during the same file period as the preceeding band existence word.

56. A method in accordance with claim 52, wherein the steps of outputting transform domain coefficients to the inverse transformer at the receiver includes assigning a value of zero to all coefficients for which changes are expected or are conditionally expected on the basis of expectation markers, even if the transform coefficient model at the receiver contains non-zero values for the coefficients.

57. A method in accordance with claim 49, which comprises organizing the change data set as a set of change coefficients and a change map having components to describe the location in the transform domain of the change coefficients, the change map components being organized in a branched manner beginning with a plurality of map components corresponding to the lowest band and continuing with a predetermined number of conditionally-existing change map components for successive bands branched from each next preceeding level change map component, each change map component corresponding to change coefficients in a particular band, and each change map component conditionally including a change existence word indicating types of changes, if any, to be made to coefficients or map components in a higher band.

58. A method in accordance with claim 57, wherein the change existence words are capable of indicating an erase condition to designate that at least one non-zero coefficient in the transform coefficient models is to be given a value of zero; and
which method includes changing coefficients in the transform domain coefficient models to zero for all successively branched higher bands when an erase condition is indicated.

59. A method in accordance with claim 51, which comprises organizing the change data set as a set of change coefficients and a change map having components to describe the location in the transform domain of the change coefficients, the change map components being organized in a branched manner beginning with a plurality of map components corresponding to the lowest band and continuing with a predetermined number of conditionally-existing change map components for successive bands branched from each next preceeding level change map component, each change map component corresponding to change coefficients in a particular band, and each change map component conditionally including a change existence word indicating types of changes, if any, to be made to coefficients in a higher band.

60. A method in accordance with claim 59, wherein the change existence words are capable of indicating a cancel condition to designate that at least one previously established expectation marker is to be removed; and
which method includes removing expectation markers from the transform coefficient models for all successively branched higher bands when a cancel condition is indicated.

61. A method in accordance with claim 60, wherein the change existence words are also capable of indicating an erase condition to designate that at least one non-zero coefficient in the transform coefficient models is to be given a value of zero; and
which method includes changing coefficients in the transform domain coefficient models to zero for all successively branched higher bands and for removing expectation markers from the transform coefficient models for all successively branched higher bands when an erase condition is indicated.

62. A method in accordance with claim 60, wherein the step of outputting transform domain coefficients to the inverse transformer at the receiver includes assigning a value of zero to all coefficients for which changes are expected or are conditionally expected on the basis of expectation markers, even if the transform coefficient model at the receiver contains non-zero values for the coefficients.

63. A method in accordance with claim 60, wherein the step of outputting transform domain coefficients to the inverse transformer at the receiver includes assigning a value of zero to all coefficients for which changes are expected or are conditionally expected on the basis of expectation markers, beginning where an expectation marker is present and continuing with coefficients for all successively branched higher bands, even if the transform coefficient model at the receiver contains non-zero values for these coefficients.

64. A method in accordance with claim 59, wherein the change existence words are capable of indicating an erase condition to designate that at least one non-zero coefficient in the transform coefficient models is to be given a value of zero; and
which method includes changing coefficients in the transform domain coefficient models to zero for all successively branched higher bands and for removing expectation markers from the transform coefficient models for all successively branched higher bands when an erase condition is indicated.

65. A method in accordance with claim 64, wherein the steps of outputting transform domain coefficients to the inverse transformer at the receiver includes assigning a value of zero to all coefficients for which changes are expected or are conditionally expected on the basis of expectation markers, even if the transform coefficient model at the receiver contains non-zero values for the coefficients.

66. A method in accordance with claim 64, wherein the steps of outputting transform domain coefficients to the inverse transformer at the receiver includes assigning a value of zero to all coefficients for which changes are expected or are conditionally expected on the basis of expectation markers, beginning where an expectation marker is present and continuing with coefficients for all successively branched higher bands, even if the transform coefficient model at the receiver contains non-zero values for these coefficients.

67. A method in accordance with claim 52, which comprises organizing the change data set as a set of change coefficients and a change map having components to describe the location in the transform domain of the change coefficients, the change map components being organized in a branched manner beginning with a plurality of map components corresponding to the lowest band and continuing with a predetermined number of conditionally-existing change map components for successive bands branched from each next preceeding level change map component, each change map component corresponding to change coefficients in a particular band, and each change map component conditionally including a change existence word indicating types of changes, if any, to be made to coefficients in a higher band.

68. A method in accordance with claim 67, wherein the change existence words are capable of indicating a cancel condition to designate that at least one previously established expectation marker is to be removed; and
which method includes removing expectation markers from the transform coefficient models for all successively branched higher bands when a cancel condition is indicated.

69. A method in accordance with claim 68, wherein the change existence words are also capable of indicating an erase condition to designate that at least one non-zero coefficient in the transform coefficient models is to be given a value of zero; and which method includes changing coefficients in the transform domain coefficient models to zero for all successively branched higher bands and for removing expectation markers from the transform coefficient models for all successively branched higher bands when an erase condition is indicated.

70. A method in accordance with claim 68, wherein the step of outputting transform domain coefficients to the inverse transformer at the receiver includes assigning a value of zero to all coefficients for which changes are expected or are conditionally expected on the basis of expectation markers, even if the transform coefficient model at the receiver contains non-zero values for the coefficients.

71. A method in accordance with claim 68, wherein the step of outputting transform domain coefficients to the inverse transformer at the receiver includes assigning a value of zero to all coefficients for which changes are expected or are conditionally expected on the basis of expectation markers, beginning where an expectation marker is present and continuing with coefficients for all successively branched higher bands, even if the transform coefficient model at the receiver contains non-zero values for these coefficients.

72. A method in accordance with claim 67, wherein the change existence words are capable of indicating an erase condition to designate that at least one non-zero coefficient in the transform coefficient models is to be given a value of zero; and which method includes changing coefficients in the transform domain coefficient models to zero for all successively branched higher bands and for removing expectation markers from the transform coefficient models for all successively branched higher bands when an erase condition is indicated.

73. A method in accordance with claim 72, wherein the step of outputting transform domain coefficients to the inverse transformer at the receiver includes assigning a value of zero to all coefficients for which changes are expected or are conditionally expected on the basis of expectation markers, even if the transform coefficient model at the receiver contains non-zero values for the coefficients.

74. A method in accordance with claim 72, wherein the step of outputting transform domain coefficients to the inverse transformer at the receiver includes assigning a value of zero to all coefficients for which changes are expected or are conditionally expected on the basis of expectation markers, beginning where an expectation marker is present and continuing with coefficients for all successively branched higher bands, even if the transform coefficient model at the receiver contains non-zero values for these coefficients.

75. A method for coding at a transmitter and subsequently recovering at a receiver a two-dimensional array of the lowest frequency or sequence transform domain components of a two-dimensional transform operating on image data, the transform domain components being Pyramid Transform Band 1 B-function terms, each of the Band 1 B-function terms being a weighted average of rectangular set of image pixels, with overlap of the pixels contributing to each B-function term, said method comprising:

transmitting at least-two of the transform domain components;

calculating at the transmitter a model value for a particular transform domain component as the average of two of the nearest neighbors of the particular component;

determining the value of a descriptor as the difference between the model value and the actual value of the particular component;

employing entropy coding to transmit the descriptor to the receiver, and decoding to recover the descriptor at the receiver; and recovering the original value of the particular component at the receiver by calculating the model value and adding the descriptor to the model value.

* * * * *